US009947965B2

(12) United States Patent
Nakazawa et al.

(10) Patent No.: US 9,947,965 B2
(45) Date of Patent: Apr. 17, 2018

(54) NONAQUEOUS ELECTROLYTE SOLUTION AND NONAQUEOUS ELECTROLYTE BATTERY USING SAME

(71) Applicant: MITSUBISHI CHEMICAL CORPORATION, Tokyo (JP)

(72) Inventors: Eiji Nakazawa, Ibaraki (JP); Youichi Oohashi, Ibaraki (JP); Minoru Kotato, Ibaraki (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/866,009

(22) Filed: Sep. 25, 2015

(65) Prior Publication Data

US 2016/0013517 A1     Jan. 14, 2016

Related U.S. Application Data

(63) Continuation of application No. PCT/JP2014/059048, filed on Mar. 27, 2014.

(30) Foreign Application Priority Data

Mar. 27, 2013    (JP) ................................ 2013-067188

(51) Int. Cl.

| | |
|---|---|
| *H01M 4/133* | (2010.01) |
| *H01M 4/134* | (2010.01) |
| *H01M 10/0567* | (2010.01) |
| *H01M 10/052* | (2010.01) |
| *H01M 4/36* | (2006.01) |
| *H01M 4/38* | (2006.01) |
| *H01M 4/40* | (2006.01) |
| *H01M 4/587* | (2010.01) |
| *H01M 10/0525* | (2010.01) |
| *H01M 4/42* | (2006.01) |
| *H01M 4/46* | (2006.01) |
| *H01M 4/62* | (2006.01) |
| *H01M 10/0569* | (2010.01) |
| *H01M 4/02* | (2006.01) |
| *H01M 4/485* | (2010.01) |

(52) U.S. Cl.
CPC ....... *H01M 10/0567* (2013.01); *H01M 4/133* (2013.01); *H01M 4/134* (2013.01); *H01M 4/364* (2013.01); *H01M 4/386* (2013.01); *H01M 4/405* (2013.01); *H01M 4/42* (2013.01); *H01M 4/463* (2013.01); *H01M 4/587* (2013.01); *H01M 10/052* (2013.01); *H01M 10/0525* (2013.01); *H01M 4/38* (2013.01); *H01M 4/387* (2013.01); *H01M 4/485* (2013.01); *H01M 4/622* (2013.01); *H01M 10/0569* (2013.01); *H01M 2004/027* (2013.01); *H01M 2300/0025* (2013.01)

(58) Field of Classification Search
CPC .. H01M 2004/027; H01M 4/02; H01M 4/133; H01M 4/134; H01M 2300/0017; H01M 2300/0025; H01M 2300/0034; H01M 10/0567
See application file for complete search history.

(56) References Cited

U.S. PATENT DOCUMENTS

| | | | |
|---|---|---|---|
| 9,153,841 B2* | 10/2015 | Yamamoto et al. | |
| 2002/0197537 A1 | 12/2002 | Kim et al. | |
| 2005/0244719 A1 | 11/2005 | Kim et al. | |
| 2006/0166093 A1* | 7/2006 | Zaghib et al. | 429/217 |
| 2006/0166098 A1 | 7/2006 | Tabuchi et al. | |
| 2011/0117443 A1* | 5/2011 | Lee et al. | 429/328 |
| 2011/0151338 A1 | 6/2011 | Yamamoto et al. | |
| 2011/0274986 A1* | 11/2011 | Yamamoto | H01M 10/0568 429/332 |
| 2011/0281180 A1 | 11/2011 | Kim et al. | |
| 2012/0308881 A1 | 12/2012 | Tokuda et al. | |
| 2012/0316716 A1 | 12/2012 | Odani et al. | |
| 2013/0309564 A1 | 11/2013 | Yoshida et al. | |
| 2013/0330609 A1 | 12/2013 | Sawa et al. | |
| 2013/0330610 A1 | 12/2013 | Shigematsu et al. | |
| 2014/0038062 A1 | 2/2014 | Kawakami et al. | |
| 2014/0363735 A1 | 12/2014 | Yoshida et al. | |
| 2015/0140448 A1 | 5/2015 | Takiguchi et al. | |

FOREIGN PATENT DOCUMENTS

| | | |
|---|---|---|
| CN | 1385919 A | 12/2002 |
| CN | 102640344 A | 8/2012 |

(Continued)

OTHER PUBLICATIONS

Machine translation of KR 10-2006-0001719, published on Jan. 6, 2006.*
Machine translation of JP 2011-119183, published on Jun. 16, 2011.*
Office Action dated Jan. 24. 2017, in corresponding Chinese Patent Application No. 201480016615.1 (with English-language Translation).

(Continued)

*Primary Examiner* — Anca Eoff
(74) *Attorney, Agent, or Firm* — Oblon, McClelland, Maier & Neustadt, L.L.P.

(57) ABSTRACT

The object of the present invention is to provide a nonaqueous electrolyte secondary battery which has excellent balance of general performance with respect to performance including durability, capacity, resistance, and output characteristics. Provided is a nonaqueous electrolyte battery comprising a positive electrode and a negative electrode each being capable of occluding and releasing metal ions, and a nonaqueous electrolyte solution, wherein the nonaqueous electrolyte solution contains an electrolyte, a nonaqueous solvent, and at least one compound selected from the group consisting of a compound having a fluorosulfonyl structure (—SO$_2$F), a difluorophosphate, and an isocyanate compound, and wherein the negative electrode has a negative electrode active material containing metal particles capable of alloying with Li and graphite particles.

10 Claims, No Drawings

(56) References Cited

FOREIGN PATENT DOCUMENTS

| EP | 2 190 054 | * | 5/2010 |
|----|-----------|---|--------|
| EP | 2 387 089 | | 11/2011 |
| JP | 11-067270 | | 3/1999 |
| JP | 2004-146292 | | 5/2004 |
| JP | 2005-259641 | | 9/2005 |
| JP | 2006-164759 | | 6/2006 |
| JP | 2011-113863 | | 6/2011 |
| JP | 2011-119183 | * | 6/2011 |
| JP | 2011-187440 | | 9/2011 |
| JP | 2011-233245 | | 11/2011 |
| JP | 2011-243571 A | | 12/2011 |
| JP | 2013-16456 A | | 1/2013 |
| KR | 10-2006-0001719 | * | 1/2006 |
| WO | 2010/021236 | | 2/2010 |
| WO | WO 2011/142276 | * | 11/2011 |
| WO | 2012/108270 | | 8/2012 |
| WO | WO 2012/105510 | | 8/2012 |
| WO | WO 2012/108505 | | 8/2012 |
| WO | WO 2012/141180 A1 | | 10/2012 |
| WO | 2014/003165 | | 1/2014 |

OTHER PUBLICATIONS

Combined Office Action and Search Report dated Aug. 18, 2017 in Chinese Patent Application No. 201480016615.1 (with partial unedited computer generated English translation and English translation of categories of cited documents).

Office Action (Notification of Reasons for Refusal) dated Dec. 19, 2017 in Japanese Patent Application No. 2015-508740 with English translation.

* cited by examiner

NONAQUEOUS ELECTROLYTE SOLUTION AND NONAQUEOUS ELECTROLYTE BATTERY USING SAME

CROSS REFERENCE TO RELATED APPLICATION

This application is a continuation of PCT/JP2014/059048, filed on Mar. 27, 2014, and claims priority to Japanese Application No. 2013-067188, filed on Mar. 27, 2013.

FIELD OF THE INVENTION

The present invention relates to a nonaqueous electrolyte solution and a nonaqueous electrolyte battery using the same.

BACKGROUND ART

As mobile electronic devices, such as a mobile phone and a laptop personal computer, are rapidly making progress, there is an increasing need to increase the capacity of a battery used in a main power supply or a backup power supply for electronic devices, and nonaqueous electrolyte batteries, such as a lithium-ion secondary battery, having a high energy density, as compared to a nickel-cadmium battery and a nickel-hydrogen battery, have attracted attention.

As representative examples of electrolyte solutions for lithium-ion secondary battery, there can be mentioned nonaqueous electrolyte solutions obtained by dissolving an electrolyte, such as $LiPF_6$, $LiBF_4$, $LiN(CF_3SO_2)_2$, or $LiCF_3(CF_2)_3SO_3$, in a mixed solvent of a high dielectric constant solvent, such as ethylene carbonate or propylene carbonate, and a low viscosity solvent, such as dimethyl carbonate, diethyl carbonate, or ethylmethyl carbonate.

Further, as a negative electrode active material for lithium-ion secondary battery, a carbonaceous material capable of occluding and releasing lithium ions is mainly used, and representative examples thereof include natural graphite, artificial graphite, and amorphous carbon. For further increasing the capacity, a negative electrode of a metal or alloy using, for example, silicon or tin is also known. As a positive electrode active material, a transition metal compound oxide capable of occluding and releasing lithium ions is mainly used, and representative examples of transition metals include cobalt, nickel, manganese, and iron.

In such a lithium-ion secondary battery, the positive electrode and negative electrode having high activity are used, and therefore it has been known that a side reaction caused between the electrode and an electrolyte solution lowers the charge/discharge capacity. For improving the battery characteristics, various studies on the nonaqueous solvents and electrolytes have been made.

In patent documents 1 and 2, an attempt has been made to add an isocyanate compound to a nonaqueous electrolyte solution to improve the battery in cycle characteristics.

In patent document 3, an attempt has been made to use an electrolyte solution having added thereto lithium fluorophosphate to improve the battery in high-temperature storage characteristics.

Patent document 4 has reported that, by using an electrolyte solution having added thereto lithium fluorosulfonate, the battery is improved in high-temperature storage characteristics, input/output characteristics, and impedance characteristics.

In patent document 5, an attempt has been made to prepare a battery using a material comprising Si and O as constituent elements and a graphite material in a negative electrode active material in the negative electrode and using a halogenated cyclic carbonate or vinylene carbonate in an electrolyte solution to improve the battery in cycle characteristics.

PRIOR ART REFERENCES

Patent Documents

Patent document 1: Japanese Unexamined Patent Publication No. 2005-259641
Patent document 2: Japanese Unexamined Patent Publication No. 2006-164759
Patent document 3: Japanese Unexamined Patent Publication No. Hei 11-67270
Patent document 4: Japanese Unexamined Patent Publication No. 2011-187440
Patent document 5: Japanese Unexamined Patent Publication No. 2011-233245

DISCLOSURE OF THE INVENTION

Problems to be Solved by the Invention

However, in recent years, demands on the lithium nonaqueous electrolyte secondary battery are further increasing wherein the battery should be improved in the properties, and the battery is required to have high-level performance in all characteristics including high-temperature storage characteristics, energy density, output characteristics, life, high-rate charge/discharge characteristics, and low temperature characteristics, but such a battery has not yet been achieved. A problem is encountered in that there is a trade-off relationship between durability performance including the high-temperature storage characteristics and other performance, such as the capacity, resistance, and output characteristics, resulting in a battery having a bad balance of the general performance.

In view of the above problems, the present invention has been achieved. Specifically, an object is to provide a nonaqueous electrolyte secondary battery which has excellent balance of general performance with respect to performance including durability, capacity, resistance, and output characteristics.

Means to Solve the Problems

The inventors of the present invention have conducted extensive and intensive studies with a view toward achieving the above object. As a result, it has been found that the above-mentioned problems can be solved, by using a nonaqueous electrolyte battery comprising a positive electrode and a negative electrode each being capable of occluding and releasing metal ions, and a nonaqueous electrolyte solution, wherein the nonaqueous electrolyte solution contains at least one compound selected from the group consisting of a compound having a fluorosulfonyl structure ($-SO_2F$), a difluorophosphate, and an isocyanate compound, and wherein the negative electrode has a negative electrode active material containing metal particles capable of alloying with Li and graphite particles, and the below-described present invention has been completed.

The gist of the present invention is as follows.

(a) A nonaqueous electrolyte battery comprising a positive electrode and a negative electrode each being capable of occluding and releasing metal ions, and a nonaqueous electrolyte solution, wherein the nonaqueous electrolyte solution contains an electrolyte, a nonaqueous solvent, and at least one compound selected from the group consisting of a compound having a fluorosulfonyl structure (—SO$_2$F), a difluorophosphate, and an isocyanate compound, and wherein the negative electrode has a negative electrode active material containing metal particles capable of alloying with Li and graphite particles.

(b) The nonaqueous electrolyte battery according to item (a) above, wherein the metal particles capable of alloying with Li are at least one metal selected from the group consisting of Si, Sn, As, Sb, Al, Zn, and W or a metal compound thereof.

(c) The nonaqueous electrolyte battery according to item (a) or (b) above, wherein the metal particles capable of alloying with Li are Si or Si metal oxide.

(d) The nonaqueous electrolyte battery according to items (a) to (c) above, wherein the negative electrode active material containing metal particles capable of alloying with Li and graphite particles is a composite of a metal and/or a metal compound and graphite particles.

(e) The nonaqueous electrolyte battery according to items (a) to (d) above, wherein the content of the metal particles capable of alloying with Li is 0.1 to 25% by mass, based on the total of the metal particles capable of alloying with Li and the graphite particles.

(f) The nonaqueous electrolyte battery according to items (a) to (e) above, wherein the content of the metal particles capable of alloying with Li is 0.1 to 20% by mass, based on the total of the metal particles capable of alloying with Li and the graphite particles.

(g) The nonaqueous electrolyte battery according to items (a) to (f) above, wherein the content of the metal particles capable of alloying with Li is 0.1 to 15% by mass, based on the total of the metal particles capable of alloying with Li and the graphite particles.

(h) The nonaqueous electrolyte battery according to items (a) to (g) above, wherein the content of the metal particles capable of alloying with Li is 0.1 to 10% by mass, based on the total of the metal particles capable of alloying with Li and the graphite particles.

(i) The nonaqueous electrolyte battery according to items (a) to (h) above, wherein the compound having a fluorosulfonyl structure (—SO$_2$F) is lithium fluorosulfonate, lithium bis(fluorosulfonyl)imide, or a compound represented by the following general formula (A):

[Chemical formula 1]

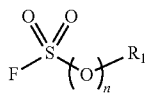

(A)

wherein each R$_1$ independently represents an alkyl group, an alkenyl group, or an alkynyl group having 1 to 10 carbon atoms and being optionally substituted with a halogen atom, or an aromatic hydrocarbon group having 6 to 20 carbon atoms and being optionally substituted with a halogen atom, and n represents an integer of 0 to 1.

(j) The nonaqueous electrolyte battery according to items (a) to (i) above, wherein the difluorophosphate is lithium difluorophosphate.

(k) The nonaqueous electrolyte battery according to items (a) to (j) above, wherein the isocyanate compound is a hydrocarbon diisocyanate compound or a compound represented by the following general formula (C):

[Chemical formula 2]

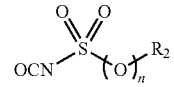

(C)

wherein each R$_2$ independently represents an alkyl group, an alkenyl group, or an alkynyl group having 1 to 10 carbon atoms and being optionally substituted with a halogen atom, or an aromatic hydrocarbon group having 6 to 20 carbon atoms and being optionally substituted with a halogen atom, or an isocyanate group, or a halogen atom, and n represents an integer of 0 to 1.

(l) The nonaqueous electrolyte battery according to items (a) to (k) above, wherein the content of the at least one compound selected from the group consisting of a compound having a fluorosulfonyl structure (—SO$_2$F), a difluorophosphate, and an isocyanate compound is 0.01% by mass to 10.0% by mass, based on the total amount of the nonaqueous electrolyte solution.

(m) The nonaqueous electrolyte battery according to items (a) to (l) above, wherein the nonaqueous electrolyte solution contains at least one compound selected from the group consisting of a cyclic carbonate having a carbon-carbon unsaturated bond, a cyclic carbonate having a fluorine atom, an acid anhydride compound, a cyclic sulfonic ester compound, and a compound having a cyano group.

(n) The nonaqueous electrolyte battery according to item (m) above, wherein the content of the at least one compound selected from the group consisting of a cyclic carbonate having a carbon-carbon unsaturated bond, a cyclic carbonate having a fluorine atom, an acid anhydride compound, a cyclic sulfonic ester compound, and a compound having a cyano group is 0.001% by mass to 10% by mass, based on the total amount of the nonaqueous electrolyte solution.

Effect of the Invention

In the present invention, there can be provided a lithium nonaqueous electrolyte secondary battery which has excellent balance of general performance with respect to performance including durability, capacity, resistance, and output characteristics. Specifically, there is provided a battery which is suppressed in a lowering of the capacity and suffers less battery expansion even when the charge/discharge cycle is repeated.

The action or principle in which the nonaqueous electrolyte secondary battery produced using the nonaqueous electrolyte solution of the present invention and the nonaqueous electrolyte secondary battery of the present invention are a secondary battery having excellent balance of general performance has not been elucidated, but is presumed as follows. The present invention is not limited to the below-described action or principle.

It has been reported that the compounds described in patent documents 1 to 4 act on the positive electrode or negative electrode of a battery to improve the battery in, for example, storage properties. However, only the effect obtained when using graphite or metal lithium in the negative electrode is actually demonstrated, and an effect obtained when using Si, Sn, Pb, or an oxide thereof in the negative electrode is not clearly shown at all.

In Patent document 5, the effect obtained when using a material comprising Si and O as constituent elements and a graphite material in a negative electrode active material in the negative electrode and using a halogenated cyclic carbonate or vinylene carbonate in an electrolyte solution is clarified; however, an effect obtained when using an electrolyte solution using the isocyanate compound, fluorosulfonate, or fluorophosphate/difluorophosphate compound described in patent documents 1 to 4 is not clearly shown at all.

A Si active material exhibits a very large theoretical capacity per weight or volume of the negative electrode active material, as compared to the carbon negative electrode currently used, and therefore has attracted attention as a next-generation negative electrode. However, the Si active material has a problem in that the active material suffers a very large change in volume (100 to 300%) upon occluding and releasing lithium ions, causing deterioration of the compound electrode and active material, such as interruption of the path of electronic conduction in the electrode, or production of finer particles. The repeated charging/discharging operation causes the particles to get finer, so that a new surface having high activity (dangling bond) is exposed. A problem occurs in that the exposed surface and the electrolyte solution undergo a reaction to cause the surface of the active material to suffer a change in properties, so that the active material capacity is lowered and a difference is caused in the charge depth between the positive electrode and the negative electrode, leading to poor cycle characteristics. For solving the problem, in the present invention, an isocyanate compound, a compound having a fluorosulfonyl structure (—$SO_2F$), or a difluorophosphate is contained in the electrolyte solution. For example, when using the isocyanate compound, a decomposition product of the solvent and the isocyanate group undergo a reaction to increase the molecular weight of the decomposition product, so that the decomposition product is insolubilized in the electrolyte solution and the resultant film is deposited on the surface of the active material, suppressing a reductive decomposition reaction of the electrolyte solution. Further, the isocyanate group is polarized, and therefore reacts with the Si surface to suppress, for example, a lowering of the surface activity or a change in properties of the active material. The compound having a fluorosulfonyl structure (—$SO_2F$) has a high degree of polarization because of having a fluorine atom bonded to the $SO_2$ group, and the elimination property of the fluorine atom is high. Thus, lithium fluoride insoluble in the electrolyte solution is deposited on the surface of the active material, and, like the isocyanate compound, this suppresses a reductive decomposition reaction of the electrolyte solution. Further, like the aforementioned matter, the fluorine atom having high elimination property reacts with the Si surface to suppress a lowering of the surface activity or a change in properties of the active material. The effect of the difluorophosphate compound is similar to that of the compound having a fluorosulfonyl structure (—$SO_2F$).

For solving the above-mentioned problems, in the present invention, there is used a nonaqueous electrolyte battery comprising a positive electrode and a negative electrode each being capable of occluding and releasing metal ions, and a nonaqueous electrolyte solution, wherein the nonaqueous electrolyte solution contains an electrolyte, a nonaqueous solvent, and at least one compound selected from the group consisting of a compound having a fluorosulfonyl structure (—$SO_2F$), a difluorophosphate, and an isocyanate compound, and wherein the negative electrode has a negative electrode active material containing metal particles capable of alloying with Li and graphite particles. As a result, it has been found that not only the high-temperature storage characteristics but also various properties, such as cycle gas suppression, cycle characteristics, rate characteristics, and battery expansion, can be improved, and the present invention has been completed.

BEST MODE FOR CARRYING OUT THE INVENTION

Hereinbelow, embodiments of the present invention will be described, but the present invention is not limited to the following embodiments, and can be practiced in an arbitrarily modified mode in a range such that the gist of the present invention is not sacrificed.

Here, the "% by weight", "ppm by weight", and "part(s) by weight", respectively, have the same meanings as those of the "% by mass", "ppm by mass", and "part(s) by mass". Further, an indication referred to simply as "ppm" means "ppm by weight".

1. Nonaqueous Electrolyte Solution 1-1. Nonaqueous Electrolyte Solution of the Present Invention The nonaqueous electrolyte solution of the present invention contains an electrolyte, a nonaqueous solvent, and at least one compound selected from the group consisting of a compound having a fluorosulfonyl structure (—$SO_2F$), a difluorophosphate, and an isocyanate compound.

When the nonaqueous electrolyte solution contains an electrolyte and a nonaqueous solvent as well as at least one compound selected from the group consisting of a compound having a fluorosulfonyl structure (—$SO_2F$), a difluorophosphate, and an isocyanate compound, it is likely that the nonaqueous electrolyte battery using the resultant nonaqueous electrolyte solution exhibits an effect to improve the cycle characteristics, and that the battery is improved in the high-temperature storage characteristics, so that the amount of the gas generated is reduced, avoiding battery expansion.

The "battery expansion" of the nonaqueous electrolyte battery is evaluated as follows. A comparison is made between an initial battery thickness of the battery which has been subjected to initial conditioning and a thickness of the battery after a high-temperature cycle test (for example, 100 cycles). When the thickness of the battery after the high-temperature cycle test is larger than the initial battery thickness, an evaluation can be made such that "battery expansion" has occurred. The battery expansion includes expansion due to a change of the thickness of the electrode caused during the cycles.

1-1-1. Compound Having a Fluorosulfonyl Structure (—$SO_2F$)

The compound having a fluorosulfonyl structure (—$SO_2F$) is representatively, a fluorosulfonate, lithium bis(fluorosulfonyl)imide, and a compound represented by the general formula (A).

I. Fluorosulfonate

The nonaqueous electrolyte solution of the present invention may contain a fluorosulfonate as well as an electrolyte and a nonaqueous solvent.

The fluorosulfonate is represented by the general formula (D):

$$X_1(FSO_3)_n \quad (D)$$

wherein $X_1$ represents a counter cation of the fluorosulfonate, and n represents a valence of the counter cation.

With respect to the counter cation of the fluorosulfonate, there is no particular limitation, and examples thereof include lithium, sodium, potassium, rubidium, cesium, magnesium, calcium, barium, and an ammonium represented by $NR_{11}R_{12}R_{13}R_{14}$ (wherein each of $R_{11}$ to $R_{14}$ independently represents a hydrogen atom or an organic group having 1 to 12 carbon atoms).

With respect to the organic groups having 1 to 12 carbon atoms and being represented by $R_{11}$ to $R_{14}$ in the above ammonium, there is no particular limitation, but examples thereof include a hydrogen atom, an alkyl group optionally substituted with a halogen atom, a cycloalkyl group optionally substituted with a halogen atom or an alkyl group, an aryl group optionally substituted with a halogen atom or an alkyl group, and a nitrogen atom-containing heterocyclic group optionally having a substituent. Of these, each of $R_{11}$ to $R_{14}$ is independently preferably a hydrogen atom, an alkyl group, a cycloalkyl group, or a nitrogen atom-containing heterocyclic group.

Specific examples of fluorosulfonates include lithium fluorosulfonate, sodium fluorosulfonate, potassium fluorosulfonate, rubidium fluorosulfonate, and cesium fluorosulfonate, and preferred is lithium fluorosulfonate.

Fluorosulfonates may be used alone or two or more types may be used in an arbitrary combination and in an arbitrary ratio. With respect to the amount of the fluorosulfonate incorporated, there is no particular limitation, and the amount is arbitrary provided it does not significantly impair the effects of the present invention, but the concentration of the fluorosulfonate contained in the nonaqueous electrolyte solution (100% by mass) is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, most preferably 1% by mass or less. When the concentration is within the above range, it is likely that the resultant nonaqueous electrolyte battery exhibits a satisfactory effect to improve the cycle characteristics, and that the battery avoids a disadvantage in that the high-temperature storage characteristics become poor to increase the amount of the gas generated, lowering the discharge capacity maintaining ratio or causing battery expansion.

II. Lithium bis(fluorosulfonylimide)

The structural formula is represented by the following formula (B).

[Chemical formula 3]

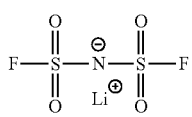

(B)

With respect to the amount of the lithium bis(fluorosulfonyl)imide incorporated, the concentration of the lithium bis(fluorosulfonyl)imide contained in the nonaqueous electrolyte solution (100% by mass) is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, most preferably 1% by mass or less.

When the concentration is within the above range, it is likely that the resultant nonaqueous electrolyte battery exhibits a satisfactory effect to improve the cycle characteristics, and that the battery is improved in the high-temperature storage characteristics, so that the amount of the gas generated is reduced, avoiding the occurrence of a lowering of the discharge capacity maintaining ratio or battery expansion.

III. Compound Represented by the General Formula (A)

[Chemical formula 4]

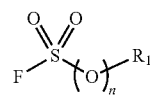

(A)

In the formula (A), each $R_1$ independently represents an alkyl group, an alkenyl group, or an alkynyl group having 1 to 10 carbon atoms and being optionally substituted with a halogen atom, or an aromatic hydrocarbon group having 6 to 20 carbon atoms and being optionally substituted with a halogen atom, and n represents an integer of 0 to 1. The halogen atom is preferably a fluorine atom.

In the formula (A), when $R_1$ is an alkyl group having 1 to 10 carbon atoms, specific examples of the alkyl groups include linear or branched alkyl groups such as a methyl group, an ethyl group, a n-propyl group, an i-propyl group, a n-butyl group, a sec-butyl group, a tert-butyl group, n-pentyl, n-hexyl, n-heptyl, and n-octyl; and cyclic alkyl groups such as a cyclopropyl group, a cyclopentyl group, and a cyclohexyl group. These groups may be substituted with a fluorine atom.

In the formula (A), when $R_1$ is an alkenyl group, $R_1$ is preferably an alkenyl group having 2 to 6 carbon atoms. Specific examples of the alkenyl groups include a vinyl group, an allyl group, a methallyl group, a 1-propenyl group, a butenyl group, and a pentenyl group. These groups may be substituted with a fluorine atom, and examples of such groups include a vinyl group, an allyl group, and a methallyl group, each of which is substituted with fluorine.

In the formula (A), when $R_1$ is an alkynyl group, $R_1$ is preferably an alkynyl group having 2 to 6 carbon atoms. Specific examples of the alkynyl groups include an ethynyl group, a propargyl group, a 1-propynyl group, a butynyl group, and a hexynyl group. These groups may be substituted with a fluorine atom, and examples of such groups include an ethynyl group, a propargyl group, and a 1-propynyl group, each of which is substituted with fluorine.

In the formula (A), specific examples of $R_1$ that is an aromatic hydrocarbon group having 6 to 20 carbon atoms and being optionally substituted with a halogen atom, include a phenyl group, a tolyl group, a benzyl group, and a phenethyl group. These groups may be substituted with, e.g., fluorine or a trifluoromethyl group, and examples of such groups include a phenyl group, a tolyl group, a benzyl group, and a phenethyl group, each of which is substituted with fluorine or a trifluoromethyl group.

As examples of the compounds represented by the formula (A), there can be mentioned the following compounds. The present invention is not limited to the compounds shown below.

[Chemical formula 5]
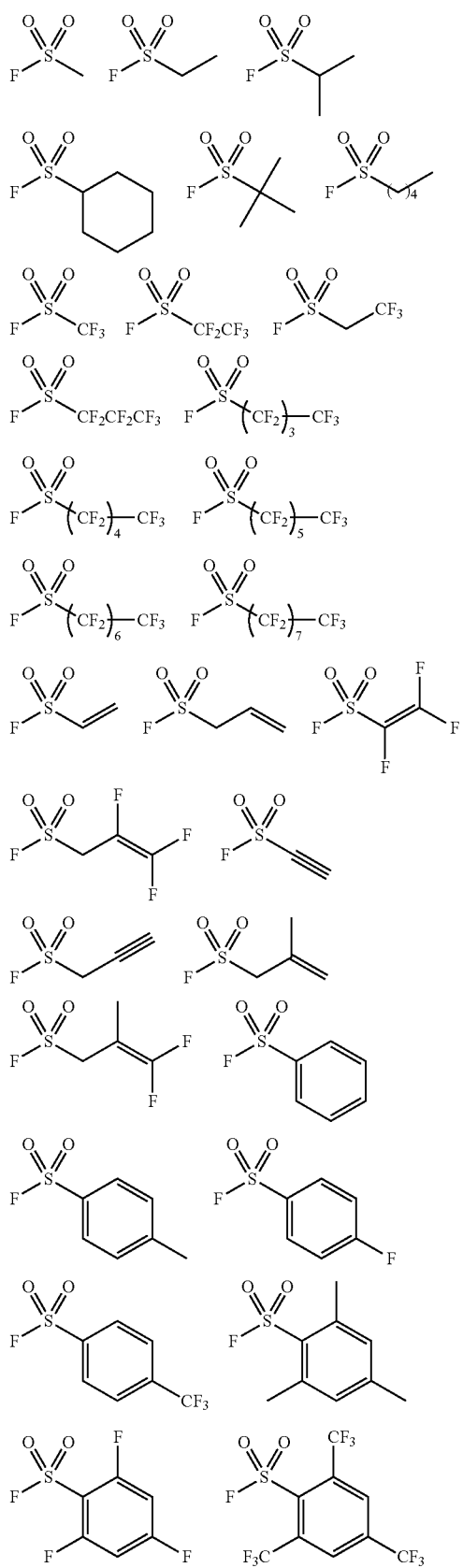
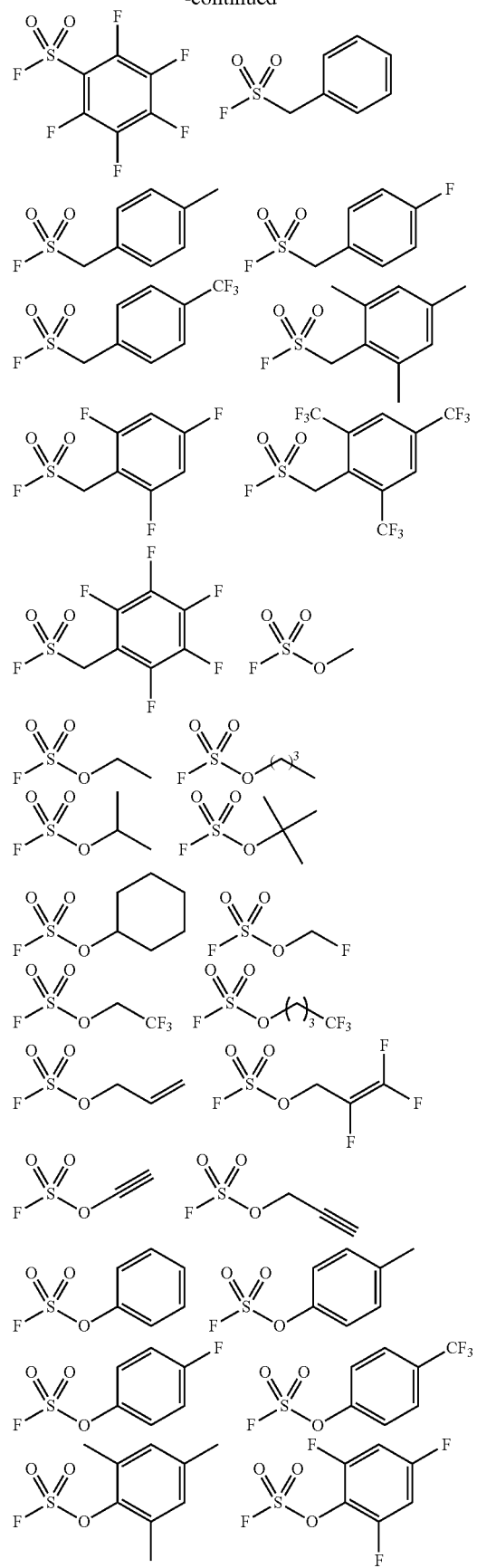

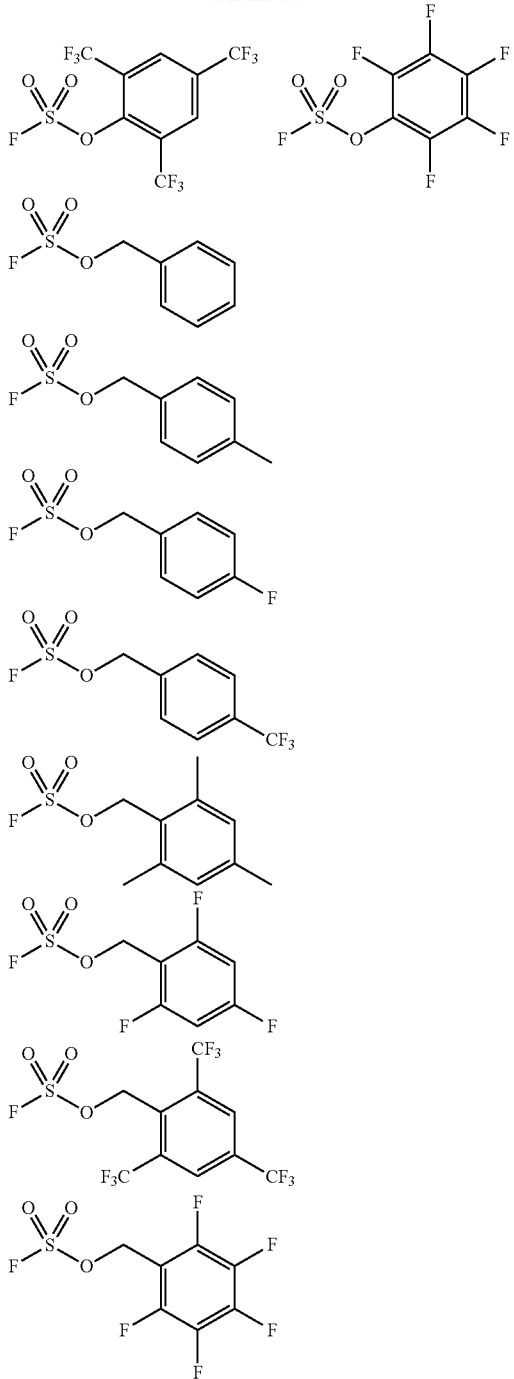

Especially, $R_1$ in the formula (A) is preferably a linear alkyl group having 1 to 8 carbon atoms such as a methyl, ethyl, or butyl group each being optionally substituted with fluorine; a phenyl group, a tolyl group, or a benzyl group each being optionally substituted with, e.g., fluorine or a trifluoromethyl group; or a vinyl group, an allyl group, a methallyl group, an ethynyl group, or a propargyl group each being optionally substituted with fluorine from the viewpoint of characteristics, such as cycle characteristics and battery expansion, and is further preferably a linear alkyl group such as a methyl, ethyl, or butyl group each being optionally substituted with fluorine. Further, n is preferably 0 from the viewpoint of improvement of the characteristics.

The compounds represented by the formula (A) may be used alone or two or more types may be used in an arbitrary combination and in an arbitrary ratio. With respect to the amount of the compound represented by the formula (A) incorporated into the nonaqueous electrolyte solution, there is no particular limitation, and the amount is arbitrary provided it does not significantly impair the effects of the present invention, but the concentration of the compound contained in the nonaqueous electrolyte solution (100% by mass) is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, most preferably 1% by mass or less. When the concentration is within the above range, it is likely that the resultant nonaqueous electrolyte battery exhibits a satisfactory effect to improve the cycle characteristics, and that the battery avoids a disadvantage in that the high-temperature storage characteristics become poor to increase the amount of the gas generated, lowering the discharge capacity maintaining ratio or causing battery expansion.

Among the compounds having a fluorosulfonyl structure ($-SO_2F$), a fluorosulfonate and lithium bis(fluorosulfonyl) imide are preferred, lithium fluorosulfonate and lithium bis(fluorosulfonyl)imide are further preferred, and lithium fluorosulfonate is especially preferred.

1-1-2. Difluorophosphate

The difluorophosphate is represented by the general formula (E):

$$X_2(F_2PO_2)_m \qquad (E)$$

wherein $X_2$ represents a counter cation of the fluorophosphate, and m represents a valence of the counter cation.

With respect to the counter cation of the difluorophosphate, there is no particular limitation, and examples thereof include lithium, sodium, potassium, rubidium, cesium, magnesium, calcium, barium, and an ammonium represented by $NR_{11}R_{12}R_{13}R_{14}$ (wherein each of $R_{11}$ to $R_{14}$ independently represents a hydrogen atom or an organic group having 1 to 12 carbon atoms).

With respect to the organic groups having 1 to 12 carbon atoms and being represented by $R_{11}$ to $R_{14}$ in the above ammonium, there is no particular limitation, but examples thereof include a hydrogen atom, an alkyl group optionally substituted with a halogen atom, a cycloalkyl group optionally substituted with a halogen atom or an alkyl group, an aryl group optionally substituted with a halogen atom or an alkyl group, and a nitrogen atom-containing heterocyclic group optionally having a substituent. Of these, each of $R_{11}$ to $R_{14}$ is independently preferably a hydrogen atom, an alkyl group, a cycloalkyl group, or a nitrogen atom-containing heterocyclic group.

Specific examples of difluorophosphates include lithium difluorophosphate, sodium difluorophosphate, and potassium difluorophosphate, and preferred is lithium difluorophosphate.

The difluorophosphates may be used alone or two or more types may be used in an arbitrary combination and in an arbitrary ratio. With respect to the amount of the difluorophosphate incorporated, there is no particular limitation, and the amount is arbitrary provided it does not significantly impair the effects of the present invention, but the concentration of the difluorophosphate contained in the nonaqueous electrolyte solution (100% by mass) is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, most preferably 1% by mass or less. When the concentration is within the above range, it is likely that the resultant nonaqueous electrolyte battery exhibits a satisfactory effect to improve the cycle characteristics. Further, when the concentration is within the above range, it is likely that the battery is improved in the high-temperature storage characteristics, so that the amount of the gas generated is reduced, avoiding the occurrence of a lowering of the discharge capacity maintaining ratio or battery expansion.

1-1-4. Isocyanate Compound

With respect to the type of the isocyanate compound, there is no particular limitation as long as it is a compound having an isocyanate group in the molecule thereof.

I. Hydrocarbon Monoisocyanate Compound

Specific examples of hydrocarbon monoisocyanate compounds include methyl isocyanate, ethyl isocyanate, propyl isocyanate, isopropyl isocyanate, butyl isocyanate, tert-butyl isocyanate, pentyl isocyanate, hexyl isocyanate, cyclohexyl isocyanate, phenyl isocyanate, and fluorophenyl isocyanate.

II. Hydrocarbon Diisocyanate Compound

Specific examples of hydrocarbon diisocyanate compounds include monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-diisocyanatopropane, 1,4-diisocyanato-2-butene, 1,4-diisocyanato-2-fluorobutane, 1,4-diisocyanato-2,3-difluorobutane, 1,5-diisocyanato-2-pentene, 1,5-diisocyanato-2-methylpentane, 1,6-diisocyanato-2-hexene, 1,6-diisocyanato-3-hexene, 1,6-diisocyanato-3-fluorohexane, 1,6-diisocyanato-3,4-difluorohexane, toluene diisocyanate, xylene diisocyanate, tolylene diisocyanate, 1,2-bis(isocyanatomethyl)cyclohexane, 1,3-bis(isocyanatomethyl)cyclohexane, 1,4-bis(isocyanatomethyl)cyclohexane, 1,2-diisocyanatocyclohexane, 1,3-diisocyanatocyclohexane, 1,4-diisocyanatocyclohexane, dicyclohexylmethane-1,1'-diisocyanate, dicyclohexylmethane-2,2'-diisocyanate, dicyclohexylmethane-3,3'-diisocyanate, dicyclohexylmethane-4,4'-diisocyanate, bicyclo[2.2.1]heptane-2,5-diylbis(methyl isocyanate), bicyclo[2.2.1]heptane-2,6-diylbis(methyl isocyanate), isophorone diisocyanate, carbonyl diisocyanate, 1,4-diisocyanatobutane-1,4-dione, 1,5-diisocyanatopentane-1,5-dione, 2,2,4-trimethylhexamethylene diisocyanate, and 2,4,4-trimethylhexamethylene diisocyanate.

III. Isocyanate Compound Having a Carbon-Carbon Unsaturated Bond

Specific examples of isocyanate compounds having a carbon-carbon unsaturated bond include monoisocyanate compounds having a carbon-carbon unsaturated bond, such as vinyl isocyanate, allyl isocyanate, ethynyl isocyanate, and propynyl isocyanate.

IV. Isocyanate Compound Represented by the General Formula (C)

The isocyanate compound represented by the general formula (C) has an —$SO_2$—NCO structure.

[Chemical formula 6]

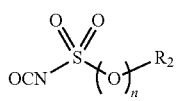

(C)

In the formula (C), each $R_2$ independently represents an alkyl group, an alkenyl group, or an alkynyl group having 1 to 10 carbon atoms and being optionally substituted with a halogen atom, or an aromatic hydrocarbon group having 6 to 20 carbon atoms and being optionally substituted with a halogen atom, or an isocyanate group, or a halogen, and n represents an integer of 0 to 1.

In the formula (C), when $R_2$ is an alkyl group having 1 to 10 carbon atoms, specific examples of the alkyl groups include linear or branched alkyl groups such as a methyl group, an ethyl group, a n-propyl group, an i-propyl group, a n-butyl group, a sec-butyl group, a tert-butyl group, n-pentyl, n-hexyl, n-heptyl, and n-octyl; alkyl groups substituted with fluorine; and cyclic alkyl groups such as a cyclopropyl group, a cyclopentyl group, and a cyclohexyl group.

In the formula (C), when $R_2$ is an alkenyl group, $R_2$ is preferably an alkenyl group having 2 to 6 carbon atoms, Specific examples of the alkenyl groups include a vinyl group, an allyl group, a methallyl group, a 1-propenyl group, a butenyl group, and a pentenyl group, and a vinyl group, an allyl group, and a methallyl group, each of which is substituted with fluorine.

In the formula (C), when $R_2$ is an alkynyl group, $R_2$ is preferably an alkynyl group having 2 to 6 carbon atoms. Specific examples of the alkynyl groups include an ethynyl group, a propargyl group, a 1-propynyl group, a butynyl group, and a hexynyl group, and an ethynyl group, a propargyl group, and a 1-propynyl group, each of which is substituted with fluorine.

In the formula (C), specific examples of $R_2$ that is an aromatic hydrocarbon group having 6 to 20 carbon atoms and being optionally substituted with a halogen atom, include a phenyl group, a tolyl group, a benzyl group, and a phenethyl group, and a phenyl group, a tolyl group, a benzyl group, and a phenethyl group, each of which is substituted with, e.g., fluorine or a trifluoromethyl group.

As examples of the compounds represented by the formula (C), there can be mentioned the following compounds. The present invention is not limited to the compounds shown below.

[Chemical formula 7]

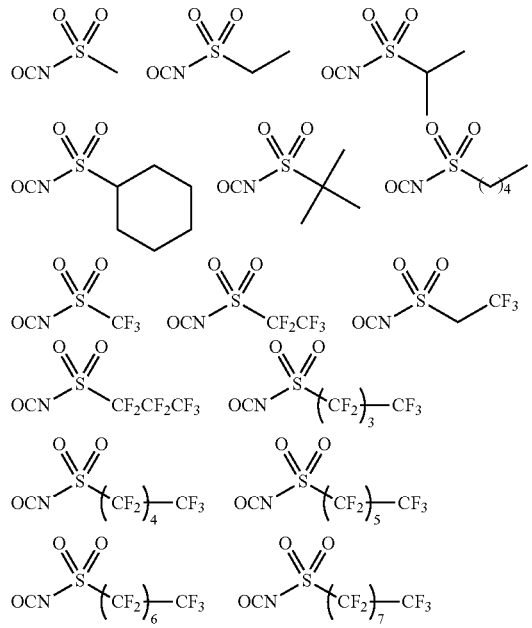

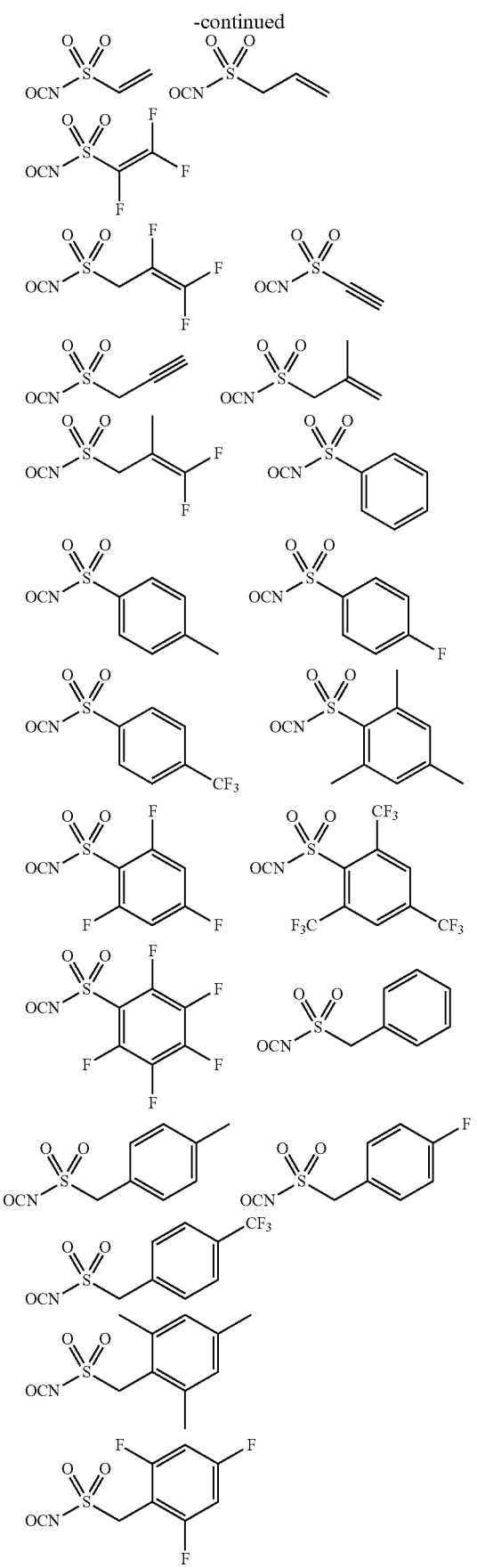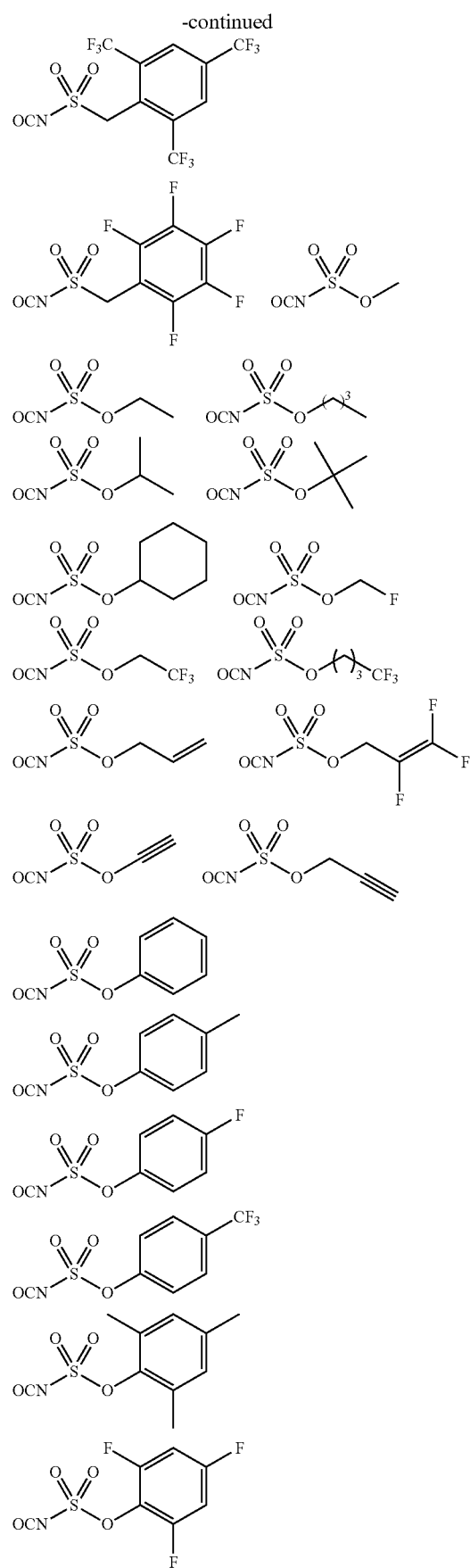

-continued

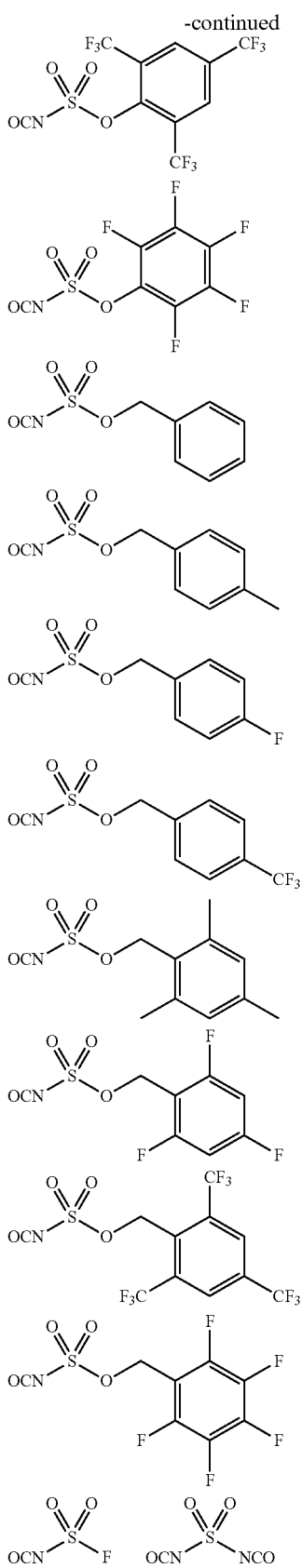

Of these, monoisocyanate compounds having a branched and/or carbon-carbon unsaturated bond such as isopropyl isocyanate, tert-butyl isocyanate, cyclohexyl isocyanate, vinyl isocyanate, allyl isocyanate, ethynyl isocyanate, and propynyl isocyanate;

hydrocarbon diisocyanate compounds such as monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-bis(isocyanatomethyl)cyclohexane, dicyclohexylmethane-4,4'-diisocyanate, bicyclo[2.2.1]heptan-2,5-diyl bis(methyl isocyanate), bicyclo[2.2.1]heptan-2,6-diyl bis(methyl isocyanate), isophorone diisocyanate, 2,2,4-trimethylhexamethylene diisocyanate, and 2,4,4-trimethylhexamethylene diisocyanate; and isocyanate compounds represented by the general formula (C) are preferred from the viewpoint of improving the cycle characteristics and storage characteristics.

Further preferred are isopropyl isocyanate, tert-butyl isocyanate, cyclohexyl isocyanate, allyl isocyanate, hexamethylene diisocyanate, and 1,3-bis(isocyanatomethyl)cyclohexane, and the isocyanate compounds represented by the general formula (C) are preferably compounds represented by the following structures.

[Chemical formula 8]

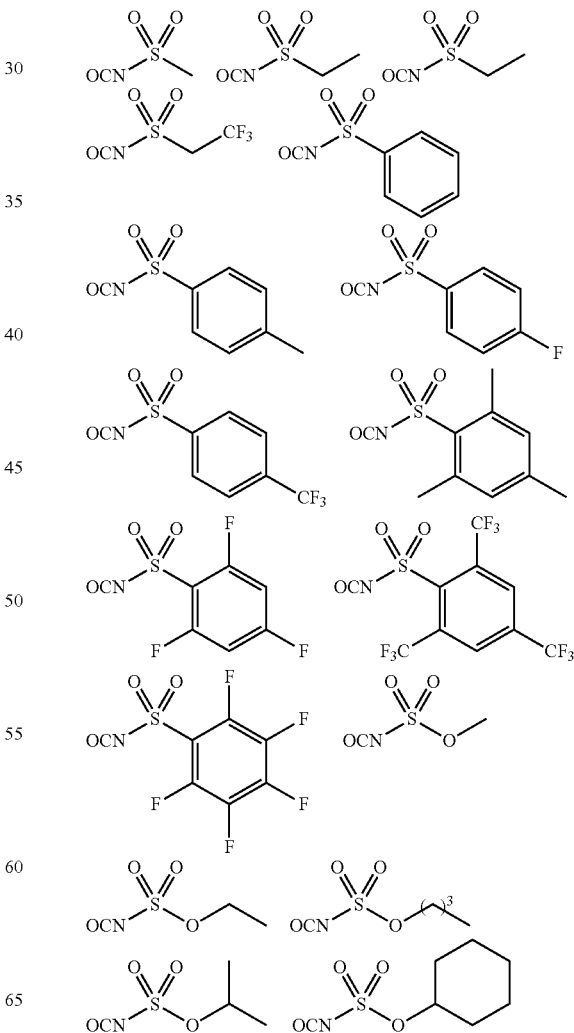

-continued

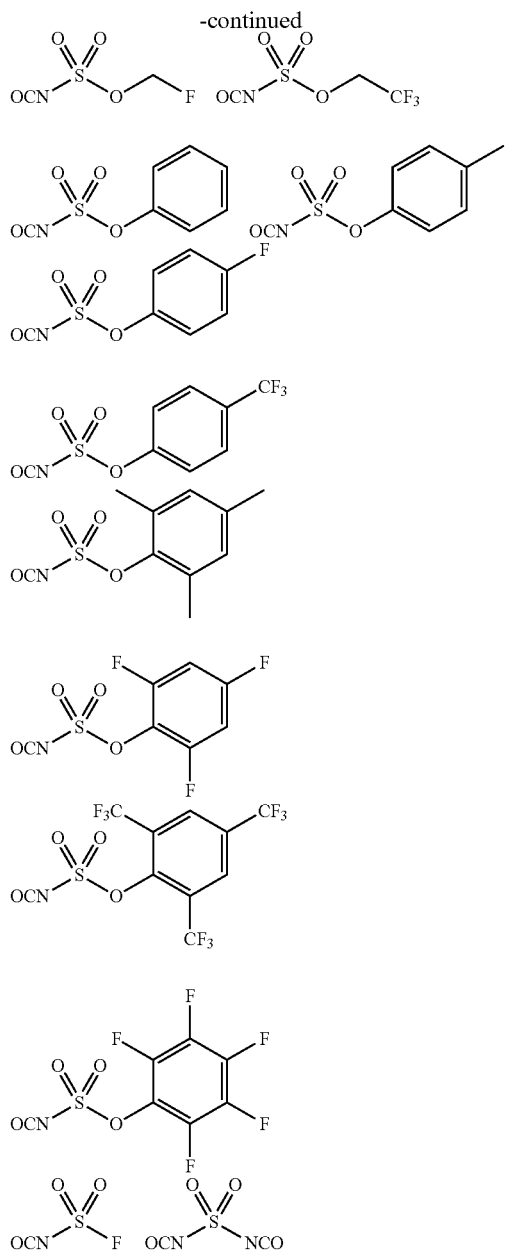

Especially preferred are tert-butyl isocyanate, hexamethylene diisocyanate, 1,3-bis(isocyanatomethyl)cyclohexane, toluenesulfonyl isocyanate, and diisocyanatosulfone, and most preferred are tert-butyl isocyanate, hexamethylene diisocyanate, and 1,3-bis(isocyanatomethyl)cyclohexane because excellent balance of the battery characteristics is obtained. Further, as a hydrocarbon diisocyanate compound, an isocyanate compound having a branched chain is preferred.

Further, the isocyanate compound used in the present invention may be a trimer compound derived from a compound having at least two isocyanate groups in the molecule thereof, or an aliphatic polyisocyanate having a polyhydric alcohol added to the above trimer. For example, there can be mentioned biuret, isocyanurate, adduct, and modified polyisocyanate of a bifunctional type represented by basic structures of the general formulae (1-2-1) to (1-2-4) below (in the general formulae (1-2-1) to (1-2-4) below, each of R and R' is independently an arbitrary hydrocarbon group).

[Chemical formula 9]

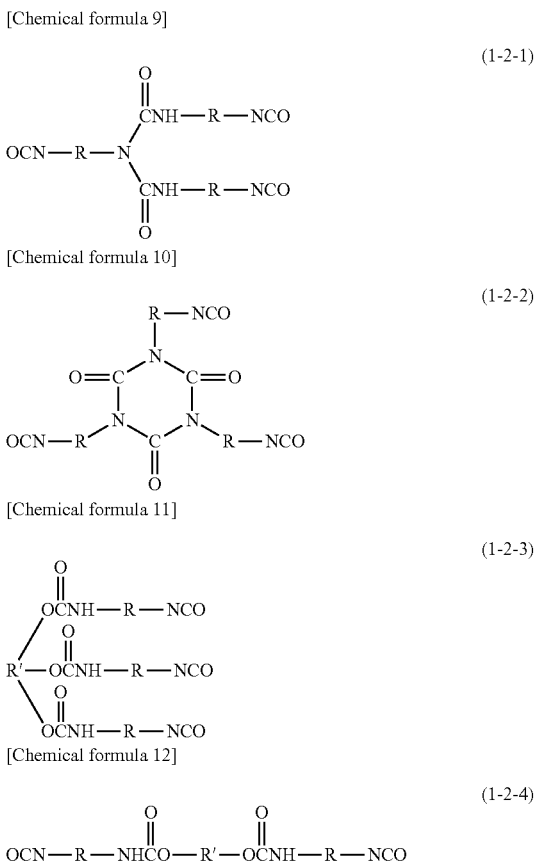

[Chemical formula 10]

[Chemical formula 11]

[Chemical formula 12]

The compound having at least two isocyanate groups in the molecule thereof used in the present invention includes a so-called blocked isocyanate having the storage stability improved by being blocked by a blocking agent. Examples of blocking agents include alcohols, phenols, organic amines, oximes, and lactams, and specific examples include n-butanol, phenol, tributylamine, diethylethanolamine, methyl ethyl ketoxime, and ∈-caprolactam.

It is also preferred that a metal catalyst such as dibutyltin dilaurate, or an amine catalyst such as 1,8-diazabicyclo[5.4.0]undecene-7, is used for the purpose of promoting the reaction caused by the compound having at least two isocyanate groups in the molecule thereof so as to obtain a higher effect.

Further, the compounds having an isocyanate group may be used alone or two or more types may be used in an arbitrary combination and ratio.

With respect to the amount of the compound having an isocyanate group incorporated into the entire nonaqueous electrolyte solution in the present invention, there is no particular limitation, and the amount is arbitrary provided it does not significantly impair the effects of the present invention, but the concentration of the compound contained in the nonaqueous electrolyte solution in the present invention is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, especially preferably 1% by mass or less, most preferably 0.5% by mass or less.

When the above-mentioned range is satisfied, the effects for, for example, output characteristics, load characteristics, low temperature characteristics, cycle characteristics, high-temperature storage characteristics, and battery expansion are further improved.

1-2. Cyclic Carbonate Having a Carbon-Carbon Unsaturated Bond, Cyclic Carbonate Having a Fluorine Atom, Acid Anhydride Compound, and Cyclic Sulfonic Ester Compound It is preferred that the nonaqueous electrolyte solution in the present invention contains, in addition to the at least one compound selected from the group consisting of a compound having a fluorosulfonyl structure (—$SO_2F$), a difluorophosphate, and an isocyanate compound, further at least one compound selected from the group consisting of a cyclic carbonate having a carbon-carbon unsaturated bond, a cyclic carbonate having a fluorine atom, an acid anhydride compound, a cyclic sulfonic ester compound, and a compound having a cyano group from the viewpoint of improving the battery characteristics.

1-2-1. Cyclic Carbonate Having a Carbon-Carbon Unsaturated Bond

With respect to the cyclic carbonate having a carbon-carbon unsaturated bond (hereinafter, may be referred to as "unsaturated cyclic carbonate"), there is no particular limitation provided it is a cyclic carbonate having a carbon-carbon double bond or a carbon-carbon triple bond, and an arbitrary unsaturated carbonate can be used. A cyclic carbonate having an aromatic ring is involved in the unsaturated cyclic carbonate.

Examples of unsaturated cyclic carbonates include vinylene carbonates, ethylene carbonates substituted with an aromatic ring or a substituent having a carbon-carbon double bond or a carbon-carbon triple bond, phenyl carbonates, vinyl carbonates, allyl carbonates, and catechol carbonates.

Examples of vinylene carbonates include vinylene carbonate, methylvinylene carbonate, 4,5-dimethylvinylene carbonate, phenylvinylene carbonate, 4,5-diphenylvinylene carbonate, vinylvinylene carbonate, 4,5-divinylvinylene carbonate, allylvinylene carbonate, 4,5-diallylvinylene carbonate, 4-fluorovinylene carbonate, 4-fluoro-5-methylvinylene carbonate, 4-fluoro-5-phenylvinylene carbonate, 4-fluoro-5-vinylvinylene carbonate, and 4-allyl-5-fluorovinylene carbonate.

Specific examples of ethylene carbonates substituted with an aromatic ring or a substituent having a carbon-carbon double bond or a carbon-carbon triple bond include vinylethylene carbonate, 4,5-divinylethylene carbonate, 4-methyl-5-vinylethylene carbonate, 4-allyl-5-vinylethylene carbonate, ethynylethylene carbonate, 4,5-diethynylethylene carbonate, 4-methyl-5-ethynylethylene carbonate, 4-vinyl-5-ethynylethylene carbonate, 4-allyl-5-ethynylethylene carbonate, phenylethylene carbonate, 4,5-diphenylethylene carbonate, 4-phenyl-5-vinylethylene carbonate, 4-allyl-5-phenylethylene carbonate, allylethylene carbonate, 4,5-diallylethylene carbonate, and 4-methyl-5-allylethylene carbonate.

Of these, preferred examples of unsaturated cyclic carbonates include vinylene carbonate, methylvinylene carbonate, 4,5-dimethylvinylene carbonate, vinylvinylene carbonate, 4,5-vinylvinylene carbonate, allylvinylene carbonate, 4,5-diallylvinylene carbonate, vinylethylene carbonate, 4,5-divinylethylene carbonate, 4-methyl-5-vinylethylene carbonate, allylethylene carbonate, 4,5-diallylethylene carbonate, 4-methyl-5-allylethylene carbonate, 4-allyl-5-vinylethylene carbonate, ethynylethylene carbonate, 4,5-diethynylethylene carbonate, 4-methyl-5-ethynylethylene carbonate, and 4-vinyl-5-ethynylethylene carbonate.

Further, vinylene carbonate, vinylethylene carbonate, and ethynylethylene carbonate are especially preferred because they form a further stable interfacial protective film.

With respect to the molecular weight of the unsaturated cyclic carbonate, there is no particular limitation, and the molecular weight is arbitrary provided it does not significantly impair the effects of the present invention. The molecular weight is preferably 80 to 250. When the molecular weight is in this range, the solubility of the unsaturated cyclic carbonate in the nonaqueous electrolyte solution is easily secured, so that the effects of the present invention are likely to be satisfactorily exhibited. The molecular weight of the unsaturated cyclic carbonate is more preferably 85 to 150. With respect to the method for producing the unsaturated cyclic carbonate, there is no particular limitation, and the unsaturated cyclic carbonate can be produced by a known method arbitrarily selected.

The unsaturated cyclic carbonates may be used alone or two or more types may be used in an arbitrary combination and ratio. With respect to the amount of the unsaturated cyclic carbonate incorporated, there is no particular limitation, and the amount is arbitrary provided it does not significantly impair the effects of the present invention, but the amount of the unsaturated cyclic carbonate in the nonaqueous electrolyte solution (100% by mass) is generally 0.001% by mass or more, preferably 0.01% by mass or more, more preferably 0.1% by mass or more, and is generally 10% by mass or less, preferably 5% by mass or less, more preferably 3% by mass or less. When the amount is within the above range, it is likely that the resultant nonaqueous electrolyte battery exhibits a satisfactory effect to improve the cycle characteristics, and that the battery avoids a disadvantage in that the high-temperature storage characteristics become poor to increase the amount of the gas generated, lowering the discharge capacity maintaining ratio.

1-2-2. Cyclic Carbonate Having a Fluorine Atom

As examples of cyclic carbonate compounds having a fluorine atom, there can be mentioned fluorinated cyclic carbonates having an alkylene group having 2 to 6 carbon atoms and derivatives thereof, such as fluorinated ethylene carbonate and derivatives thereof. As examples of derivatives of the fluorinated ethylene carbonate, there can be mentioned fluorinated ethylene carbonate substituted with an alkyl group (for example, an alkyl group having 1 to 4 carbon atoms). Of these, preferred are ethylene carbonate having 1 to 8 fluorine atoms and derivatives thereof.

Specific examples include monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, and 4,4-difluoro-5,5-dimethylethylene carbonate.

Of these, at least one selected from the group consisting of monofluoroethylene carbonate, 4,4-difluoroethylene carbonate, and 4,5-difluoroethylene carbonate is more preferred from the viewpoint of imparting high ionic conductive properties and advantageously forming an interfacial protective film.

The cyclic carbonate compounds having a fluorine atom may be used alone or two or more types may be used in an arbitrary combination and ratio.

The cyclic carbonate compounds having a fluorine atom may be used alone or two or more types may be used in an arbitrary combination and ratio. With respect to the amount of the halogenated cyclic carbonate incorporated into the entire nonaqueous electrolyte solution of the present invention, there is no particular limitation, and the amount is arbitrary provided it does not significantly impair the effects of the present invention, but the amount in the nonaqueous electrolyte solution (100% by mass) is generally 0.001% by mass or more, preferably 0.01% by mass or more, more preferably 0.1% by mass or more, and is generally 10% by mass or less, preferably 5% by mass or less, more preferably 3% by mass or less. The monofluoroethylene carbonate may be used as a solvent, and, in such a case, the amount is not limited to that in the above range.

1-2-3. Acid Anhydride Compound

The acid anhydride compound is not limited to carboxylic anhydride, sulfuric anhydride, nitric anhydride, sulfonic anhydride, phosphoric acid anhydride, phosphorous acid anhydride, a cyclic acid anhydride, and a linear acid anhydride, and, with respect to the structure of the acid anhydride compound, there is no particular limitation provided the compound is an acid anhydride compound.

Specific examples of acid anhydride compounds include malonic anhydride, succinic anhydride, glutaric anhydride, adipic anhydride, maleic anhydride, citraconic anhydride, 2,3-dimethylmaleic anhydride, glutaconic anhydride, itaconic anhydride, phthalic anhydride, phenylmaleic anhydride, 2,3-diphenylmaleic anhydride, cyclohexane-1,2-dicarboxylic anhydride, 4-cyclohexene-1,2-dicarboxylic anhydride, 3,4,5,6-tetrahydrophthalic anhydride, 4,4'-oxydiphthalic anhydride, 5-norbornene-2,3-dicarboxylic anhydride, methyl-5-norbornene-2,3-dicarboxylic anhydride, phenylsuccinic anhydride, 2-phenylglutaric anhydride, allylsuccinic anhydride, 2-buten-11-ylsuccinic anhydride, (2-methyl-2-propenyl)succinic anhydride, tetrafluorosuccinic anhydride, diacetyltartaric anhydride, bicyclo[2.2.2]oct-7-ene-2,3,5,6-tetracarboxylic dianhydride, 5-(2,5-dioxotetrahydrofuryl)-3-methyl-3-cyclohexene-1,2-dicarboxylic anhydride, methacrylic anhydride, acrylic anhydride, crotonic anhydride, methanesulfonic anhydride, trifluoromethanesulfonic anhydride, nonafluorobutanesulfonic anhydride, and acetic anhydride.

Of these, succinic anhydride, maleic anhydride, citraconic anhydride, phenylmaleic anhydride, bicyclo[2.2.2]oct-7-ene-2,3,5,6-tetracarboxylic dianhydride, 5-(2,5-dioxotetrahydrofuryl)-3-methyl-3-cyclohexene-1,2-dicarboxylic anhydride, allylsuccinic anhydride, acetic anhydride, methacrylic anhydride, acrylic anhydride, and methanesulfonic anhydride are especially preferred.

The acid anhydride compounds may be used alone or two or more types may be used in an arbitrary combination and ratio.

With respect to the amount of the acid anhydride compound incorporated into the entire nonaqueous electrolyte solution of the present invention, there is no particular limitation, and the amount is arbitrary provided it does not significantly impair the effects of the present invention, but the amount in the nonaqueous electrolyte solution (100% by mass) is generally 0.001% by mass or more, preferably 0.01% by mass or more, more preferably 0.1% by mass or more, and is generally 10% by mass or less, preferably 5% by mass or less, more preferably 3% by mass or less, further preferably 1% by mass or less, especially preferably 0.5% by mass or less.

When the above-mentioned range is satisfied, the effects for, for example, output characteristics, load characteristics, low temperature characteristics, cycle characteristics, and high-temperature storage characteristics are further improved.

1-2-4. Cyclic Sulfonic Ester Compound

With respect to the type of the cyclic sulfonic ester compound, there is no particular limitation.

Specific examples of cyclic sulfonic esters include:

sultone compounds such as 1,3-propane sultone, 1-fluoro-1,3-propane sultone, 2-fluoro-1,3-propane sultone, 3-fluoro-1,3-propane sultone, 1-methyl-1,3-propane sultone, 2-methyl-1,3-propane sultone, 3-methyl-1,3-propane sultone, 1-propene-1,3-sultone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butane sultone, 1-fluoro-1,4-butane sultone, 2-fluoro-1,4-butane sultone, 3-fluoro-1,4-butane sultone, 4-fluoro-1,4-butane sultone, 1-methyl-1,4-butane sultone, 2-methyl-1,4-butane sultone, 3-methyl-1,4-butane sultone, 4-methyl-1,4-butane sultone, 1-butene-1,4-sultone, 2-butene-1,4-sultone, 3-butene-1,4-sultone, 1-fluoro-1-butene-1,4-sultone, 2-fluoro-1-butene-1,4-sultone, 3-fluoro-1-butene-1,4-sultone, 4-fluoro-1-butene-1,4-sultone, 1-fluoro-2-butene-1,4-sultone, 2-fluoro-2-butene-1,4-sultone, 3-fluoro-2-butene-1,4-sultone, 4-fluoro-2-butene-1,4-sultone, 1-fluoro-3-butene-1,4-sultone, 2-fluoro-3-butene-1,4-sultone, 3-fluoro-3-butene-1,4-sultone, 4-fluoro-3-butene-1,4-sultone, 1-methyl-1-butene-1,4-sultone, 2-methyl-1-butene-1,4-sultone, 3-methyl-1-butene-1,4-sultone, 4-methyl-1-butene-1,4-sultone, 1-methyl-2-butene-1,4-sultone, 2-methyl-2-butene-1,4-sultone, 3-methyl-2-butene-1,4-sultone, 4-methyl-2-butene-1,4-sultone, 1-methyl-3-butene-1,4-sultone, 2-methyl-3-butene-1,4-sultone, 3-methyl-3-butene-1,4-sultone, 4-methyl-3-butene-1,4-sultone, 1,5-pentane sultone, 1-fluoro-1,5-pentane sultone, 2-fluoro-1,5-pentane sultone, 3-fluoro-1,5-pentane sultone, 4-fluoro-1,5-pentane sultone, 5-fluoro-1,5-pentane sultone, 1-methyl-1,5-pentane sultone, 2-methyl-1,5-pentane sultone, 3-methyl-1,5-pentane sultone, 4-methyl-1,5-pentane sultone, 5-methyl-1,5-pentane sultone, 1-pentene-1,5-sultone, 2-pentene-1,5-sultone, 3-pentene-1,5-sultone, 4-pentene-1,5-sultone, 1-fluoro-1-pentene-1,5-sultone, 2-fluoro-1-pentene-1,5-sultone, 3-fluoro-1-pentene-1,5-sultone, 4-fluoro-1-pentene-1,5-sultone, 5-fluoro-1-pentene-1,5-sultone, 1-fluoro-2-pentene-1,5-sultone, 2-fluoro-2-pentene-1,5-sultone, 3-fluoro-2-pentene-1,5-sultone, 4-fluoro-2-pentene-1,5-sultone, 5-fluoro-2-pentene-1,5-sultone, 1-fluoro-3-pentene-1,5-sultone, 2-fluoro-3-pentene-1,5-sultone, 3-fluoro-3-pentene-1,5-sultone, 4-fluoro-3-pentene-1,5-sultone, 5-fluoro-3-pentene-1,5-sultone, 1-fluoro-4-pentene-1,5-sultone, 2-fluoro-4-pentene-1,5-sultone, 3-fluoro-4-pentene-1,5-sultone, 4-fluoro-4-pentene-1,5-sultone, 5-fluoro-4-pentene-1,5-sultone, 1-methyl-1-pentene-1,5-sultone, 2-methyl-1-pentene-1,5-sultone, 3-methyl-1-pentene-1,5-sultone, 4-methyl-1-pentene-1,5-sultone, 5-methyl-1-pentene-1,5-sultone, 1-methyl-2-pentene-1,5-sultone, 2-methyl-2-pentene-1,5-sultone, 3-methyl-2-pentene-1,5-sultone, 4-methyl-2-pentene-1,5-sultone, 5-methyl-2-pentene-1,5-sultone, 1-methyl-3-pentene-1,5-sultone, 2-methyl-3-pentene-1,5-sultone, 3-methyl-3-pentene-1,5-sultone, 4-methyl-3-pentene-1,5-sultone, 5-methyl-3-pentene-1,5-sultone, 1-methyl-4-pentene-1,5-sultone, 2-methyl-4-pentene-1,5-sultone, 3-methyl-4-pentene-1,5-sultone, 4-methyl-4-pentene-1,5-sultone, and 5-methyl-4-pentene-1,5-sultone;

sulfate compounds such as methylene sulfate, ethylene sulfate, and propylene sulfate;

disulfonate compounds such as methylenemethane disulfonate and ethylenemethane disulfonate;

nitrogen-containing compounds such as 1,2,3-oxathiazolidine-2,2-dioxide, 3-methyl-1,2,3-oxathiazolidine-2,2-dioxide, 3H-1,2,3-oxathiazole-2,2-dioxide, 5H-1,2,3-oxathiazole-2,2-dioxide, 1,2,4-oxathiazolidine-2,2-dioxide, 4-methyl-1,2,4-oxathiazolidine-2,2-dioxide, 3H-1,2,4-oxathiazole-2,2-dioxide, 5H-1,2,4-oxathiazole-2,2-dioxide, 1,2,5-oxathiazolidine-2,2-dioxide, 5-methyl-1,2,5-oxathiazolidine-2,2-dioxide, 3H-1,2,5-oxathiazole-2,2-dioxide, 5H-1,2,5-oxathiazole-2,2-dioxide, 1,2,3-oxathiazinane-2,2-dioxide, 3-methyl-1,2,3-oxathiazinane-2,2-dioxide, 5,6-dihydro-1,2,3-oxathiazine-2,2-dioxide, 1,2,4-oxathiazinane-2,2-dioxide, 4-methyl-1,2,4-oxathiazinane-2,2-dioxide, 5,6-dihydro-1,2,4-oxathiazine-2,2-dioxide, 3,6-dihydro-1,2,4-oxathiazine-2,2-dioxide, 3,4-dihydro-1,2,4-oxathiazine-2,2-dioxide, 1,2,5-oxathiazinane-2,2-dioxide, 5-methyl-1,2,5-oxathiazinane-2,2-dioxide, 5,6-dihydro-1,2,5-oxathiazine-2,2-dioxide, 3,6-dihydro-1,2,5-oxathiazine-2,2-dioxide, 3,4-dihydro-1,2,5-oxathiazine-2,2-dioxide, 1,2,6-oxathiazinane-2,2-dioxide, 6-methyl-1,2,6-oxathiazinane-2,2-dioxide, 5,6-dihydro-1,2,6-oxathiazine-2,2-dioxide, 3,4-dihydro-1,2,6-oxathiazine-2,2-dioxide, and 5,6-dihydro-1,2,6-oxathiazine-2,2-dioxide; and phosphorus-containing compounds such as 1,2,3-oxathiaphosphorane-2,2-dioxide, 3-methyl-1,2,3-oxathiaphosphorane-2,2-dioxide, 3-methyl-1,2,3-oxathiaphosphorane-2,2,3-trioxide, 3-methoxy-1,2,3-oxathiaphosphorane-2,2,3-trioxide, 1,2,4-oxathiaphosphorane-2,2-dioxide, 4-methyl-1,2,4-oxathiaphosphorane-2,2-dioxide, 4-methyl-1,2,4-oxathiaphosphorane-2,2,4-trioxide, 4-methoxy-1,2,4-oxathiaphosphorane-2,2,4-trioxide, 1,2,5-oxathiaphosphorane-2,2-dioxide, 5-methyl-1,2,5-oxathiaphosphorane-2,2-dioxide, 5-methyl-1,2,5-oxathiaphosphorane-2,2,5-trioxide, 5-methoxy-1,2,5-oxathiaphosphorane-2,2,5-trioxide, 1,2,3-oxathiaphosphinane-2,2-dioxide, 3-methyl-1,2,3-oxathiaphosphinane-2,2-dioxide, 3-methyl-1,2,3-oxathiaphosphinane-2,2,3-trioxide, 3-methoxy-1,2,3-oxathiaphosphinane-2,2,3-trioxide, 1,2,4-oxathiaphosphinane-2,2-dioxide, 4-methyl-1,2,4-oxathiaphosphinane-2,2-dioxide, 4-methyl-1,2,4-oxathiaphosphinane-2,2,3-trioxide, 4-methyl-1,5,2,4-dioxathiaphosphinane-2,4-dioxide, 4-methoxy-1,5,2,4-dioxathiaphosphinane-2,4-dioxide, 3-methoxy-1,2,4-oxathiaphosphinane-2,2,3-trioxide, 1,2,5-oxathiaphosphinane-2,2-dioxide, 5-methyl-1,2,5-oxathiaphosphinane-2,2-dioxide, 5-methyl-1,2,5-oxathiaphosphinane-2,2,3-trioxide, 5-methoxy-1,2,5-oxathiaphosphinane-2,2,3-trioxide, 1,2,6-oxathiaphosphinane-2,2-dioxide, 6-methyl-1,2,6-oxathiaphosphinane-2,2-dioxide, 6-methyl-1,2,6-oxathiaphosphinane-2,2,3-trioxide, and 6-methoxy-1,2,6-oxathiaphosphinane-2,2,3-trioxide.

Of these, 1,3-propane sultone, 1-fluoro-1,3-propane sultone, 2-fluoro-1,3-propane sultone, 3-fluoro-1,3-propane sultone, 1-propene-1,3-sultone, 1-fluoro-1-propene-1,3-sultone, 2-fluoro-1-propene-1,3-sultone, 3-fluoro-1-propene-1,3-sultone, 1,4-butane sultone, methylenemethane disulfonate, and ethylenemethane disulfonate are preferred from the viewpoint of improving the storage characteristics, and more preferred are 1,3-propane sultone, 1-fluoro-1,3-propane sultone, 2-fluoro-1,3-propane sultone, 3-fluoro-1,3-propane sultone, and 1-propene-1,3-sultone.

The cyclic sulfonic ester compounds may be used alone or two or more types may be used in an arbitrary combination and ratio. With respect to the amount of the cyclic sulfonic ester compound incorporated into the entire nonaqueous electrolyte solution of the present invention, there is no limitation, and the amount is arbitrary provided it does not significantly impair the effects of the present invention, but the amount in the nonaqueous electrolyte solution (100% by mass) is generally 0.001% by mass or more, preferably 0.01% by mass or more, more preferably 0.1% by mass or more, and is generally 10% by mass or less, preferably 5% by mass or less, more preferably 3% by mass or less, especially preferably 2% by mass or less, most preferably 1% by mass or less. When the above-mentioned range is satisfied, the effects for, for example, output characteristics, load characteristics, low temperature characteristics, cycle characteristics, and high-temperature storage characteristics are further improved.

1-2-5. Compound Having a Cyano Group

With respect to the type of the compound having a cyano group, there is no particular limitation as long as it is a compound having a cyano group in the molecule thereof.

Specific examples of compounds having a cyano group include:

compounds having one nitrile group such as acetonitrile, propionitrile, butyronitrile, isobutyronitrile, valeronitrile, isovaleronitrile, lauronitrile, 2-methylbutyronitrile, trimethylacetonitrile, hexanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile, 2-hexenenitrile, fluoroacetonitrile, difluoroacetonitrile, trifluoroacetonitrile, 2-fluoropropionitrile, 3-fluoropropionitrile, 2,2-difluoropropionitrile, 2,3-difluoropropionitrile, 3,3-difluoropropionitrile, 2,2,3-trifluoropropionitrile, 3,3,3-trifluoropropionitrile, 3,3'-oxydipropionitrile, 3,3'-thiodipropionitrile, 1,2,3-propanetricarbonitrile, 1,3,5-pentanetricarbonitrile, and pentafluoropropionitrile;

compounds having two nitrile groups such as malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, 3,3'-(ethylenedithio)dipropionitrile, and 3,9-bis(2-cyanoethyl)-2,4,8,10-tetraoxaspiro[5,5]undecane; and compounds having three cyano groups such as cyclohexanetricarbonitrile, triscyanoethylamine, triscyanoethoxypropane, tricyanoethylene, pentanetricarbonitrile, propanetricarbonitrile, and heptanetricarbonitrile.

Of these, lauronitrile, crotononitrile, succinonitrile, glutaronitrile, adiponitrile, pimelonitrile, suberonitrile, azelanitrile, sebaconitrile, undecanedinitrile, dodecanedinitrile, fumaronitrile, and 3,9-bis(2-cyanoethyl)-2,4,8,10-tetraoxaspiro[5,5]undecane are preferred from the viewpoint of improving the storage characteristics. Further, especially preferred are dinitrile compounds such as succinonitrile, glutaronitrile, adiponitrile, pimelonitrile, suberonitrile, azelanitrile, sebaconitrile, undecanedinitrile, dodecanedinitrile, fumaronitrile, and 3,9-bis(2-cyanoethyl)-2,4,8,10-tetraoxaspiro[5,5]undecane.

The nitrile compounds may be used alone or two or more types may be used in an arbitrary combination and ratio. With respect to the amount of the nitrile compound incorporated into the entire nonaqueous electrolyte solution of the present invention, there is no limitation, and the amount is arbitrary provided it does not significantly impair the effects of the present invention, but the amount in the nonaqueous electrolyte solution (100% by mass) is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, most preferably 1% by mass or less. When the above-mentioned range is satisfied, the effects for, for example, output characteristics, load characteristics, low temperature characteristics, cycle characteristics, and high-temperature storage characteristics are further improved.

1-3. Electrolyte

<Lithium Salt>

As an electrolyte, generally, a lithium salt is used. With respect to the lithium salt, there is no particular limitation, and an arbitrary lithium salt can be used provided it is known to be usable in the application of the electrolyte, and specific examples include the followings.

Examples include inorganic lithium salts such as $LiPF_6$, $LiBF_4$, $LiClO_4$, $LiAlF_4$, $LiSbF_6$, $LiTaF_6$, and $LiWF_7$;

lithium tungstates such as $LiWOF_5$;

lithium carboxylates such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$;

lithium sulfonates such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, and $CF_3CF_2CF_2CF_2SO_3Li$;

lithium imide salts such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, and $LiN(CF_3SO_2)(C_4F_9SO_2)$;

lithium methide salts such as $LiC(FSO_2)_3$, $LiC(CF_3SO_2)_3$, and $LiC(C_2F_5SO_2)_3$; lithium oxalatoborates such as lithium difluorooxalatoborate and lithium bis(oxalato)borate;

lithium oxalatophosphates such as lithium tetrafluorooxalatophosphate, lithium difluorobis(oxalato)phosphate, and lithium tris(oxalato)phosphate; and fluorine-containing organolithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$.

Of these, $LiPF_6$, $LiBF_4$, $LiSbF_6$, $LiTaF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, $LiPF_3(C_2F_5)_3$, and the like are especially preferred from the viewpoint of the effect of improving, e.g., output characteristics, high-rate charge/discharge characteristics, high-temperature storage characteristics, and cycle characteristics.

These lithium salts may be used alone or two or more types of them may be used in combination. Preferred examples of combinations of two or more types of lithium salts include a combination of $LiPF_6$ and $LiBF_4$, a combination of $LiPF_6$ and $LiN(FSO_2)_2$, and a combination of $LiPF_6$ and $FSO_3Li$, and these have an effect to improve the load characteristics or cycle characteristics.

In this case, with respect to the amount or concentration of the $LiBF_4$ or $FSO_3Li$ incorporated into the entire nonaqueous electrolyte solution (100% by mass), there is no limitation, and the amount is arbitrary provided it does not significantly impair the effects of the present invention, but the amount in the nonaqueous electrolyte solution of the present invention is generally 0.01% by mass or more, preferably 0.1% by mass or more, and is generally 30% by mass or less, preferably 20% by mass or less.

As another example, there can be mentioned the use of an inorganic lithium salt and an organolithium salt in combination, and the use of these salts in combination has an effect to suppress the deterioration due to high-temperature storage. As an organolithium salt, for example, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, and $LiPF_3(C_2F_5)_3$ are preferred. In this case, the proportion of the organolithium salt to the entire nonaqueous electrolyte solution (100% by mass) is preferably 0.1% by mass or more, especially preferably 0.5% by mass or more, and is preferably 30% by mass or less, especially preferably 20% by mass or less.

With respect to the concentration of the above lithium salt in the nonaqueous electrolyte solution, there is no particular limitation provided it does not significantly impair the effects of the present invention, but, from the viewpoint of rendering the electrical conductivity of the electrolyte solution being in an advantageous range to secure excellent battery performance, the total molar concentration of lithium in the nonaqueous electrolyte solution is preferably 0.3 mol/L or more, more preferably 0.4 mol/L or more, further preferably 0.5 mol/L or more, and is preferably 3 mol/L or less, more preferably 2.5 mol/L or less, further preferably 2.0 mol/L or less.

When the total molar concentration of lithium is within the above range, the electrical conductivity of the electrolyte solution becomes satisfactory, and further a lowering of the electrical conductivity due to the increase of the viscosity and a lowering of the battery performance caused by the lowered electrical conductivity are prevented.

1-4. Nonaqueous Solvent

With respect to the nonaqueous solvent in the present invention, there is no particular limitation, and a known organic solvent can be used. Examples of such organic solvents include a cyclic carbonate having no fluorine atom, a linear carbonate, a cyclic or linear carboxylate, an ether compound, and a sulfone compound.

<Cyclic Carbonate Having No Fluorine Atom>

As examples of cyclic carbonates having no fluorine atom, there can be mentioned cyclic carbonates having an alkylene group having 2 to 4 carbon atoms.

Specific examples of cyclic carbonates having no fluorine atom and having an alkylene group having 2 to 4 carbon atoms include ethylene carbonate, propylene carbonate, and butylene carbonate. Of these, ethylene carbonate and propylene carbonate are especially preferred from the viewpoint of improving the degree of dissociation of lithium ions to improve the battery characteristics.

The cyclic carbonates having no fluorine atom may be used alone or two or more types may be used in an arbitrary combination and ratio.

With respect to the amount of the incorporated cyclic carbonate having no fluorine atom, there is no particular limitation, and the amount is arbitrary provided it does not significantly impair the effects of the present invention, but, when the cyclic carbonates having no fluorine atom are used individually, the amount of the cyclic carbonate incorporated is 5% by volume or more, more preferably 10% by volume or more, based on the volume of the nonaqueous solvent (100% by volume). When the amount is within the above range, it is likely that a lowering of the electrical conductivity due to a lowering of the dielectric constant of the nonaqueous electrolyte solution is avoided, so that the high current discharge characteristics, stability to the negative electrode, and cycle characteristics of the nonaqueous electrolyte battery fall in respective advantageous ranges. Further, the amount is 95% by volume or less, more preferably 90% by volume or less, further preferably 85% by volume or less. When the amount is within the above range, it is likely that the viscosity of the nonaqueous electrolyte solution falls in an appropriate range so as to suppress a lowering of the ionic conductivity, and that the load characteristics of the nonaqueous electrolyte battery fall in an advantageous range.

<Linear Carbonate>

As the linear carbonate, a linear carbonate having 3 to 7 carbon atoms is preferred, and a dialkyl carbonate having 3 to 7 carbon atoms is more preferred.

Specific examples of linear carbonates include dimethyl carbonate, diethyl carbonate, di-n-propyl carbonate, diisopropyl carbonate, n-propylisopropyl carbonate, ethylmethyl carbonate, methyl-n-propyl carbonate, n-butylmethyl carbonate, isobutylmethyl carbonate, t-butylmethyl carbonate, ethyl-n-propyl carbonate, n-butylethyl carbonate, isobutylethyl carbonate, and t-butylethyl carbonate.

Of these, dimethyl carbonate, diethyl carbonate, di-n-propyl carbonate, diisopropyl carbonate, n-propylisopropyl carbonate, ethylmethyl carbonate, and methyl-n-propyl carbonate are preferred, and dimethyl carbonate, diethyl carbonate, and ethylmethyl carbonate are especially preferred.

Further, a linear carbonate having a fluorine atom (hereinafter, may be referred to as "fluorinated linear carbonate") can also be preferably used.

With respect to the number of the fluorine atom or atoms in the fluorinated linear carbonate, there is no particular limitation provided the number is 1 or more, and the number is generally 6 or less, preferably 4 or less. When the fluorinated linear carbonate has a plurality of fluorine atoms, the fluorine atoms may be either bonded to the same carbon or bonded to different carbons.

Examples of fluorinated linear carbonates include fluorinated dimethyl carbonates and derivatives thereof, fluorinated ethylmethyl carbonates and derivatives thereof, and fluorinated diethyl carbonates and derivatives thereof.

Examples of fluorinated dimethyl carbonates and derivatives thereof include fluoromethylmethyl carbonate, difluoromethylmethyl carbonate, difluoromethylmethyl carbonate, bis(fluoromethyl) carbonate, bis(difluoro)methyl carbonate, and bis(trifluoromethyl) carbonate.

Examples of fluorinated ethylmethyl carbonates and derivatives thereof include 2-fluoroethylmethyl carbonate, ethylfluoromethyl carbonate, 2,2-difluoroethylmethyl carbonate, 2-fluoroethylfluoromethyl carbonate, ethyldifluoromethyl carbonate, 2,2,2-trifluoroethylmethyl carbonate, 2,2-difluoroethylfluoromethyl carbonate, 2-fluoroethyldifluoromethyl carbonate, and ethyltrifluoromethyl carbonate.

Examples of fluorinated diethyl carbonates and derivatives thereof include ethyl-(2-fluoroethyl) carbonate, ethyl-(2,2-difluoroethyl) carbonate, bis(2-fluoroethyl) carbonate, ethyl-(2,2,2-trifluoroethyl) carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, and bis(2,2,2-trifluoroethyl) carbonate.

The linear carbonates may be used alone or two or more types may be used in an arbitrary combination and ratio.

The amount of the linear carbonate incorporated is preferably 5% by volume or more, more preferably 10% by volume or more, further preferably 15% by volume or more, based on the volume of the nonaqueous solvent (100% by volume). When the lower limit is set as shown above, it is likely that the viscosity of the nonaqueous electrolyte solution falls in an appropriate range so as to suppress a lowering of the ionic conductivity, and that the high current discharge characteristics of the nonaqueous electrolyte battery fall in an advantageous range. Further, the amount of the linear carbonate incorporated is preferably 90% by volume or less, more preferably 85% by volume or less, especially preferably 80% by volume or less, based on the volume of the nonaqueous solvent (100% by volume). When the upper limit is set as shown above, it is likely that a lowering of the electrical conductivity due to a lowering of the dielectric constant of the nonaqueous electrolyte solution is avoided, so that the high current discharge characteristics of the nonaqueous electrolyte battery fall in an advantageous range.

<Cyclic Carboxylate>

As a cyclic carboxylate, ones having 3 to 12 carbon atoms are preferred.

Specific examples include gamma-butyrolactone, gamma-valerolactone, gamma-caprolactone, and epsilon-caprolactone. Of these, gamma-butyrolactone is especially preferred from the viewpoint of improving the degree of dissociation of lithium ions to improve the battery characteristics.

The cyclic carboxylates may be used alone or two or more types may be used in an arbitrary combination and ratio.

The amount of the cyclic carboxylate incorporated is generally, preferably 5% by volume or more, more preferably 10% by volume or more, based on the volume of the nonaqueous solvent (100% by volume). When the amount is in the above range, it is likely that the electrical conductivity of the nonaqueous electrolyte solution is improved, so that the nonaqueous electrolyte battery is improved in high current discharge characteristics. Further, the amount of the cyclic carboxylate incorporated is preferably 50% by volume or less, more preferably 40% by volume or less. When the upper limit is set as shown above, it is likely that the viscosity of the nonaqueous electrolyte solution falls in an appropriate range to avoid a lowering of the electrical conductivity and suppress an increase of the negative electrode resistance, so that the high current discharge characteristics of the nonaqueous electrolyte secondary battery fall in an advantageous range.

<Linear Carboxylate>

As a linear carboxylate, ones having 3 to 7 carbon atoms are preferred. Specific examples include methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, and isopropyl isobutyrate.

Of these, methyl acetate, ethyl acetate, n-propyl acetate, n-butyl acetate, methyl propionate, ethyl propionate, n-propyl propionate, isopropyl propionate, methyl butyrate, and ethyl butyrate are preferred from the viewpoint of reducing the viscosity to improve the ionic conductivity.

The linear carboxylates may be used alone or two or more types may be used in an arbitrary combination and ratio.

The amount of the linear carboxylate incorporated is generally, preferably 10% by volume or more, more preferably 15% by volume or more, based on the volume of the nonaqueous solvent (100% by volume). When the lower limit is set as shown above, it is likely that the electrical conductivity of the nonaqueous electrolyte solution is improved, so that the nonaqueous electrolyte battery is improved in high current discharge characteristics. Further, the amount of the linear carboxylate incorporated is preferably 60% by volume or less, more preferably 50% by volume or less, based on the volume of the nonaqueous solvent (100% by volume). When the upper limit is set as shown above, it is likely that an increase of the negative electrode resistance is suppressed, so that the high current discharge characteristics and cycle characteristics of the nonaqueous electrolyte battery fall in respective advantageous ranges.

<Ether Compound>

As an ether compound, preferred are a linear ether having 3 to 10 carbon atoms and a cyclic ether having 3 to 6 carbon atoms, each of which may have part of hydrogens substituted with fluorine.

Examples of linear ethers having 3 to 10 carbon atoms include diethyl ether, di(2-fluoroethyl) ether, di(2,2-difluoroethyl) ether, di(2,2,2-trifluoroethyl) ether, ethyl(2-fluoroethyl) ether, ethyl(2,2,2-trifluoroethyl) ether, ethyl(1,1,2,2-tetrafluoroethyl) ether, (2-fluoroethyl)(2,2,2-trifluoroethyl) ether, (2-fluoroethyl)(1,1,2,2-tetrafluoroethyl) ether, (2,2,2-trifluoroethyl)(1,1,2,2-tetrafluoroethyl) ether, ethyl-n-propyl ether, ethyl(3-fluoro-n-propyl) ether, ethyl(3,3,3-trifluoro-n-propyl) ether, ethyl(2,2,3,3-tetrafluoro-n-propyl) ether, ethyl (2,2,3,3,3-pentafluoro-n-propyl) ether, 2-fluoroethyl-n-propyl ether, (2-fluoroethyl)(3-fluoro-n-propyl) ether, (2-fluoroethyl)(3,3,3-trifluoro-n-propyl) ether, (2-fluoroethyl)(2,2,3,3-tetrafluoro-n-propyl) ether, (2-fluoroethyl)(2,2,3,3,3-pentafluoro-n-propyl) ether, 2,2,2-trifluoroethyl-n-propyl ether, (2,2,2-trifluoroethyl)(3-fluoro-n-propyl) ether, (2,2,2-trifluoroethyl)(3,3,3-trifluoro-n-propyl) ether, (2,2,2-trifluoroethyl)(2,2,3,3-tetrafluoro-n-propyl) ether, (2,2,2-trifluoroethyl)(2,2,3,3,3-pentafluoro-n-propyl) ether, 1,1,2,2-tetrafluoroethyl-n-propyl ether, (1,1,2,2-tetrafluoroethyl)(3-fluoro-n-propyl) ether, (1,1,2,2-tetrafluoroethyl)(3,3,3-trifluoro-n-propyl) ether, (1,1,2,2-tetrafluoroethyl)(2,2,3,3-tetrafluoro-n-propyl) ether, (1,1,2,2-tetrafluoroethyl)(2,2,3,3,3-pentafluoro-n-propyl) ether, di-n-propyl ether, (n-propyl)(3-fluoro-n-propyl) ether, (n-propyl)(3,3,3-trifluoro-n-propyl) ether, (n-propyl)(2,2,3,3-tetrafluoro-n-propyl) ether, (n-propyl)(2,2,3,3,3-pentafluoro-n-propyl) ether, di(3-fluoro-n-propyl) ether, (3-fluoro-n-propyl)(3,3,3-trifluoro-n-propyl) ether, (3-fluoro-n-propyl)(2,2,3,3-tetrafluoro-n-propyl) ether, (3-fluoro-n-propyl)(2,2,3,3,3-pentafluoro-n-propyl) ether, di(3,3,3-trifluoro-n-propyl) ether, (3,3,3-trifluoro-n-propyl)(2,2,3,3-tetrafluoro-n-propyl) ether, (3,3,3-trifluoro-n-propyl)(2,2,3,3,3-pentafluoro-n-propyl) ether, di(2,2,3,3-tetrafluoro-n-propyl) ether, (2,2,3,3-tetrafluoro-n-propyl)(2,2,3,3,3-pentafluoro-n-propyl) ether, di(2,2,3,3,3-pentafluoro-n-propyl) ether, di-n-butyl ether, dimethoxymethane, methoxyethoxymethane, methoxy(2-fluoroethoxy)methane, methoxy(2,2,2-trifluoroethoxy)methane, methoxy(1,1,2,2-tetrafluoroethoxy)methane, diethoxymethane, ethoxy(2-fluoroethoxy)methane, ethoxy(2,2,2-trifluoroethoxy)methane, ethoxy(1,1,2,2-tetrafluoroethoxy)methane, di(2-fluoroethoxy)methane, (2-fluoroethoxy)(2,2,2-trifluoroethoxy)methane, (2-fluoroethoxy)(1,1,2,2-tetrafluoroethoxy)methane, di(2,2,2-trifluoroethoxy)methane, (2,2,2-trifluoroethoxy)(1,1,2,2-tetrafluoroethoxy)methane, di(1,1,2,2-tetrafluoroethoxy)methane, dimethoxyethane, methoxyethoxyethane, methoxy(2-fluoroethoxy)ethane, methoxy(2,2,2-trifluoroethoxy)ethane, methoxy(1,1,2,2-tetrafluoroethoxy)ethane, diethoxyethane, ethoxy(2-fluoroethoxy)ethane, ethoxy(2,2,2-trifluoroethoxy)ethane, ethoxy(1,1,2,2-tetrafluoroethoxy)ethane, di(2-fluoroethoxy)ethane, (2-fluoroethoxy)(2,2,2-trifluoroethoxy)ethane, (2-fluoroethoxy)(1,1,2,2-tetrafluoroethoxy)ethane, di(2,2,2-trifluoroethoxy)ethane, (2,2,2-trifluoroethoxy)(1,1,2,2-tetrafluoroethoxy)ethane, di(1,1,2,2-tetrafluoroethoxy)ethane, ethylene glycol di-n-propyl ether, ethylene glycol di-n-butyl ether, and diethylene glycol dimethyl ether.

Examples of cyclic ethers having 3 to 6 carbon atoms include tetrahydrofuran, 2-methyltetrahydrofuran, 3-methyltetrahydrofuran, 1,3-dioxane, 2-methyl-1,3-dioxane, 4-methyl-1,3-dioxane, 1,4-dioxane, and fluorinated compounds thereof.

Of these, dimethoxymethane, diethoxymethane, ethoxymethoxymethane, ethylene glycol di-n-propyl ether, ethylene glycol di-n-butyl ether, and diethylene glycol dimethyl ether are preferred from the viewpoint of the high solvating ability for lithium ions to improve the ionic dissociation properties, and especially preferred are dimethoxymethane, diethoxymethane, and ethoxymethoxymethane because they have a low viscosity and impart high ionic conductivity.

The ether compounds may be used alone or two or more types may be used in an arbitrary combination and ratio.

The amount of the ether compound incorporated is generally, preferably 5% by volume or more, more preferably 10% by volume or more, further preferably 15% by volume or more, and is preferably 70% by volume or less, more preferably 60% by volume or less, further preferably 50% by volume or less, based on the volume of the nonaqueous solvent (100% by volume).

When the amount is within the above range, it is likely that the ionic conductivity improvement effect due to the improvement of the linear ether in the degree of dissociation of lithium ions and the reduced viscosity can be secured, and, when the negative electrode active material is a carbonaceous material, it is likely that a disadvantage is avoided in that the linear ether is co-inserted together with lithium ions to lower the capacity.

<Sulfone Compound>

As a sulfone compound, a cyclic sulfone having 3 to 6 carbon atoms and a linear sulfone having 2 to 6 carbon atoms are preferred. The number of sulfonyl group(s) per molecule of the sulfone compound is preferably 1 or 2.

Examples of cyclic sulfones having 3 to 6 carbon atoms include monosulfone compounds such as trimethylene sulfones, tetramethylene sulfones, and hexamethylene sulfones; and disulfone compounds such as trimethylene disulfones, tetramethylene disulfones, and hexamethylene disulfones.

Of these, from the viewpoint of the dielectric constant and viscosity, tetramethylene sulfones, tetramethylene disulfones, hexamethylene sulfones, and hexamethylene disulfones are more preferred, and tetramethylene sulfones (sulfolanes) are especially preferred.

As sulfolanes, sulfolane and/or sulfolane derivatives (hereinafter, may be referred to as "sulfolanes" including sulfolane) are preferred. As sulfolane derivatives, preferred are ones in which one or more hydrogen atoms bonded to carbon atoms constituting the sulfolane ring are substituted with a fluorine atom or an alkyl group.

Of these, 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-difluoromethylsulfolane, 2-trifluoromethylsulfolane, 3-trifluoromethylsulfolane, 2-fluoro-3-(trifluoromethyl)sulfolane, 3-fluoro-3-(trifluoromethyl)sulfolane, 4-fluoro-3-(trifluoromethyl)sulfolane, and 5-fluoro-3-(trifluoromethyl)sulfolane are preferred from the viewpoint of the high ionic conductivity and high input/output characteristics.

Examples of linear sulfones having 2 to 6 carbon atoms include dimethyl sulfone, ethylmethyl sulfone, diethyl sulfone, n-propylmethyl sulfone, n-propylethyl sulfone, di-n-propyl sulfone, isopropylmethyl sulfone, isopropylethyl sulfone, diisopropyl sulfone, n-butylmethyl sulfone, n-butylethyl sulfone, t-butylmethyl sulfone, t-butylethyl sulfone, monofluoromethylmethyl sulfone, difluoromethylmethyl sulfone, trifluoromethylmethyl sulfone, monofluoroethylmethyl sulfone, difluoroethylmethyl sulfone, trifluoroethylmethyl sulfone, pentafluoroethylmethyl sulfone, ethylmonofluoromethyl sulfone, ethyldifluoromethyl sulfone, ethyltrifluoromethyl sulfone, perfluoroethylmethyl sulfone, ethyltrifluoroethyl sulfone, ethylpentafluoroethyl sulfone, di(trifluoroethyl) sulfone, perfluorodiethyl sulfone, fluoromethyl-n-propyl sulfone, difluoromethyl-n-propyl sulfone, trifluoromethyl-n-propyl sulfone, fluoromethylisopropyl sulfone, difluoromethylisopropyl sulfone, trifluoromethylisopropyl sulfone, trifluoroethyl-n-propyl sulfone, trifluoroethylisopropyl sulfone, pentafluoroethyl-n-propyl sulfone, pentafluoroethylisopropyl sulfone, trifluoroethyl-n-butyl sulfone, trifluoroethyl-t-butyl sulfone, pentafluoroethyl-n-butyl sulfone, and pentafluoroethyl-t-butyl sulfone.

Of these, dimethyl sulfone, ethylmethyl sulfone, diethyl sulfone, n-propylmethyl sulfone, isopropylmethyl sulfone, n-butylmethyl sulfone, t-butylmethyl sulfone, monofluoromethylmethyl sulfone, difluoromethylmethyl sulfone, trifluoromethylmethyl sulfone, monofluoroethylmethyl sulfone, difluoroethylmethyl sulfone, trifluoroethylmethyl sulfone, pentafluoroethylmethyl sulfone, ethylmonofluoromethyl sulfone, ethyldifluoromethyl sulfone, ethyltrifluoromethyl sulfone, ethylpentafluoroethyl sulfone, trifluoromethyl-n-propyl sulfone, trifluoromethylisopropyl sulfone, trifluoroethyl-n-butyl sulfone, trifluoroethyl-t-butyl sulfone, trifluoromethyl-n-butyl sulfone, and trifluoromethyl-t-butyl sulfone are preferred from the viewpoint of the high ionic conductivity and high input/output characteristics.

The sulfone compounds may be used alone or two or more types may be used in an arbitrary combination and ratio.

The amount of the sulfone compound incorporated is generally, preferably 0.3% by volume or more, more preferably 1% by volume or more, further preferably 5% by volume or more, and is preferably 40% by volume or less, more preferably 35% by volume or less, further preferably 30% by volume or less, based on the volume of the nonaqueous solvent (100% by volume).

When the amount is within the above range, it is likely that the improvement effect for durability including cycle characteristics and storage characteristics can be obtained, and that the viscosity of the nonaqueous electrolyte solution can be in an appropriate range to prevent a lowering of the electrical conductivity, so that a disadvantage is avoided in that the charge/discharge capacity maintaining ratio is lowered when the nonaqueous electrolyte battery is charged/discharged at a high current density.

<In the Case where the Cyclic Carbonate Having a Fluorine Atom is Used as a Nonaqueous Solvent>

In the present invention, when the cyclic carbonate having a fluorine atom is used as a nonaqueous solvent, as a nonaqueous solvent other than the cyclic carbonate having a fluorine atom, one of the above-exemplified nonaqueous solvents may be used in combination with the cyclic carbonate having a fluorine atom, and two or more of the above nonaqueous solvents may be used in combination with the cyclic carbonate having a fluorine atom.

For example, as one of preferred combinations of the nonaqueous solvents, there can be mentioned a combination mainly consisting of the cyclic carbonate having a fluorine atom and a linear carbonate. Especially, the total of the cyclic carbonate having a fluorine atom and the linear carbonate in the nonaqueous solvent is preferably 60% by volume or more, more preferably 80% by volume or more, further preferably 90% by volume or more, and the proportion of the cyclic carbonate having a fluorine atom to the total of the cyclic carbonate having a fluorine atom and the linear carbonate is 3% by volume or more, preferably 5% by volume or more, more preferably 10% by volume or more, further preferably 15% by volume or more, and is generally 60% by volume or less, preferably 50% by volume or less, more preferably 40% by volume or less, further preferably 35% by volume or less, especially preferably 30% by volume or less, most preferably 20% by volume or less.

By using the above combination of the nonaqueous solvents, a battery produced using this combination may have excellent balance between the cycle characteristics and the high-temperature storage characteristics (particularly, the residual capacity and high-load discharge capacity after the high-temperature storage).

Specific examples of preferred combinations of, for example, a cyclic carbonate having a fluorine atom and a linear carbonate include: a combination of monofluoroethylene carbonate and dimethyl carbonate; a combination of monofluoroethylene carbonate and diethyl carbonate; a combination of monofluoroethylene carbonate and ethylmethyl carbonate; a combination of monofluoroethylene carbonate, dimethyl carbonate, and diethyl carbonate; a combination of monofluoroethylene carbonate, dimethyl carbonate, and ethylmethyl carbonate; a combination of monofluoroethylene carbonate, diethyl carbonate, and ethylmethyl carbonate; and a combination of monofluoroethylene carbonate, dimethyl carbonate, diethyl carbonate, and ethylmethyl carbonate.

Among the combinations of a cyclic carbonate having a fluorine atom and a linear carbonate, the combinations containing a symmetric linear alkyl carbonate as a linear carbonate are further preferred, and particularly, the combinations containing monofluoroethylene carbonate, a symmetric linear carbonate, and an asymmetric linear carbonate, such as a combination of monofluoroethylene carbonate, dimethyl carbonate, and ethylmethyl carbonate; a combination of monofluoroethylene carbonate, diethyl carbonate, and ethylmethyl carbonate; and a combination of monofluoroethylene carbonate, dimethyl carbonate, diethyl carbonate, and ethylmethyl carbonate, are preferred because the balance between the cycle characteristics and the high current discharge characteristics is excellent. Of these, preferred are those in which the symmetric linear carbonate is dimethyl carbonate, or the alkyl group of the linear carbonate has 1 to 2 carbon atoms.

Further, as preferred combinations, there can be mentioned the above-mentioned combinations of a cyclic carbonate having a fluorine atom and a linear carbonate, which further contain a cyclic carbonate having no fluorine atom. Especially, the total of the cyclic carbonate having a fluorine atom and the cyclic carbonate having no fluorine atom in the nonaqueous solvent is preferably 10% by volume or more, more preferably 15% by volume or more, further preferably 20% by volume or more, and the proportion of the cyclic carbonate having a fluorine atom to the total of the cyclic carbonate having a fluorine atom and the cyclic carbonate having no fluorine atom is 1% by volume or more, preferably 3% by volume or more, more preferably 5% by volume or more, further preferably 10% by volume or more, especially preferably 20% by volume or more, and is preferably 95% by volume or less, more preferably 85% by volume or less, further preferably 75% by volume or less, especially preferably 60% by volume or less.

When the cyclic carbonate having no fluorine atom is contained at a concentration in the above range, not only can a stable protective film be formed on the negative electrode, but also the electrical conductivity of the electrolyte solution can be maintained.

Specific examples of preferred combinations of a cyclic carbonate having a fluorine atom, a cyclic carbonate having no fluorine atom, and a linear carbonate include: a combination of monofluoroethylene carbonate, ethylene carbonate, and dimethyl carbonate; a combination of monofluoroethylene carbonate, ethylene carbonate, and diethyl carbonate; a combination of monofluoroethylene carbonate, ethylene carbonate, and ethylmethyl carbonate; a combination of monofluoroethylene carbonate, ethylene carbonate, dimethyl carbonate, and diethyl carbonate; a combination of monofluoroethylene carbonate, ethylene carbonate, dimethyl carbonate, and ethylmethyl carbonate; a combination of monofluoroethylene carbonate, ethylene carbonate, diethyl carbonate, and ethylmethyl carbonate; a combination of monofluoroethylene carbonate, ethylene carbonate, dimethyl carbonate, diethyl carbonate, and ethylmethyl carbonate; a combination of monofluoroethylene carbonate, propylene carbonate, and dimethyl carbonate; a combination of monofluoroethylene carbonate, propylene carbonate, and diethyl carbonate; a combination of monofluoroethylene carbonate, propylene carbonate, and ethylmethyl carbonate; a combination of monofluoroethylene carbonate, propylene carbonate, dimethyl carbonate, and diethyl carbonate; a combination of monofluoroethylene carbonate, propylene carbonate, dimethyl carbonate, and ethylmethyl carbonate; a combination of monofluoroethylene carbonate, propylene carbonate, diethyl carbonate, and ethylmethyl carbonate; a combination of monofluoroethylene carbonate, propylene carbonate, dimethyl carbonate, diethyl carbonate, and ethylmethyl carbonate; a combination of monofluoroethylene carbonate, ethylene carbonate, propylene carbonate, and dimethyl carbonate; a combination of monofluoroethylene carbonate, ethylene carbonate, propylene carbonate, and diethyl carbonate; a combination of monofluoroethylene carbonate, ethylene carbonate, propylene carbonate, and ethylmethyl carbonate; a combination of monofluoroethylene carbonate, ethylene carbonate, propylene carbonate, dimethyl carbonate, and diethyl carbonate; a combination of monofluoroethylene carbonate, ethylene carbonate, propylene carbonate, dimethyl carbonate, and ethylmethyl carbonate; a combination of monofluoroethylene carbonate, ethylene carbonate, propylene carbonate, diethyl carbonate, and ethylmethyl carbonate; and a combination of monofluoroethylene carbonate, ethylene carbonate, propylene carbonate, dimethyl carbonate, diethyl carbonate, and ethylmethyl carbonate.

Among the combinations of a cyclic carbonate having a fluorine atom, a cyclic carbonate having no fluorine atom, and a linear carbonate, the combinations containing an asymmetric linear alkyl carbonate as a linear carbonate are further preferred, and particularly, the combinations containing monofluoroethylene carbonate and an asymmetric linear carbonate, such as a combination of monofluoroethylene carbonate, ethylene carbonate, and ethylmethyl carbonate; a combination of monofluoroethylene carbonate, propylene carbonate, and ethylmethyl carbonate; a combination of monofluoroethylene carbonate, ethylene carbonate, dimethyl carbonate, and ethylmethyl carbonate; a combination of monofluoroethylene carbonate, propylene carbonate, dimethyl carbonate, and ethylmethyl carbonate; a combination of monofluoroethylene carbonate, ethylene carbonate, diethyl carbonate, and ethylmethyl carbonate; a combination of monofluoroethylene carbonate, propylene carbonate, diethyl carbonate, and ethylmethyl carbonate; a combination of monofluoroethylene carbonate, ethylene carbonate, propylene carbonate, diethyl carbonate, and ethylmethyl carbonate; a combination of monofluoroethylene carbonate, ethylene carbonate, dimethyl carbonate, diethyl carbonate, and ethylmethyl carbonate; a combination of monofluoroethylene carbonate, propylene carbonate, dimethyl carbonate, diethyl carbonate, and ethylmethyl carbonate; and a combination of monofluoroethylene carbonate, ethylene carbonate, propylene carbonate, dimethyl carbonate, diethyl carbonate, and ethylmethyl carbonate, are preferred because the balance between the cycle characteristics and the high current discharge characteristics is excellent. Of these, preferred are those in which the asymmetric linear carbonate is ethylmethyl carbonate, or the alkyl group of the linear carbonate has 1 to 2 carbon atoms.

When ethylmethyl carbonate is contained in the nonaqueous solvent, the proportion of the ethylmethyl carbonate to the entire nonaqueous solvent is preferably 10% by volume or more, more preferably 20% by volume or more, further preferably 25% by volume or more, especially preferably 30% by volume or more, and is preferably 95% by volume or less, more preferably 90% by volume or less, further preferably 85% by volume or less, especially preferably 80% by volume or less, and, when ethylmethyl carbonate is contained at a proportion in the above range, the battery is likely to be improved in the load characteristics.

In the above-mentioned combination mainly consisting of a cyclic carbonate having a fluorine atom and a linear carbonate, in addition to the cyclic carbonate having no fluorine atom, another solvent such as a cyclic carboxylate, a linear carboxylate, a cyclic ether, a linear ether, a sulfur-containing organic solvent, a phosphorus-containing organic solvent, or a fluorine-containing aromatic solvent, may be mixed.

<In the Case where the Cyclic Carbonate Having a Fluorine Atom is Used as an Assistant>

In the present invention, when the cyclic carbonate having a fluorine atom is used as an assistant, as a nonaqueous solvent other than the cyclic carbonate having a fluorine atom, the above-exemplified nonaqueous solvents may be used alone or two or more types may be used in an arbitrary combination and ratio.

For example, as one of preferred combinations of the nonaqueous solvents, there can be mentioned a combination mainly consisting of a cyclic carbonate having no fluorine atom and a linear carbonate.

Especially, the total of the cyclic carbonate having no fluorine atom and the linear carbonate in the nonaqueous solvent is preferably 70% by volume or more, more preferably 80% by volume or more, further preferably 90% by volume or more, and the proportion of the cyclic carbonate having no fluorine atom to the total of the cyclic carbonate and the linear carbonate is preferably 5% by volume or more, more preferably 10% by volume or more, further preferably 15% by volume or more, and is preferably 50% by volume or less, more preferably 35% by volume or less, further preferably 30% by volume or less, especially preferably 25% by volume or less.

By using the above combination of the nonaqueous solvents, a battery produced using this combination may have excellent balance between the cycle characteristics and the high-temperature storage characteristics (particularly, the residual capacity and high-load discharge capacity after the high-temperature storage).

Specific examples of preferred combinations of, for example, a cyclic carbonate having no fluorine atom and a linear carbonate include: a combination of ethylene carbonate and dimethyl carbonate; a combination of ethylene carbonate and diethyl carbonate; a combination of ethylene carbonate and ethylmethyl carbonate; a combination of ethylene carbonate, dimethyl carbonate, and diethyl carbonate; a combination of ethylene carbonate, dimethyl carbonate, and ethylmethyl carbonate; a combination of ethylene carbonate, diethyl carbonate, and ethylmethyl carbonate; a combination of ethylene carbonate, dimethyl carbonate, diethyl carbonate, and ethylmethyl carbonate; a combination of propylene carbonate and ethylmethyl carbonate; a combination of propylene carbonate, ethylmethyl carbonate, and diethyl carbonate; and a combination of propylene carbonate, ethylmethyl carbonate, and dimethyl carbonate.

Among the combinations of a cyclic carbonate having no fluorine atom and a linear carbonate, the combinations containing an asymmetric linear alkyl carbonate as a linear carbonate are further preferred, and particularly, a combination of ethylene carbonate and ethylmethyl carbonate; a combination of propylene carbonate and ethylmethyl carbonate; a combination of ethylene carbonate, ethylmethyl carbonate, and dimethyl carbonate; a combination of ethylene carbonate, ethylmethyl carbonate, and diethyl carbonate; a combination of propylene carbonate, ethylmethyl carbonate, and dimethyl carbonate; and a combination of propylene carbonate, ethylmethyl carbonate, and diethyl carbonate are preferred because the balance between the cycle characteristics and the high current discharge characteristics is excellent.

Of these, preferred are those in which the asymmetric linear carbonate is ethylmethyl carbonate, or the alkyl group of the linear carbonate has 1 to 2 carbon atoms.

When dimethyl carbonate is contained in the nonaqueous solvent, the proportion of the dimethyl carbonate to the entire nonaqueous solvent is preferably 10% by volume or more, more preferably 20% by volume or more, further preferably 25% by volume or more, especially preferably 30% by volume or more, and is preferably 90% by volume or less, more preferably 80% by volume or less, further preferably 75% by volume or less, especially preferably 70% by volume or less, and when dimethyl carbonate is contained at a proportion in the above range, the battery is likely to be improved in the load characteristics.

Especially when dimethyl carbonate and ethylmethyl carbonate are contained wherein the amount of the dimethyl carbonate contained is larger than the amount of the ethylmethyl carbonate contained, the battery characteristics after the high-temperature storage may be advantageously improved while maintaining the electrical conductivity of the electrolyte solution.

From the viewpoint of improving the electrical conductivity of the electrolyte solution and improving the battery characteristics after storage, the volume ratio of the dimethyl carbonate to the ethylmethyl carbonate (dimethyl carbonate/ethylmethyl carbonate) in the entire nonaqueous solvent is preferably 1.1 or more, more preferably 1.5 or more, further preferably 2.5 or more. From the viewpoint of improving the battery characteristics at low temperatures, the above volume ratio (dimethyl carbonate/ethylmethyl carbonate) is preferably 40 or less, more preferably 20 or less, further preferably 10 or less, especially preferably 8 or less.

In the above-mentioned combination mainly consisting of a cyclic carbonate having no fluorine atom and a linear carbonate, another solvent, such as a cyclic carboxylate, a linear carboxylate, a cyclic ether, a linear ether, a sulfur-containing organic solvent, a phosphorus-containing organic solvent, or an aromatic fluorine-containing solvent, may be mixed.

In the present specification, a volume of the nonaqueous solvent is a value as measured at 25° C., and, with respect to a solvent which is in a solid state at 25° C., such as ethylene carbonate, a value of a volume as measured at the melting point of the solvent is used.

1-5. Assistant

In the nonaqueous electrolyte battery of the present invention, in addition to the above-described substances, an appropriate assistant may be used according to the purpose. Examples of assistants include the below-shown aromatic compound having 12 carbon atoms or less, fluorinated unsaturated cyclic carbonate, compound having a triple bond, and other assistants.

1-5-1. Aromatic Compound Having 12 Carbon Atoms or Less

With respect to the type of the aromatic compound having 12 carbon atoms or less, there is no particular limitation provided it is a compound having 12 carbon atoms or less in the molecule thereof.

Specific examples of aromatic compounds having 12 carbon atoms or less include:

aromatic compounds such as biphenyl, alkyl biphenyl, cyclohexylbenzene, t-butylbenzene, t-amylbenzene, diphenyl ether, and dibenzofuran; partially fluorinated products of the above aromatic compounds, such as 2-fluorobiphenyl, o-cyclohexylfluorobenzene, and p-cyclohexylfluorobenzene; and fluorine-containing anisole compounds such as 2,4-difluoroanisole, 2,5-difluoroanisole, 2,6-difluoroanisole, and 3,5-difluoroanisole. Of these, preferred are aromatic compounds, such as biphenyl, alkyl biphenyl, cyclohexylbenzene, t-butylbenzene, t-amylbenzene, diphenyl ether, and dibenzofuran.

These may be used individually or two or more of them may be used in combination. When two or more of them are used in combination, particularly, a combination of cyclohexylbenzene and t-butylbenzene or t-amylbenzene is preferably used, or at least one selected from aromatic compounds containing no oxygen such as biphenyl, alkyl biphenyl, cyclohexylbenzene, t-butylbenzene, and t-amylbenzene, and at least one selected from oxygen-containing aromatic compounds such as diphenyl ether and dibenzofuran, are preferably used in combination from the viewpoint of the balance of high-temperature storage characteristics.

With respect to the aromatic compound having 12 carbon atoms or less, there is no particular limitation, and the compound is arbitrary provided it does not significantly impair the effects of the present invention. The concentration of the overcharge preventing agent contained in the nonaqueous electrolyte solution (100% by mass) is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, especially preferably 1% by mass or less. When the concentration is within the above range, it is likely that the effects of the overcharge preventing agent are satisfactorily exhibited, and that a disadvantage is avoided in that characteristics of the battery such as high-temperature storage characteristics, become poor.

1-5-2. Fluorinated Unsaturated Cyclic Carbonate

As a fluorinated cyclic carbonate, a cyclic carbonate having an unsaturated bond and a fluorine atom (hereinafter, may be referred to as "fluorinated unsaturated cyclic carbonate") is preferably used as well. With respect to the number of the fluorine atom or atoms of the fluorinated unsaturated cyclic carbonate, there is no particular limitation provided the number is 1 or more. Especially, the fluorinated unsaturated cyclic carbonate is generally one having 6 fluorine atoms or less, preferably one having 4 fluorine atoms or less, most preferably one having 1 or 2 fluorine atoms.

Examples of fluorinated unsaturated cyclic carbonates include fluorinated vinylene carbonate derivatives and fluorinated ethylene carbonate derivatives substituted with an aromatic ring or a substituent having a carbon-carbon double bond.

Examples of fluorinated vinylene carbonate derivatives include 4-fluorovinylene carbonate, 4-fluoro-5-methylvinylene carbonate, 4-fluoro-5-phenylvinylene carbonate, 4-allyl-5-fluorovinylene carbonate, and 4-fluoro-5-vinylvinylene carbonate.

Examples of fluorinated ethylene carbonate derivatives substituted with an aromatic ring or a substituent having a carbon-carbon double bond include 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, 4,5-difluoro-4,5-diallylethylene carbonate, 4-fluoro-4-phenylethylene carbonate, 4-fluoro-5-phenylethylene carbonate, 4,4-difluoro-5-phenylethylene carbonate, and 4,5-difluoro-4-phenylethylene carbonate.

Of these, as preferred fluorinated unsaturated cyclic carbonates, 4-fluorovinylene carbonate, 4-fluoro-5-methylvinylene carbonate, 4-fluoro-5-vinylvinylene carbonate, 4-allyl-5-fluorovinylene carbonate, 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, and 4,5-difluoro-4,5-diallylethylene carbonate are more preferably used because they form a stable interfacial protective film.

With respect to the molecular weight of the fluorinated unsaturated cyclic carbonate, there is no particular limitation, and the molecular weight is arbitrary provided it does not significantly impair the effects of the present invention. The molecular weight is preferably 50 to 250. When the molecular weight is in this range, the solubility of the fluorinated cyclic carbonate in the nonaqueous electrolyte solution is easily secured, so that the effects of the present invention are likely to be exhibited.

With respect to the method for producing the fluorinated unsaturated cyclic carbonate, there is no particular limitation, and the fluorinated unsaturated cyclic carbonate can be produced using a known method arbitrarily selected. The molecular weight is more preferably 100 to 200.

The fluorinated unsaturated cyclic carbonates may be used alone or two or more types may be used in an arbitrary combination and ratio. With respect to the amount of the fluorinated unsaturated cyclic carbonate incorporated, there is no particular limitation, and the amount is arbitrary provided it does not significantly impair the effects of the present invention.

The amount of the fluorinated unsaturated cyclic carbonate incorporated into the nonaqueous electrolyte solution (100% by mass) is generally, preferably 0.01% by mass or more, more preferably 0.1% by mass or more, further preferably 0.5% by mass or more, and is preferably 10% by mass or less, more preferably 5% by mass or less, further preferably 3% by mass or less, especially preferably 2% by mass or less.

When the amount is within the above range, it is likely that the resultant nonaqueous electrolyte battery exhibits a satisfactory effect to improve the cycle characteristics, and that a disadvantage is avoided in that the high-temperature storage characteristics become poor to increase the amount of the gas generated, lowering the discharge capacity maintaining ratio.

1-5-3. Compound Having a Triple Bond

With respect to the type of the compound having a triple bond, there is no particular limitation provided it is a compound having at least one triple bond in the molecule thereof.

As specific examples of compounds having a triple bond, there can be mentioned the following compounds:

hydrocarbon compounds such as 1-pentyne, 2-pentyne, 1-hexyne, 2-hexyne, 3-hexyne, 1-heptyne, 2-heptyne, 3-heptyne, 1-octyne, 2-octyne, 3-octyne, 4-octyne, 1-nonyne, 2-nonyne, 3-nonyne, 4-nonyne, 1-dodecyne, 2-dodecyne, 3-dodecyne, 4-dodecyne, 5-dodecyne, phenylacetylene, 1-phenyl-1-propyne, 1-phenyl-2-propyne, 1-phenyl-1-butyne, 4-phenyl-1-butyne, 4-phenyl-1-butyne, 1-phenyl-1-pentyne, 5-phenyl-1-pentyne, 1-phenyl-1-hexyne, 6-phenyl-1-hexyne, diphenylacetylene, 4-ethynyltoluene, and dicyclohexylacetylene;

monocarbonates such as 2-propynylmethyl carbonate, 2-propynylethyl carbonate, 2-propynylpropyl carbonate, 2-propynylbutyl carbonate, 2-propynylphenyl carbonate, 2-propynylcyclohexyl carbonate, di-2-propynyl carbonate, 1-methyl-2-propynylmethyl carbonate, 1,1-dimethyl-2-propynylmethyl carbonate, 2-butynylmethyl carbonate, 3-butynylmethyl carbonate, 2-pentynylmethyl carbonate, 3-pentynylmethyl carbonate, and 4-pentynylmethyl carbonate;

dicarbonates such as 2-butyne-1,4-diol dimethyl dicarbonate, 2-butyne-1,4-diol diethyl dicarbonate, 2-butyne-1,4-diol dipropyl dicarbonate, 2-butyne-1,4-diol dibutyl dicarbonate, 2-butyne-1,4-diol diphenyl dicarbonate, and 2-butyne-1,4-diol dicyclohexyl dicarbonate;

monocarboxylates such as 2-propynyl acetate, 2-propynyl propionate, 2-propynyl butyrate, 2-propynyl benzoate, 2-propynyl cyclohexylcarboxylate, 1,1-dimethyl-2-propynyl acetate, 1,1-dimethyl-2-propynyl propionate, 1,1-dimethyl-2-propynyl butyrate, 1,1-dimethyl-2-propynyl benzoate, 1,1-dimethyl-2-propynyl cyclohexylcarboxylate, 2-butynyl acetate, 3-butynyl acetate, 2-pentynyl acetate, 3-pentynyl acetate, 4-pentynyl acetate, methyl acrylate, ethyl acrylate, propyl acrylate, vinyl acrylate, 2-propenyl acrylate, 2-butenyl acrylate, 3-butenyl acrylate, methyl methacrylate, ethyl methacrylate, propyl methacrylate, vinyl methacrylate, 2-propenyl methacrylate, 2-butenyl methacrylate, 3-butenyl methacrylate, methyl 2-propiolate, ethyl 2-propiolate, propyl 2-propiolate, vinyl 2-propiolate, 2-propenyl 2-propiolate, 2-butenyl 2-propiolate, 3-butenyl 2-propiolate, methyl 2-butynoate, ethyl 2-butynoate, propyl 2-butynoate, vinyl 2-butynoate, 2-propenyl 2-butynoate, 2-butenyl 2-butynoate, 3-butenyl 2-butynoate, methyl 3-butynoate, ethyl 3-butynoate, propyl 3-butynoate, vinyl 3-butynoate, 2-propenyl 3-butynoate, 2-butenyl 3-butynoate, 3-butenyl 3-butynoate, methyl 2-pentynoate, ethyl 2-pentynoate, propyl 2-pentynoate, vinyl 2-pentynoate, 2-propenyl 2-pentynoate, 2-butenyl 2-pentynoate, 3-butenyl 2-pentynoate, methyl 3-pentynoate, ethyl 3-pentynoate, propyl 3-pentynoate, vinyl 3-pentynoate, 2-propenyl 3-pentynoate, 2-butenyl 3-pentynoate, 3-butenyl 3-pentynoate, methyl 4-pentynoate, ethyl 4-pentynoate, propyl 4-pentynoate, vinyl 4-pentynoate, 2-propenyl 4-pentynoate, 2-butenyl 4-pentynoate, and 3-butenyl 4-pentynoate;

dicarboxylates such as 2-butyne-1,4-diol diacetate, 2-butyne-1,4-diol dipropionate, 2-butyne-1,4-diol dibutyrate, 2-butyne-1,4-diol dibenzoate, and 2-butyne-1,4-diol dicyclohexanecarboxylate;

oxalic acid diesters such as methyl 2-propynyl oxalate, ethyl 2-propynyl oxalate, propyl 2-propynyl oxalate, 2-propynyl vinyl oxalate, allyl 2-propynyl oxalate, di-2-propynyl oxalate, 2-butynyl methyl oxalate, 2-butynyl ethyl oxalate, 2-butynyl propyl oxalate, 2-butynyl vinyl oxalate, allyl 2-butynyl oxalate, di-2-butynyl oxalate, 3-butynyl methyl oxalate, 3-butynyl ethyl oxalate, 3-butynyl propyl oxalate, 3-butynyl vinyl oxalate, allyl 3-butynyl oxalate, and di-3-butynyl oxalate;

phosphine oxides such as methyl(2-propynyl)(vinyl) phosphine oxide, divinyl(2-propynyl)phosphine oxide, di(2-propynyl)(vinyl)phosphine oxide, di(2-propenyl)(2-propynyl)phosphine oxide, di(2-propynyl)(2-propenyl)phosphine oxide, di(3-butenyl)(2-propynyl)phosphine oxide, and di(2-propynyl)(3-butenyl)phosphine oxide;

phosphinates such as 2-propynyl methyl(2-propenyl) phosphinate, 2-propynyl 2-butenyl(methyl)phosphinate, 2-propynyl di(2-propenyl)phosphinate, 2-propynyl di(3-butenyl)phosphinate, 1,1-dimethyl-2-propynyl methyl(2-propenyl)phosphinate, 1,1-dimethyl-2-propynyl 2-butenyl (methyl)phosphinate, 1,1-dimethyl-2-propynyl di(2-propenyl)phosphinate, 1,1-dimethyl-2-propynyl di(3-butenyl)phosphinate, 2-propenyl methyl(2-propynyl) phosphinate, 3-butenyl methyl(2-propynyl)phosphinate, 2-propenyl di(2-propynyl)phosphinate, 3-butenyl di(2-propynyl)phosphinate, 2-propenyl 2-propynyl(2-propenyl) phosphinate, and 3-butenyl 2-propynyl(2-propenyl)phosphinate;

phosphonates such as methyl 2-propynyl 2-propenylphosphonate, methyl (2-propynyl) 2-butenylphosphonate, (2-propynyl)(2-propenyl) 2-propenylphosphonate, (3-butenyl)(2-propynyl) 3-butenylphosphonate, (1,1-dimethyl-2-propynyl)(methyl) 2-propenylphosphonate, (1,1-dimethyl-2-propynyl)(methyl) 2-butenylphosphonate, (1,1-dimethyl-2-propynyl)(2-propenyl) 2-propenylphosphonate, (3-butenyl)(1,1-dimethyl-2-propynyl) 3-butenylphosphonate, (2-propynyl)(2-propenyl) methylphosphonate, (3-butenyl)(2-propynyl) methylphosphonate, (1,1-dimethyl-2-propynyl)(2-propenyl) methylphosphonate, (3-butenyl)(1,1-dimethyl-2-propynyl) methylphosphonate, (2-propynyl)(2-propenyl) ethylphosphonate, (3-butenyl)(2-propynyl) ethylphosphonate, (1,1-dimethyl-2-propynyl)(2-propenyl) ethylphosphonate, and (3-butenyl)(1,1-dimethyl-2-propynyl) ethylphosphonate; and phosphates such as (methyl)(2-propenyl)(2-propynyl) phosphate, (ethyl)(2-propenyl)(2-propynyl) phosphate, (2-butenyl)(methyl)(2-propynyl) phosphate, (2-butenyl) (ethyl)(2-propynyl) phosphate, (1,1-dimethyl-2-propynyl) (methyl)(2-propenyl) phosphate, (1,1-dimethyl-2-propynyl) (ethyl)(2-propenyl) phosphate, (2-butenyl)(1,1-dimethyl-2-propynyl)(methyl) phosphate, and (2-butenyl)(ethyl)(1,1-dimethyl-2-propynyl) phosphate.

Of these, compounds having an alkynyloxy group are preferred because they form a negative electrode film more stably in the electrolyte solution.

Further, compounds such as 2-propynylmethyl carbonate, di-2-propynyl carbonate, 2-butyne-1,4-diol dimethyl dicarbonate, 2-propynyl acetate, 2-butyne-1,4-diol diacetate, methyl 2-propynyl oxalate, and di-2-propynyl oxalate, are especially preferred from the viewpoint of improving the storage characteristics.

The above compounds having a triple bond may be used alone or two or more types may be used in an arbitrary combination and in an arbitrary ratio. With respect to the amount of the compound having a triple bond incorporated into the nonaqueous electrolyte solution in the present invention, there is no particular limitation, and the amount is arbitrary provided it does not significantly impair the effects of the present invention, but the concentration of the compound contained in the nonaqueous electrolyte solution in the present invention is generally 0.01% by mass or more, preferably 0.05% by mass or more, more preferably 0.1% by mass or more, and is generally 5% by mass or less, preferably 3% by mass or less, more preferably 1% by mass or less. When the above-mentioned range is satisfied, the effects for, for example, output characteristics, load characteristics, low temperature characteristics, cycle characteristics, and high-temperature storage characteristics are further improved.

1-5-4. Other Assistant

As the other assistant, a known assistant other than the above-mentioned assistants can be used. Examples of the other assistants include:

carbonate compounds such as erythritan carbonate, spiro-bis-dimethylene carbonate, and methoxyethyl-methyl carbonate;

spiro compounds such as 2,4,8,10-tetraoxaspiro[5.5]undecane and 3,9-divinyl-2,4,8,10-tetraoxaspiro[5.5]undecane;

sulfur-containing compounds such as ethylene sulfite, methyl fluorosulfonate, ethyl fluorosulfonate, methyl methanesulfonate, ethyl methanesulfonate, busulfan, sulfolene, diphenyl sulfone, N,N-dimethylmethanesulfonamide, N,N-diethylmethanesulfonamide, methyl vinylsulfonate, ethyl vinylsulfonate, allyl vinylsulfonate, propargyl vinylsulfonate, methyl allylsulfonate, ethyl allylsulfonate, allyl allylsulfonate, propargyl allylsulfonate, and 1,2-bis(vinylsulfonyloxy)ethane;

nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide;

phosphorus-containing compounds such as trimethyl phosphite, triethyl phosphite, triphenyl phosphite, trimethyl phosphate, triethyl phosphate, triphenyl phosphate, dimethyl methylphosphonate, diethyl ethylphosphonate, dimethyl vinylphosphonate, diethyl vinylphosphonate, ethyl diethylphosphonoacetate, methyl dimethylphosphinate, ethyl diethylphosphinate, trimethylphosphine oxide, and triethylphosphine oxide;

hydrocarbon compounds such as heptane, octane, nonan, decane, and cycloheptane; and fluorine-containing aromatic compounds such as fluorobenzene, difluorobenzene, hexafluorobenzene, and benzotrifluoride. These may be used alone or in combination. By adding the above assistant, the capacity maintaining characteristics after the high-temperature storage and the cycle characteristics can be improved.

With respect to the amount of the other assistant incorporated, there is no particular limitation, and the amount is arbitrary provided it does not significantly impair the effects of the present invention. The amount of the other assistant in the nonaqueous electrolyte solution (100% by mass) is generally 0.01 to 10% by mass. When the amount is in this range, it is likely that the effects of the other assistant are satisfactorily exhibited, and that a disadvantage is avoided in that characteristics of the battery, such as high-load discharge characteristics, become poor.

The amount of the other assistant incorporated is preferably 0.1% by mass or more, more preferably 0.3% by mass or more, further preferably 0.5% by mass, especially preferably 1.0% by mass, and is preferably 5% by mass or less, more preferably 3% by mass or less, further preferably 2% by mass, especially preferably 1% by mass or less.

The above-described nonaqueous electrolyte solution involves one that is present inside of the nonaqueous electrolyte battery described in the present invention.

Specifically, the nonaqueous electrolyte solution involves a nonaqueous electrolyte solution obtained in the case that constituents of a nonaqueous electrolyte solution, such as a lithium salt, a solvent, and an assistant, are separately synthesized, and a nonaqueous electrolyte solution is prepared from the synthesized constituents substantially isolated, and injected into a battery, which is separately assembled by the method described below, to obtain the nonaqueous electrolyte battery, a nonaqueous electrolyte solution obtained in the case that the constituents of the nonaqueous electrolyte solution of the present invention are individually placed in a battery, and mixed with each other in the battery so as to obtain the same composition as that of the nonaqueous electrolyte solution of the present invention, and further a nonaqueous electrolyte solution obtained in the case that the compounds constituting the nonaqueous electrolyte solution of the present invention are generated inside of the nonaqueous electrolyte battery so as to obtain the same composition as that of the nonaqueous electrolyte solution of the present invention.

2. Battery Construction

The nonaqueous electrolyte solution of the present invention is preferably used as an electrolyte solution for a nonaqueous electrolyte battery, especially for a secondary battery, for example, a lithium secondary battery. The nonaqueous electrolyte battery using the nonaqueous electrolyte solution of the present invention is described below.

The nonaqueous electrolyte battery of the present invention can have a known structure, and typically comprises a negative electrode and a positive electrode each being capable of occluding and releasing ions (for example, lithium ions), and the above-described nonaqueous electrolyte solution of the present invention.

2-1. Negative Electrode

A negative electrode active material used in the negative electrode is described below. With respect to the negative electrode active material, there is no particular limitation provided it is capable of electrochemically occluding and releasing lithium ions. Specific examples include carbonaceous materials, alloy materials, and lithium-containing metal compound oxide materials. These may be used alone or two or more of them may be used in an arbitrary combination.

<Negative Electrode Active Material>

Examples of negative electrode active materials include a carbonaceous material, an alloy material, and a lithium-containing metal compound oxide material.

Examples of carbonaceous materials include (1) natural graphite, (2) artificial graphite, (3) amorphous carbon, (4) carbon-coated graphite, (5) graphite-coated graphite, and (6) resin-coated graphite.

(1) As examples of natural graphite, there can be mentioned scaly graphite, flaky graphite, soil graphite and/or graphite particles obtained by subjecting the above graphite as a raw material to treatment such as spheronization or densification. Of these, from the viewpoint of the packing property of particles and the charge/discharge rate characteristics, especially preferred is graphite in a spherical shape or an ellipsoidal shape which has been subjected to spheronization treatment.

As an apparatus used for the spheroidizing treatment, for example, there can be used an apparatus that repeatedly subjects the particles to primarily impact force as well as other mechanical actions such as a compression, rubbing or shear force, and including particle interaction.

Specifically, preferred is an apparatus having a rotor having a number of blades disposed inside a casing thereof, wherein the rotor is rotated at a high speed to apply a mechanical action such as impact compression, rubbing, or a shear force, to a carbon material introduced into the apparatus to perform a spheronization treatment. Further, the apparatus preferably has a mechanism in which a carbon material is circulated so as to repeatedly apply a mechanical action to the carbon material.

For example, when a spheronization treatment is performed using the above-mentioned apparatus, the circumferential speed of the rotating rotor is preferably 30 to 100 m/second, more preferably 40 to 100 m/second, further preferably 50 to 100 m/second. Further, the treatment can be made by merely passing the carbonaceous material through the apparatus, but the treatment is preferably made by circulating or retaining the carbonaceous material in the apparatus for 30 seconds or more, and the treatment is more preferably made by circulating or retaining the carbonaceous material in the apparatus for one minute or more.

(2) As an example of artificial graphite, there can be mentioned one which is produced by subjecting an organic compound, such as coal tar pitch, a coal heavy oil, a normal pressure residual oil, a petroleum heavy oil, an aromatic hydrocarbon, a nitrogen-containing cyclic compound, a sulfur-containing cyclic compound, polyphenylene, polyvinyl chloride, polyvinyl alcohol, polyacrylonitrile, polyvinyl butyral, a natural polymer, polyphenylene sulfide, polyphenylene oxide, a furfuryl alcohol resin, a phenol-formaldehyde resin, or an imide resin, to graphitization generally at a temperature in the range of from 2,500 to 3,200° C. and, if necessary, subjecting the resultant material to pulverization and/or classification. In this instance, a silicon-containing compound, a boron-containing compound or the like can be used as a graphitization catalyst. In addition, there can be mentioned artificial graphite obtained by subjecting to graphitization mesocarbon microbeads separated in the process of heat treatment for pitch. Further, there can be mentioned artificial graphite of granulated particles comprising primary particles. For example, there can be mentioned graphite particles comprising a plurality of flattened particles being aggregated or bound together so that the orientation planes are not parallel to each other, wherein the particles are obtained by mixing together graphitizable carbonaceous material powders such as mesocarbon microbeads or coke, a graphitizable binder such as tar or pitch, and a graphitization catalyst to effect graphitization, and, if necessary, pulverizing the resultant material.

(3) As examples of amorphous carbon, there can be mentioned amorphous carbon particles obtained by subjecting an easily graphitizable carbon precursor, such as tar or pitch, as a raw material to heat treatment one or more times in a temperature region in which the material suffers no graphitization (in the range of from 400 to 2,200° C.), and amorphous carbon particles obtained by subjecting a non-graphitizable carbon precursor such as a resin, as a raw material to heat treatment.

(4) As an example of carbon-coated graphite, there can be mentioned a carbon graphite composite having core graphite coated with amorphous carbon, wherein the core graphite is natural graphite and/or artificial graphite obtained by mixing natural graphite and/or artificial graphite with a carbon precursor which is an organic compound, such as tar, pitch, or a resin, and subjecting the resultant mixture to heat treatment one or more times in the range of from 400 to 2,300° C. The composite may be in a form such that all of or part of the surface is coated, or in a form such that a composite of a plurality of primary particles is formed using carbon derived from the above-mentioned carbon precursor as a binder. Alternatively, a carbon graphite composite can be obtained by reacting natural graphite and/or artificial graphite with hydrocarbon gas such as benzene, toluene, methane, propane, or an aromatic volatile component, at a high temperature to deposit carbon on the surface of the graphite (CVD).

(5) As an example of graphite-coated graphite, there can be mentioned graphite-coated graphite having core graphite all of or part of the surface of which is coated with a graphitized product, wherein the core graphite is natural graphite and/or artificial graphite obtained by mixing natural graphite and/or artificial graphite with a carbon precursor which is an easily graphitizable organic compound, such as tar, pitch, or a resin, and subjecting the resultant mixture to heat treatment one or more times in the range of from about 2,400 to about 3,200° C.

(6) As an example of resin-coated graphite, there can be mentioned a resin-coated graphite having core graphite coated with a resin or the like, wherein the core graphite is natural graphite and/or artificial graphite obtained by mixing natural graphite and/or artificial graphite with, for example, a resin and drying the resultant mixture at a temperature of lower than 400° C.

Further, the carbonaceous materials (1) to (6) may be used alone or two or more types may be used in an arbitrary combination and ratio.

Examples of organic compounds, such as tar, pitch, and a resin, used in (2) to (5) above include carbonizable organic compounds selected from the group consisting of a coal heavy oil, a direct liquefaction heavy oil, a cracked petroleum heavy oil, an aromatic hydrocarbon, an N-ring compound, an S-ring compound, a polyphenylene, an organic synthetic polymer, a natural polymer, a thermoplastic resin, and a thermosetting resin. Further, for controlling the viscosity of the raw material organic compound being mixed, it may be dissolved in a low molecular-weight organic solvent.

As natural graphite and/or artificial graphite used as a raw material for the core graphite, preferred is natural graphite which has been subjected to spheronization treatment.

With respect to the alloy material used as a negative electrode active material, there is no particular limitation provided the alloy material is capable of occluding and releasing lithium, and any of lithium single substance, a metal single substance or an alloy forming a lithium alloy, and compounds thereof such as an oxide, a carbide, a nitride, a silicide, a sulfide, and a phosphide, may be used. As a metal single substance or alloy forming a lithium alloy, materials containing a metal or a semi-metal element belonging to Groups 13 and 14 (i.e., excluding carbon) are preferred, and metal single substances of aluminum, silicon, and tin and alloys or compounds containing these atoms are more preferred. These may be used alone or two or more types may be used in an arbitrary combination and ratio.

<Physical Properties of the Carbonaceous Material>

When a carbonaceous material is used as the negative electrode active material, the carbonaceous material used desirably has the following physical properties.

(X-Ray Parameter)

A d value (distance between layers) for a lattice plane (002 plane) of the carbonaceous material as determined by X-ray diffraction in accordance with a Gakushin method is generally 0.335 nm or more, and is generally 0.360 nm or less, preferably 0.350 nm or less, further preferably 0.345 nm or less. Further, a crystallite size (Lc) of the carbonaceous material as determined by X-ray diffraction in accordance with a Gakushin method is preferably 1.0 nm or more, especially, further preferably 1.5 nm or more.

(Volume-Based Average Particle Diameter)

A volume-based average particle diameter of the carbonaceous material is a volume-based average particle diameter (median diameter) as determined by a laser diffraction-scattering method, and is generally 1 μm or more, preferably 3 μm or more, further preferably 5 μm or more, especially preferably 7 μm or more, and is generally 100 μm or less, preferably 50 μm or less, more preferably 40 μm or less, further preferably 30 μm or less, especially preferably 25 μm or less.

When the volume-based average particle diameter is lower than the above range, the irreversible capacity may be increased, leading to a loss of the initial battery capacity. On the other hand, when the volume-based average particle diameter is higher than the above range, it is likely that a non-uniform applied surface is formed in the preparation of an electrode by application, and this is undesirable in view of the battery production step.

In the measurement of a volume-based average particle diameter, carbon powders are dispersed in a 0.2% by mass aqueous solution (about 10 mL) of polyoxyethylene (20) sorbitan monolaurate as a surfactant, and subjected to measurement using a laser diffraction-scattering type particle size distribution meter (for example, LA-700, manufactured by Horiba, Ltd.). A median diameter determined by the above measurement is defined as a volume-based average particle diameter of a carbonaceous material of the present invention.

(Raman R Value)

A Raman R value of the carbonaceous material is a value as measured using a laser Raman spectrum method, and is generally 0.01 or more, preferably 0.03 or more, further preferably 0.1 or more, and is generally 1.5 or less, preferably 1.2 or less, further preferably 1 or less, especially preferably 0.5 or less.

When the Raman R value is lower than the above range, the crystallinity of the particle surfaces may become excessively high resulting in a shortage of sites where lithium enters between layers accompanying charging and discharging. That is, the charge receiving property may become poor. Further, when the negative electrode is increased in density by applying the material to a current collector and then pressing it, the crystals are likely to be oriented in the direction parallel to the electrode plate, causing the load characteristics to become poor.

On the other hand, when the Raman R value is higher than the above range, the crystallinity of the particle surfaces may become poor, so that the reactivity with the nonaqueous electrolyte solution is increased, leading to a lowering of the efficiency or an increase of the gas generation.

The measurement of a Raman spectrum is conducted as follows. Using a Raman spectrometer (for example, Raman spectrometer, manufactured by JASCO Corporation), a sample is allowed to freely fall in a measurement cell to fill the cell, and, while irradiating the surface of the sample in the cell with an argon ion laser (or a semiconductor laser), the cell is rotated in a plane perpendicular to the laser. With respect to the obtained Raman spectrum, an intensity IA of a peak PA appearing around 1,580 cm$^{-1}$ and an intensity IB of a peak PB appearing around 1,360 cm$^{-1}$ are measured, and an intensity ratio R (R=IB/IA) is determined by calculation. A Raman R value determined by the above measurement is defined as a Raman R value of a carbonaceous material of the present invention.

Further, conditions for the above Raman measurement are as follows.

Laser wavelength: Ar ion laser 514.5 nm (semiconductor laser 532 nm)
Measurement range: 1,100 to 1,730 cm$^{-1}$
Raman R value: Background processing
Smoothing processing: Simple average, convolution 5-point (BET Specific Surface Area)

A BET specific surface area of the carbonaceous material is a value of specific surface area as measured using a BET method, and is generally 0.1 m$^2$·g$^{-1}$ or more, preferably 0.7 m$^2$·g$^{-1}$ or more, further preferably 1.0 m$^2$·g$^{-1}$ or more, especially preferably 1.5 m$^2$·g$^{-1}$ or more, and is generally 100 m$^2$·g$^{-1}$ or less, preferably 25 m$^2$·g$^{-1}$ or less, further preferably 15 m$^2$·g$^{-1}$ or less, especially preferably 10 m$^2$·g$^{-1}$ or less.

When the value of BET specific surface area is lower than the above range, the carbonaceous material used as a negative electrode material is likely to be poor in the receiving property for lithium during charging, so that lithium can be easily deposited on the surface of the electrode, lowering the stability. On the other hand, when the BET specific surface area is higher than the above range, the reactivity of the carbonaceous material used as a negative electrode material with the nonaqueous electrolyte solution may be increased, so that gas generation may be likely to be increased, making it difficult to obtain an advantageous battery.

The measurement of a specific surface area by a BET method is conducted as follows. Using a surface area meter (for example, Full automatic surface area measurement apparatus, manufactured by Ohkura Riken Inc.), a sample is predried in a nitrogen gas flow at 350° C. for 15 minutes and then, using a nitrogen-helium mixed gas controlled so that a value of the relative pressure of nitrogen to atmospheric pressure accurately becomes 0.3, a specific surface area is measured by a nitrogen adsorption BET one-point method according to a gas flow method.

(Circularity)

When a circularity of the carbonaceous material as a degree of the sphere is measured, the circularity is preferably in the range shown below. The circularity is defined as: "Circularity=(Length of the circumference of a corresponding circle having the same area as a projected particle shape)/(Length of the actual circumference of the projected particle shape)", and, when the circularity is 1, the shape is theoretically a true sphere.

The circularity of the carbonaceous material particles having a particle diameter in the range of from 3 to 40 μm is desirably as close to 1 as possible, and is preferably 0.1 or more, especially, preferably 0.5 or more, more preferably 0.8 or more, further preferably 0.85 or more, especially preferably 0.9 or more. As the circularity is increased, the high current density charge/discharge characteristics are improved. Therefore, when the circularity is lower than the above range, the packing property of the negative electrode active material may be lowered, so that the resistance between the particles is increased, causing the short time high current density charge/discharge characteristics to become poor.

The measurement of a circularity is conducted using a flow-type particle image analyzing apparatus (for example, FPIA, manufactured by Sysmex Corporation). About 0.2 g of a sample is dispersed in a 0.2% by mass aqueous solution (about 50 mL) of polyoxyethylene (20) sorbitan monolaurate as a surfactant, and irradiated with ultrasonic waves at 28 kHz with an output of 60 W for one minute, and then a detection range of 0.6 to 400 μm is designated and a circularity is measured with respect to particles having a particle diameter in the range of from 3 to 40 μm.

With respect to the method for improving the circularity, there is no particular limitation, but particles in a spherical shape by a spheronization treatment are preferred because the shape of voids between the particles used in an electrode body are uniform. As examples of spheronization treatments, there can be mentioned a method in which particles are mechanically rendered close to be spherical by applying a shear force or a compression force, and a mechanical or physical treatment method in which a plurality of fine particles are subjected to granulation using a binder or using an adhesive force of the particles themselves.

(Tap Density)

A tap density of the carbonaceous material is generally 0.1 g·cm$^{-3}$ or more, preferably 0.5 g·cm$^{-3}$ or more, further preferably 0.7 g·cm$^{-3}$ or more, especially preferably 1 g·cm$^{-3}$ or more, and is preferably 2 g·cm$^{-3}$ or less, further preferably 1.8 g·cm$^{-3}$ or less, especially preferably 1.6 g·cm$^{-3}$ or less. When the tap density is lower than the above range, the packing density of the carbonaceous material used as a negative electrode may be unlikely increased, making it difficult to obtain a battery having a high capacity. On the other hand, when the tap density is higher than the above range, voids between the particles in the electrode may become so small that the conductive properties between the particles are unlikely to be secured, making it difficult to obtain advantageous battery characteristics.

The measurement of a tap density is conducted as follows. A sample is passed through a sieving having a sieve opening of 300 μm, and the sample is allowed to fall in a 20 cm$^3$ tapping cell so that the cell is filled with the sample to the upper end surface of the cell, and then, using a powder density meter (for example, Tap Denser, manufactured by Seishin Enterprise Co., Ltd.), the resultant cell is subjected to tapping 1,000 times at a stroke length of 10 mm, and, from the volume measured at that time and the mass of the sample, a tap density is calculated.

(Orientation Ratio)

An orientation ratio of the carbonaceous material is generally 0.005 or more, preferably 0.01 or more, further preferably 0.015 or more, and is generally 0.67 or less. When the orientation ratio is lower than the above range, the high density charge/discharge characteristics may become poor. The upper limit of the above range is the theoretical upper limit of the orientation ratio of the carbonaceous material.

The orientation ratio is measured by X-ray diffraction with respect to a sample which has been subjected to pressure molding. A molding machine having a diameter of 17 mm is filled with 0.47 g of a sample, and the sample is compressed at 58.8 MN·m$^{-2}$, and the resultant molded material is set using clay so that the surface of the molded material is on the same surface as the surface of a sample holder for measurement, followed by an X-ray diffraction measurement. From peak intensities of the obtained (110) diffraction and (004) diffraction of carbon, a ratio represented by: (110) diffraction peak intensity/(004) diffraction peak intensity is calculated.

Conditions for the X-ray diffraction measurement are as follows. "2θ" indicates a diffraction angle.

Target: Cu (Kα-line) graphite monochromator
Slit:
   Divergence slit=0.5 degree
   Receiving slit=0.15 mm
   Scattering slit=0.5 degree
Measurement range and step angle/measurement time:
   (110) plane: 75 degrees≤2θ≤80 degrees, 1 degree/60 seconds
   (004) plane: 52 degrees≤2θ≤57 degrees, 1 degree/60 seconds (Aspect Ratio (Powder))

An aspect ratio of the carbonaceous material is generally 1 or more, and is generally 10 or less, preferably 8 or less, further preferably 5 or less. When the aspect ratio is higher than the above range, a streak may be caused or no uniform applied surface may be obtained upon forming an electrode plate, so that the high current density charge/discharge characteristics become poor. The lower limit of the above range is the theoretical lower limit of the aspect ratio of the carbonaceous material.

The measurement of an aspect ratio is conducted by observing particles of a carbonaceous material magnified by means of a scanning electron microscope. 50 arbitrary graphite particles which are fixed to the edge surface of a metal having a thickness of 50 μm or less are selected, and the stage to which the sample is fixed is rotated and tilted, and each of the particles is individually observed three-dimensionally to measure a diameter A which is the longest diameter of each carbonaceous material particle and a diameter B which is the shortest diameter perpendicular to the diameter A, and an average of A/B is determined.

(Coverage Rate)

The negative electrode active material of the present invention may be coated with a carbonaceous substance or a graphite substance. Especially, the negative electrode active material coated with an amorphous carbonaceous substance is preferred from the viewpoint of the receiving property for lithium ions, and the coverage rate is generally 0.5 to 30%, preferably 1 to 25%, more preferably 2 to 20%. When the content is too large, the amorphous carbon portion of the negative electrode active material is increased, so that the reversible capacity of the battery assembled using such a negative electrode active material tends to be small. When the content is too small, the graphite particles as a core are not uniformly coated with the amorphous carbon portion, and further strong granulation cannot be achieved, so that the particles pulverized after calcination tend to have too small a particle diameter.

A content (coverage rate) of a carbide derived from the organic compound in the finally obtained negative electrode active material can be determined from the amount of the negative electrode active material, the amount of the organic compound, and a carbon residue content measured by a micro-method in accordance with JIS K 2270 by making a calculation using the following formula.

Formula: Coverage (%) of a carbide derived from the organic compound=(Mass of the organic compound×Carbon residue content×100)/{Mass of the negative electrode active material+(Mass of the organic compound×Carbon residue content)}

(Internal Porosity)

An internal porosity of the negative electrode active material is generally 1% or more, preferably 3% or more, more preferably 5% or more, further preferably 7% or more, and is generally less than 50%, preferably 40% or less, more preferably 30% or less, further preferably 20% or less. When the internal porosity is too small, the liquid amount within the particles is reduced, so that the charge/discharge characteristics tend to become poor, and, when the internal porosity is too large, the amount of gaps between the particles in the resultant electrode is reduced, so that the electrolyte solution tends to be unsatisfactorily diffused. In addition, substances that mitigate expansion and compression of metal particles capable of alloying with Li, such as amorphous carbon, graphite substances or resin, may be present in the gaps or gaps may be filled therewith.

<Metal Particles Capable of Alloying with Li>

As a method for confirming the metal particles to be metal particles capable of alloying with Li, there can be mentioned identification of a metal particle phase by X-ray diffraction, examination of a particle structure by means of an electron microscope and an elemental analysis, and an elemental analysis by fluorescent X-ray.

With respect to the metal particles capable of alloying with Li, any of those conventionally known can be used, but, from the viewpoint of the capacity and cycle life, the metal particles are preferably, for example, a metal selected from the group consisting of Fe, Co, Sb, Bi, Pb, Ni, Ag, Si, Sn, Al, Zr, Cr, P, S, V, Mn, Nb, Mo, Cu, Zn, Ge, In, and Ti or a compound thereof. Further, an alloy of two or more metals may be used, and the metal particles may be alloy particles formed from two or more types of metal elements. Of these, preferred is a metal selected from the group consisting of Si, Sn, As, Sb, Al, Zn, and W or a metal compound thereof.

Examples of metal compounds include metal oxides, metal nitrides, and metal carbides. Alternatively, an alloy of two or more metals may be used.

Among the metal particles capable of alloying with Li, Si or a Si metal compound is preferred. The Si metal compound is preferably Si metal oxide. Si or a Si metal compound is preferred from the viewpoint of increasing the capacity. In the present specification, Si and a Si metal compound are collectively referred to as "Si compound". Specific examples of Si compounds include $SiO_x$, $SiN_x$, $SiC_x$, and $SiZ_xO_y$ (Z=C, N). The Si compound is preferably Si metal oxide, and the Si metal oxide is represented by the general formula: $SiO_x$. The general formula $SiO_x$ is obtained from Si dioxide ($SiO_2$) and metal Si (Si) as raw materials, wherein a value of x is generally: $0 \le x < 2$. $SiO_x$ has a large theoretical capacity, as compared to graphite, and further amorphous Si or Si crystals with a nano-size can easily release and receive alkali ions such as lithium ions, making it possible to obtain a high capacity.

The Si metal oxide is specifically represented by $SiO_x$, wherein x is: $0 \le x < 2$, more preferably 0.2 to 1.8, further preferably 0.4 to 1.6, especially preferably 0.6 to 1.4, and particularly, preferred is X=0. When x is in the above range, not only can high capacity be obtained, but also the irreversible capacity due to bonding of Li and oxygen can be reduced.

Average Particle Diameter (d50) of the Metal Particles Capable of Alloying with Li From the viewpoint of the cycle life, an average particle diameter (d50) of the metal particles capable of alloying with Li is generally 0.01 μm or more, preferably 0.05 μm or more, more preferably 0.1 μm or more, further preferably 0.3 μm or more, and is generally 10 μm or less, preferably 9 μm or less, more preferably 8 μm or less. When the average particle diameter (d50) is within the above range, the volume expansion caused due to the charging/discharging is reduced, so that while maintaining the charge/discharge capacity, excellent cycle characteristics can be obtained.

The average particle diameter (d50) is determined by, for example, a laser diffraction-scattering type particle size distribution measurement method.

BET Method Specific Surface Area of the Metal Particles Capable of Alloying with Li A specific surface area by a BET method of the metal particles capable of alloying with Li is generally 0.5 to 60 $m^2/g$, preferably 1 to 40 $m^2/g$. When the specific surface area by a BET method of the metal particles capable of alloying with Li is within the above range, the resultant battery advantageously has high charging/discharging efficiency and high discharge capacity, and can rapidly release and receive lithium in the high-rate charging/discharging, achieving excellent rate characteristics.

Oxygen Content of the Metal Particles Capable of Alloying with Li

With respect to the oxygen content of the metal particles capable of alloying with Li, there is no particular limitation, but the oxygen content is generally 0.01 to 8% by mass, preferably 0.05 to 5% by mass. With respect to the state of oxygen distributed in the particles, oxygen may be present near the surface of the particles, present inside of the particles, or present uniformly in the particles, but oxygen is especially preferably present near the surface of the particles. When the oxygen content of the metal particles capable of alloying with Li is within the above range, the strong bonding of Si and O advantageously suppresses volume expansion caused due to the charging/discharging, achieving excellent cycle characteristics.

<Negative Electrode Active Material Containing Metal Particles Capable of Alloying with Li and Graphite Particles>

In the present invention, the negative electrode active material containing metal particles capable of alloying with Li and graphite particles may be either a mixture in which the metal particles capable of alloying with Li and the graphite particles are in the state of being independent particles and mixed with each other, or a composite in which the metal particles capable of alloying with Li are present on the surface of or inside of the graphite particles. In the present specification, with respect to the composite (referred to also as "composite particles"), there is no particular limitation as long as the composite is particles comprising the metal particles capable of alloying with Li and a carbonaceous substance, but the composite is preferably particles having the metal particles capable of alloying with Li and the carbonaceous substance which are unified together by physical and/or chemical bonding. A more preferred mode is such that the metal particles capable of alloying with Li and the carbonaceous substance are in a state in which their solid components are dispersed in the composite particles to an extent that they are present in at least both of the surface of the composite particles and inside of the bulk, and the carbonaceous substance is present for unifying these materials by physical and/or chemical bonding. A further specifically preferred mode is a negative electrode active material which is a composite material comprising at least the metal particles capable of alloying with Li and the graphite particles, characterized in that the graphite particles, preferably natural graphite particles have a folding structure having a curved surface, and the metal particles capable of alloying with Li are present in voids in the folding structure having a curved surface of the graphite particles. Further, the voids may be gaps, or a material which mitigates the expansion or shrinkage of the metal particles capable of alloying with Li, such as amorphous carbon, a graphite substance, or a resin, may be present in the voids.

Content Proportion of the Metal Particles Capable of Alloying with Li

The content proportion of the metal particles capable of alloying with Li to the total of the metal particles capable of alloying with Li and the graphite particles is generally 0.1% by mass or more, preferably 1% by mass or more, more preferably 2% by mass or more, further preferably 3% by mass or more, especially preferably 5% by mass or more. Further, the content proportion is generally 99% by mass or less, preferably 50% by mass or less, more preferably 40% by mass or less, further preferably 30% by mass or less, still further preferably 25% by mass or less, still further preferably 20% by mass or less, especially preferably 15% or less, most preferably 10% by mass or less. When the content proportion is in the above range, a satisfactory capacity can be advantageously obtained.

The alloy material negative electrode can be produced using any known method. Specifically, as a method for producing the negative electrode, there can be mentioned, for example, a method in which a binder, a conductive material and others are added to the above-mentioned negative electrode active material and the resultant mixture is directly roll-shaped into a sheet electrode, and a method in which the above mixture is subjected to compression molding to form a pellet electrode. However, generally, a method is used in which a thin film layer containing the above-mentioned negative electrode active material (negative electrode active material layer) is formed on a current collector for negative electrode (hereinafter, may be referred to as "negative electrode current collector") by a method such as an application method, a vapor deposition method, a sputtering method, or a plating method. In this case, a binder, a thickener, a conductive material, a solvent and the like are added to the above-mentioned negative electrode active material to form a slurry, and the slurry is applied to a negative electrode current collector and dried, and then pressed so as to increase the density, forming a negative electrode active material layer on the negative electrode current collector.

Examples of materials for the negative electrode current collector include steel, a copper alloy, nickel, a nickel alloy, and stainless steel. Of these, a copper foil is preferred from the viewpoint of easy processing into a thin film and the cost.

The thickness of the negative electrode current collector is generally 1 μm or more, preferably 5 μm or more, and is generally 100 μm or less, preferably 50 μm or less. When the thickness of the negative electrode current collector is too large, the capacity of the whole battery may be excessively lowered. Conversely, when the thickness is too small, it may become difficult to handle the current collector.

For improving the bonding effect with the negative electrode active material layer to be formed on the surface, it is preferred that the surface of the negative electrode current collector is preliminarily subjected to roughening treatment. Examples of methods for roughening the surface include a blast treatment, rolling using a roughened surface roll, a mechanical polishing method in which the surface of the current collector is polished using, for example, sandpaper having abrasive particles fixed thereto, whetstone, emery buff, or a wire brush having, e.g., a steel wire, an electropolishing method, and a chemical polishing method.

Further, for reducing the mass of the negative electrode current collector to improve the energy density per mass of the battery, a negative electrode current collector of a perforated type such as an expanded metal or a punching metal, can be used. The negative electrode current collector of this type can be desirably changed in the mass by changing the opening ratio. Further, when negative electrode active material layers are formed on both surfaces of the negative electrode current collector of this type, a rivet effect due to the holes in the current collector further unlikely causes the negative electrode active material layers to be peeled off. However, when the opening ratio is too high, the contact area of the negative electrode active material layer with the negative electrode current collector is reduced, and thus the bonding strength may be rather lowered.

A slurry for forming the negative electrode active material layer is generally prepared by adding, for example, a binder and a thickener to the negative electrode material. In the present specification, the term "negative electrode material" means a material comprising a combination of a negative electrode active material and a conductive material.

The content of the negative electrode active material in the negative electrode material is generally 70% by mass or more, especially preferably 75% by mass or more, and is generally 97% by mass or less, especially preferably 95% by mass or less. When the negative electrode active material content is too small, a secondary battery using the resultant negative electrode tends to be unsatisfactory in the capacity, and, when the content is too large, the conductive material content is relatively unsatisfactory, so that the resultant negative electrode is unlikely to secure electrical conductivity. When two or more negative electrode active materials are used in combination, the amounts of the negative electrode active materials may be selected so that the total amount of the negative electrode active materials satisfies the above-mentioned range.

Examples of conductive materials used in the negative electrode include metal materials such as copper and nickel; and carbon materials, such as graphite and carbon black. These may be used alone or two or more types may be used in an arbitrary combination and ratio. Particularly, as a conductive material, a carbon material is preferably used because the carbon material acts also as an active material. The content of the conductive material in the negative electrode material is generally 3% by mass or more, especially 5% by mass or more, and is generally 30% by mass or less, especially preferably 25% by mass or less. When the conductive material content is too small, the conductivity tends to be unsatisfactory, and, when the conductive material content is too large, the content of the negative electrode active material and the like is relatively unsatisfactory, so that the battery capacity or strength tends to be lowered. When two or more conductive materials are used in combination, the amounts of the conductive materials may be selected so that the total amount of the conductive materials satisfies the above-mentioned range.

As a binder used in the negative electrode, an arbitrary binder can be used provided it is a safe material in the solvent used in producing the electrode or the electrolyte solution. Examples include polyvinylidene fluoride, polytetrafluoroethylene, polyethylene, polypropylene, a styrene-butadiene rubber, an isoprene rubber, a butadiene rubber, an ethylene-acrylic acid copolymer, and an ethylene-methacrylic acid copolymer. These may be used alone or two or more types may be used in an arbitrary combination and ratio. The amount of the binder contained, relative to 100 parts by mass of the negative electrode material, is generally 0.5 part by mass or more, especially 1 part by mass or more, and is generally 10 parts by mass or less, especially preferably 8 parts by mass or less. When the amount of the binder is too small, the resultant negative electrode tends to be unsatisfactory in the strength, and, when the amount is too large, the content of the negative electrode active material is relatively unsatisfactory, so that the battery capacity or conductivity tends to be unsatisfactory. When two or more binders are used in combination, the amounts of the binders may be selected so that the total amount of the binders satisfies the above-mentioned range.

Examples of thickeners used in the negative electrode include carboxymethyl cellulose, methyl cellulose, hydroxymethyl cellulose, ethyl cellulose, polyvinyl alcohol, oxidized starch, phosphorylated starch, and casein. These may be used alone or two or more types may be used in an arbitrary combination and ratio. A thickener may be used if necessary, and, when a thickener is used, the thickener is preferably used so that the content of the thickener in the negative electrode active material layer generally becomes in the range of from 0.5 to 5% by mass.

A slurry for forming the negative electrode active material layer is prepared by using an aqueous solvent or an organic solvent as a dispersing medium, and mixing, if necessary, a conductive material, a binder, and a thickener into the above-mentioned negative electrode active material. As an aqueous solvent, generally, water is used, and water and an organic solvent, for example, an alcohol such as ethanol, or a cyclic amide such as N-methylpyrrolidone, in an amount in the range of 30% by mass or less based on the mass of water, can be used in combination. Examples of organic solvents include, generally, cyclic amides such as N-methylpyrrolidone, linear amides such as N,N-dimethylformamide and N,N-dimethylacetamide, aromatic hydrocarbons such as anisole, toluene, and xylene, and alcohols such as butanol and cyclohexanol. Of these, cyclic amides such as N-methylpyrrolidone, and linear amides such as N,N-dimethylformamide and N,N-dimethylacetamide, are preferred. These may be used alone or two or more types may be used in an arbitrary combination and ratio.

The obtained slurry is applied onto the above-mentioned negative electrode current collector and dried, and then pressed to form a negative electrode active material layer. With respect to the method for application, there is no particular limitation, and a well-known application method can be used. With respect to the drying method, there is no particular limitation, and a known method such as natural drying, heat drying, or vacuum drying can be used.

<Construction of the Negative Electrode and Preparation Method Therefor>

In the production of an electrode, any known method can be used provided it does not significantly impair the effects of the present invention. For example, a binder, a solvent, if necessary, a thickener, a conductive material, a filler, or the like are added to a negative electrode active material to prepare a slurry, and the slurry is applied to a current collector and dried, and then pressed to form a negative electrode.

Further, when an alloy material is used, a method is also used in which a thin film layer containing the above-mentioned negative electrode active material (negative electrode active material layer) is formed by a method, such as a vapor deposition method, a sputtering method, or a plating method.

(Electrode Density)

With respect to the electrode structure of an electrode formed from the negative electrode active material, there is no particular limitation, but the density of the negative electrode active material present on the current collector is preferably 1 g·cm$^{-3}$ or more, further preferably 1.2 g·cm$^{-3}$ or more, especially preferably 1.3 g·cm$^{-3}$ or more, and is preferably 2.2 g·cm$^{-3}$ or less, more preferably 2.1 g·cm$^{-3}$ or less, further preferably 2.0 g·cm$^{-3}$ or less, especially preferably 1.9 g·cm$^{-3}$ or less. When the density of the negative electrode active material present on the current collector is higher than the above range, the negative electrode active material particles may suffer breakage, so that the initial irreversible capacity may be increased, or the high current density charge/discharge characteristics may become poor due to a lowering of the penetrating property of the non-aqueous electrolyte solution to the vicinity of the current collector/negative electrode active material interface. On the other hand, when the density is lower than the above range, the conductivity in the negative electrode active material may be lowered, so that the battery resistance is increased, lowering the capacity per unit volume.

2-2. Positive Electrode

<Positive Electrode Active Material>

A positive electrode active material (lithium transition metal compound) used in the positive electrode is described below.

<Lithium Transition Metal Compound>

The lithium transition metal compound is a compound having a structure which can eliminate and insert Li ions, and examples include a sulfide, a phosphate compound, and a lithium transition metal compound oxide. Examples of sulfides include compounds having a two-dimensional layer structure such as $TiS_2$ and $MoS_2$, and Chevrel compounds having a strong three-dimensional skeletal structure represented by the general formula: $Me_xMo_6S_8$ (wherein Me is a transition metal such as Pb, Ag, or Cu). Examples of phosphate compounds include those belonging to an Olivine structure, generally represented by $LiMePO_4$ (wherein Me is at least one transition metal), and specific examples include $LiFePO_4$, $LiCoPO_4$, $LiNiPO_4$, and $LiMnPO_4$. Examples of lithium transition metal compound oxides include those belonging to a spinel structure which enables three-dimensional diffusion, and those belonging to a layer structure which enables two-dimensional diffusion of lithium ions. Those having a spinel structure are generally represented by $LiMe_2O_4$ (wherein Me is at least one transition metal), and specific examples include $LiMn_2O_4$, $LiCoMnO_4$, $LiNi_{0.5}Mn_{0.5}O_4$, and $LiCoVO_4$. Those having a layer structure are generally represented by $LiMeO_2$ (wherein Me is at least one transition metal). Specific examples include $LiCoO_2$, $LiNiO_2$, $LiNi_{1-x}Co_xO_2$, $LiNi_{1-x-y}Co_xMn_yO_2$, $LiNi_{0.5}Mn_{0.5}O_2$, $Li_{1.2}Cr_{0.4}Mn_{0.4}O_2$, $Li_{1.2}Cr_{0.4}Ti_{0.4}O_2$, and $LiMnO_2$.

<Composition>

Further, with respect to the lithium-containing transition metal compound, for example, there can be mentioned a lithium transition metal compound represented by the compositional formula (F) or (G) below.

1) Lithium transition metal compound represented by the following compositional formula (F):

$$Li_{1+x}MO_2 \tag{F}$$

In the formula above, x is generally 0 to 0.5. M is elements comprising Ni and Mn, or Ni, Mn, and Co, and the Mn/Ni molar ratio is generally 0.1 to 5. The Ni/M molar ratio is generally 0 to 0.5. The Co/M molar ratio is generally 0 to 0.5. The Li-rich moiety represented by x is optionally substituted at a transition metal site M.

In the compositional formula (F) above, the atomic ratio for oxygen amount is described as 2 for convenience, but may be nonstoichiometric to some extent. Further, in the compositional formula above, x indicates the composition charged at the stage of producing the lithium transition metal compound. Generally, the batteries to come onto the market are subjected to aging after assembled. For this reason, the Li amount in the positive electrode may be lost due to charging/discharging. In such a case, when discharged until the voltage becomes 3 V, x may be −0.65 to 1 as measured by a compositional analysis.

With respect to the lithium transition metal compound, one which has been calcined by high-temperature calcination in an atmosphere of oxygen-containing gas for improving the crystallinity of the positive electrode active material has excellent battery characteristics.

Further, the lithium transition metal compound represented by the compositional formula (F) may be a solid solution with $Li_2MO_3$ called a 213 layer, as shown in the following general formula (F').

$$\alpha Li_2MO_3 \cdot (1-\alpha)LiM'O_2 \tag{F'}$$

In the general formula above, α is a number satisfying: 0<α<1.

M is at least one metal element having an average oxidation number of 4+, specifically, at least one metal element selected from the group consisting of Mn, Zr, Ti, Ru, Re, and Pt.

M' is at least one metal element having an average oxidation number of 3+, preferably at least one metal element selected from the group consisting of V, Mn, Fe, Co, and Ni, more preferably at least one metal element selected from the group consisting of Mn, Co, and Ni.

2) Lithium transition metal compound represented by the following general compositional formula (Q):

$$Li[Li_aM_bMn_{2-b-a}]O_{4+\delta} \qquad (G)$$

In the formula above, M is an element comprising at least one of transition metals selected from Ni, Cr, Fe, Co, Cu, Zr, Al, and Mg.

The value of b is generally 0.4 to 0.6.

When the value of b is in the above range, the energy density per unit weight in the lithium transition metal compound is high.

The value of a is generally 0 to 0.3. Further, in the compositional formula above, a indicates the charged composition at the stage of producing the lithium transition metal compound. Generally, the batteries to come onto the market are subjected to aging after assembled. For this reason, the Li amount in the positive electrode may be lost due to charging/discharging. In such a case, when discharged until the voltage becomes 3 V, a may be −0.65 to 1 as measured by a compositional analysis.

When the value of a is in the above range, the energy density per unit weight in the lithium transition metal compound is not largely damaged, and further excellent load characteristics can be obtained.

Further, the value of δ is generally in the range of ±0.5.

When the value of δ is in this range, the lithium transition metal compound has high stability as a crystal structure, and a battery having an electrode prepared using the lithium transition metal compound has excellent cycle characteristics and excellent high-temperature storage characteristics.

In the lithium-nickel-manganese compound oxide of a composition of the lithium transition metal compound, a chemical meaning of the lithium composition is described below in detail.

For determining a and b in the compositional formula of the lithium transition metal compound, the individual transition metals and lithium are analyzed by an inductively coupled plasma emission spectrometry apparatus (ICP-AES), and a Li/Ni/Mn ratio is determined to calculate a and b.

In view of the structure, the lithium for a is considered to be substituted at the same transition metal site. The average valence of M and manganese is larger than 3.5 due to the lithium for a according to the charge neutral principle.

Further, the lithium transition metal compound may be substituted with fluorine, and is represented by $LiMn_2O_{4-x}F_{2x}$.

<Blend>

Specific examples of lithium transition metal compounds having the above-mentioned composition include $Li_{1+x}Ni_{0.5}Mn_{0.5}O_2$, $Li_{1+x}Ni_{0.85}Co_{0.10}Al_{0.05}O_2$, $Li_{1+x}Ni_{0.33}Mn_{0.33}Co_{0.33}O_2$, $Li_{1+x}Ni_{0.45}Mn_{0.45}Co_{0.1}O_2$, $Li_{1+x}Mn_{1.8}Al_{0.2}O_4$, and $Li_{1+x}Mn_{1.5}Ni_{0.5}O_4$. These lithium transition metal compounds may be used alone or two or more of them may be used in the form of a blend.

<Introducing a Heteroelement>

The lithium transition metal compound may have incorporated thereinto a heteroelement. The heteroelement is at least one selected from B, Na, Mg, Al, K, Ca, Ti, V, Cr, Fe, Cu, Zn, Sr, Y, Zr, Nb, Ru, Rh, Pd, Ag, In, Sb, Te, Ba, Ta, Mo, W, Re, Os, Ir, Pt, Au, Pb, La, Ce, Pr, Nd, Sm, Eu, Gd, Tb, Dy, Ho, Er, Tm, Yb, Lu, Bi, N, F, S, Cl, Br, I, As, Ge, P, Pb, Sb, Si, and Sn. These heteroelements may be incorporated into the crystal structure of the lithium transition metal compound, or may not be incorporated into the crystal structure of the lithium transition metal compound but be topically present, for example, on the surface of the particles or in the crystal grain boundary in the form of a single substance or a compound.

[Positive Electrode for Lithium Secondary Battery]

A positive electrode for lithium secondary battery has formed on a current collector a positive electrode active material layer containing the above-mentioned lithium transition metal compound powders for lithium secondary battery positive electrode material and a binder.

The positive electrode active material layer is generally prepared by mixing together the positive electrode material and a binder, and, if necessary, a conductive material, a thickener or the like in a dry process, and shaping the resultant mixture into a sheet form, and pressure-bonding the resultant sheet to a positive electrode current collector, or by dissolving or dispersing these materials in a liquid medium to form a slurry, and applying the slurry to the positive electrode current collector and drying the applied slurry.

As a material for the positive electrode current collector, generally, a metal material such as aluminum, stainless steel, nickel plating, titanium, or tantalum, or a carbon material such as carbon cloth or carbon paper, is used. With respect to the shape of the material, examples of shapes of the metal material include a metal foil, a metal cylinder, a metal coil, a metal plate, a metal thin film, an expanded metal, a punching metal, and a foamed metal, and examples of shapes of the carbon material include a carbon plate, a carbon thin film, and a carbon cylinder. A thin film may be appropriately formed in a mesh form.

When the positive electrode current collector is used in the form of a thin film, the thickness of the thin film is arbitrary, but is generally preferably in the range of from 1 μm to 100 mm. When the thickness is smaller than the above range, the strength required for the current collector can be unsatisfactory. On the other hand, when the thickness is larger than the above range, the handling properties can deteriorate.

With respect to the binder used in preparing the positive electrode active material layer, there is no particular limitation, and, in the case of application method, the binder is not limited provided it is a material stable in the liquid medium used in producing the electrode, and specific examples include resin polymers such as polyethylene, polypropylene, polyethylene terephthalate, polymethyl methacrylate, aromatic polyamide, cellulose, and nitrocellulose; rubber polymers such as an SBR (styrene-butadiene rubber), an NBR (acrylonitrile-butadiene rubber), a fluororubber, an isoprene rubber, a butadiene rubber, and an ethylene-propylene rubber; thermoplastic elastomeric polymers such as a styrene-butadiene-styrene block copolymer and a hydrogenation product thereof, an EPDM (ethylene-propylene-diene terpolymer), a styrene-ethylene-butadiene-ethylene copolymer, a styrene-isoprene-styrene block copolymer, and a hydrogenation product thereof; soft resin polymers such as syndiotactic 1,2-polybutadiene, polyvinyl acetate, an ethylene-vinyl acetate copolymer, and a propylene-α-olefin copolymer; fluorine polymers such as polyvinylidene fluoride, polytetrafluoroethylene, fluorinated polyvinylidene fluoride, and a polytetrafluoroethylene-ethylene copolymer; and a polymer composition having ionic conductivity of alkali metal ions (particularly, lithium ions). These materials may be used alone or two or more types may be used in an arbitrary combination and ratio.

The content of the binder in the positive electrode active material layer is generally 0.1 to 80% by weight. When the binder content is too small, the positive electrode active material cannot be satisfactorily held, so that the positive electrode becomes unsatisfactory in mechanical strength, causing battery performance such as cycle characteristics, to be poor. On the other hand, when the binder content is too large, the battery capacity or conductivity can be lowered.

The positive electrode active material layer generally contains a conductive material for improving the conductivity. With respect to the type of the conductive material, there is no particular limitation, but specific examples include metal materials such as copper and nickel; graphite such as natural graphite and artificial graphite; carbon black such as acetylene black; and carbon materials, e.g., amorphous carbon such as needle coke. These materials may be used alone or two or more types may be used in an arbitrary combination and ratio. The content of the conductive material in the positive electrode active material layer is generally 0.01 to 50% by weight. When the conductive material content is too low, the conductivity may become unsatisfactory. Conversely, when the conductive material content is too high, the battery capacity may be lowered.

With respect to the type of the liquid medium for forming a slurry, there is no particular limitation provided it is a solvent which can dissolve or disperse therein a lithium transition metal compound powders as a positive electrode material, a binder, and a conductive material and a thickener which are used if necessary, and both an aqueous solvent or an organic solvent may be used. Examples of aqueous solvents include water and an alcohol, and examples of organic solvents include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, ethylene oxide, tetrahydrofuran (THF), toluene, acetone, dimethyl ether, dimethylacetamide, hexamethylphosphoramide, dimethyl sulfoxide, benzene, xylene, quinoline, pyridine, methylnaphthalene, and hexane. Especially when an aqueous solvent is used, a dispersant as well as a thickener are added and a latex such as an SBR, is used to form a slurry. These solvents may be used alone or two or more types may be used in an arbitrary combination and ratio.

The content proportion of the lithium transition metal compound powders as a positive electrode material in the positive electrode active material layer is generally 10 to 99.9% by weight. When the proportion of the lithium transition metal compound powder in the positive electrode active material layer is too large, the strength of the positive electrode tends to be unsatisfactory, and, when the proportion is too small, the capacity may be unsatisfactory.

Further, the thickness of the positive electrode active material layer is generally about 10 to about 200 µm.

The electrode density of the positive electrode after being pressed is generally 2.2 to 4.2 $g/cm^3$.

The positive electrode active material layer obtained after application and drying is preferably consolidated by, for example, a roller press for increasing the packing density of the positive electrode active material.

Thus, a positive electrode for a lithium secondary battery can be prepared.

2-3. Separator

For preventing the occurrence of short-circuit, generally, a separator is disposed between the positive electrode and the negative electrode. In this case, generally, the separator is impregnated with the nonaqueous electrolyte solution of the present invention.

With respect to the material and shape of the separator, there is no particular limitation, and any arbitrary known separator can be employed provided it does not significantly impair the effects of the present invention. Especially, a separator using, for example, a resin, glass fibers, or an inorganic material, which is formed from a material stable in the nonaqueous electrolyte solution of the present invention is used, and a separator in the form of a porous sheet or nonwoven fabric having excellent liquid retaining properties is preferably used.

As a material for the resin or glass fiber separator, for example, polyolefin such as polyethylene or polypropylene, aromatic polyamide, polytetrafluoroethylene, polyether sulfone, or a glass filter can be used. Of these, preferred are a glass filter and polyolefin, and further preferred is polyolefin. These materials may be used alone or two or more types may be used in an arbitrary combination and ratio.

The thickness of the separator is arbitrary, but is generally 1 µm or more, preferably 5 µm or more, further preferably 10 µm or more, and is generally 50 µm or less, preferably 40 µm or less, further preferably 30 µm or less. When the separator is too thin as compared with the above range, the insulation properties or mechanical strength may be lowered. On the other hand, when the separator is too thick as compared with the above range, battery performance such as rate characteristics, may be lowered, and further the energy density of the whole nonaqueous electrolyte secondary battery may be lowered.

Further, when a porous separator such as a porous sheet or nonwoven fabric is used as a separator, the porosity of the separator is arbitrary, but is generally 20% or more, preferably 35% or more, further preferably 45% or more, and is generally 90% or less, preferably 85% or less, further preferably 75% or less. When the porosity is far smaller than the above range, the film resistance tends to be increased, so that the rate characteristics become poor. On the other hand, when the porosity is far larger than the above range, the separator tends to be lowered in mechanical strength, so that the insulation properties become poor.

Further, the average pore diameter of the separator is also arbitrary, but is generally 0.5 µm or less, preferably 0.2 µm or less, and is generally 0.05 µm or more. When the average pore diameter is higher than the above range, short-circuit is likely to occur. On the other hand, when the average pore diameter is lower than the above range, the film resistance may be increased, so that the rate characteristics become poor.

On the other hand, as an inorganic material, for example, an oxide such as alumina or silicon dioxide, a nitride such as aluminum nitride or silicon nitride, or a sulfate such as barium sulfate or calcium sulfate is used, and an inorganic material in a particulate shape or in a fibrous shape is used.

With respect to the form of the separator, a separator in the form of a thin film such as nonwoven fabric, woven fabric, or a microporous film, is used. A separator in the form of a thin film having a pore diameter of 0.01 to 1 µm and a thickness of 5 to 50 µm is preferably used. Other than the above-mentioned separator in the form of an independent thin film, a separator having a composite porous layer containing the above-mentioned inorganic particles formed on the surface layer of the positive electrode and/or the negative electrode using a binder made of a resin can be used. For example, there can be mentioned a porous layer of alumina particles having a 90% particle diameter of less than 1 μm formed on both surfaces of the positive electrode using a fluororesin as a binder.

The characteristics of the separator in the nonaqueous electrolyte secondary battery can be grasped by a Gurley value. The Gurley value indicates how difficult air penetrates a film in the thicknesswise direction of the film, and is represented by a period of time (seconds) required for 100 ml of air to penetrate the film, and a smaller Gurley value means that air easily penetrates the film, and a larger Gurley value means that air unlikely penetrates the film. That is, the smaller Gurley value means an excellent communication of the film in the thicknesswise direction of the film, and the larger Gurley value means a poor communication of the film in the thicknesswise direction of the film. The communication indicates a degree of the pores communicating in the thicknesswise direction of the film. When the separator in the present invention has a low Gurley value, the separator can be used in a variety of applications. For example, when used as a separator for a nonaqueous lithium secondary battery, the separator having a low Gurley value advantageously facilitates the movement of lithium ions, achieving excellent battery performance. The Gurley value of the separator is arbitrary, but is preferably 10 to 1,000 seconds/100 ml, more preferably 15 to 800 seconds/100 ml, further preferably 20 to 500 seconds/100 ml. When the Gurley value is 1,000 seconds/100 ml or less, the separator has a substantially low electrical resistance and is preferred as a separator.

2-4. Battery Design

<Electrode Group>

An electrode group may be either of a stacked structure comprising the above-mentioned positive electrode plate and negative electrode plate having disposed therebetween the above separator, or of a structure comprising the above-mentioned positive electrode plate and negative electrode plate having disposed therebetween the above separator and being spirally wound. The ratio of the volume of the electrode group to the internal volume of the battery (hereinafter, referred to as "electrode group volume ratio") is generally 40% or more, preferably 50% or more, and is generally 90% or less, preferably 80% or less.

When the electrode group volume ratio is lower than the above range, the battery capacity is reduced. On the other hand, when the electrode group volume ratio is higher than the above range, a vacant space is less such that the members may be expanded or the vapor pressure of the liquid component of the electrolyte may be increased to raise the internal pressure when the battery is subjected to high temperature, causing various characteristics of the battery such as charge/discharge repeating performance and high-temperature storage characteristics, to become poor, and causing further, a gas release valve for releasing the internal pressure to the outside to activate.

<Outer Casing>

With respect to the material for an outer casing, there is no particular limitation provided it is a material stable in the nonaqueous electrolyte solution used. Specifically, a metal such as a nickel-plated steel plate, stainless steel, aluminum, an aluminum alloy, or a magnesium alloy, or a stacked film of a resin and an aluminum foil (laminated film) is used. From the viewpoint of the weight reduction, a metal of aluminum or an aluminum alloy, or a laminated film is preferably used.

As an outer casing using the metal, there can be mentioned an outer casing such that the metal is welded together by laser welding, resistance welding, or ultrasonic welding to form a sealed structure, and an outer casing such that the metal is used through a gasket made of a resin to form a caulking structure. As an outer casing using the laminated film, there can be mentioned an outer casing such that the resin layers are heat-fused together to form a sealed structure. For improving the sealing property, the resin layers may have disposed therebetween another resin different from the resin used in the laminated film. Especially when the resin layers are heat-fused through a current collector terminal to form a closed structure, bonding of the metal with the resin is to be made, and therefore, as another resin disposed between the layers, a resin having a polar group or a modified resin having a polar group introduced thereinto is preferably used.

<Protective Element>

As a protective element, for example, PTC (Positive Temperature Coefficient) which increases a resistance when accidental heat generation occurs or a very high current flows, a temperature fuse, a thermistor, a valve which shuts off a current flowing the circuit caused by a rapid increase of the internal pressure or internal temperature of the battery when accidental heat generation occurs (current shut-off valve) can be used. As the protective element, one which does not activate under conditions for general use of the battery at a high current is preferably selected, and a design is more preferably selected such that accidental heat generation or thermal runaway does not occur even without the protective element.

(Outer Package)

The nonaqueous electrolyte secondary battery of the present invention generally comprises, for example, the above-mentioned nonaqueous electrolyte solution, negative electrode, positive electrode, and separator, which are contained in an outer package (outer casing). With respect to the outer package, there is no limitation, and an arbitrary known outer package can be employed provided it does not significantly impair the effects of the present invention.

With respect to the material for the outer casing, there is no particular limitation provided it is a material stable in the nonaqueous electrolyte solution used. Specifically, a metal such as a nickel-plated steel plate, stainless steel, aluminum, an aluminum alloy, a magnesium alloy, nickel, or titanium, or a stacked film of a resin and an aluminum foil (laminated film) is used. From the viewpoint of the weight reduction, a metal of aluminum or an aluminum alloy, or a laminated film is preferably used.

As an outer casing using the metal, there can be mentioned an outer casing such that the metal is welded together by laser welding, resistance welding, or ultrasonic welding to form a sealed structure, and an outer casing such that the metal is used through a gasket made of a resin to form a caulking structure. As an outer casing using the laminated film, there can be mentioned an outer casing such that the resin layers are heat-fused together to form a sealed structure. For improving the sealing property, the resin layers may have disposed therebetween another resin different from the resin used in the laminated film. Especially when the resin layers are heat-fused through a current collector terminal to form a closed structure, bonding of the metal with the resin is to be made, and therefore, as another resin disposed between the layers, a resin having a polar group or a modified resin having a polar group introduced thereinto is preferably used.

Further, the shape of the outer casing is arbitrary, and may be any of, for example, a cylindrical shape, a rectangular shape, a laminate type, a coin type, and a large-sized.

EXAMPLES

Hereinbelow, the present invention will be described in more detail with reference to the following Examples and Comparative Examples, which should not be construed as limiting the scope of the present invention.

The abbreviations for the compounds used in the present Examples are shown below.

Lithium fluorosulfonate; FSLi
Lithium difluorophosphate; DFPLi
Hexamethylene diisocyanate; HMDI
1,3-Bis(isocyanatomethyl)cyclohexane; BIMCH
Lithium bis(fluorosulfonyl)imide; LiFSI
p-Toluenesulfonyl isocyanate; TSI
Diisocyanatosulfone; DIS
Fluorosulfonylmethane; $FSO_2Me$
Ethyl isocyanate; EtNCO
Isopropyl isocyanate; iso-PrNCO
tert-Butyl isocyanate; tert-BuNCO
Methyl fluorosulfonate; $FSO_3Me$
Benzenesulfonyl fluoride; $FSO_2Ph$
Benzylsulfonyl fluoride; $FSO_2CH_2Ph$
1,3-Propane sultone: PS
Maleic anhydride: MAL
Vinylene carbonate: VC
Vinylethylene carbonate: VEC Examples 1-1 to 1-7 and Comparative Example 1-1

[Preparation of a Positive Electrode]

85% by mass of lithium-nickel-cobalt-manganese compound oxide (NMC) as a positive electrode active material, 10% by mass of acetylene black as a conductive material, and 5% by mass of polyvinylidene fluoride (PVdF) as a binder were mixed in an N-methylpyrrolidone solvent using a disperser to form a slurry. The slurry was uniformly applied to both surfaces of an aluminum foil having a thickness of 21 μm, and dried and then pressed to obtain a positive electrode.

[Preparation of a Negative Electrode]

50 g of Si fine particles having an average particle diameter of 0.2 μm were dispersed in 2,000 g of flaky graphite having an average particle diameter of 35 μm, and the resultant mixture was placed in a hybridization system (manufactured by Nara Machinery Co., Ltd.), and circulated or retained in the apparatus at a rotor rotational speed of 7,000 rpm for 180 seconds to effect a treatment, obtaining a composite of Si and graphite particles. Into the obtained composite was mixed coal tar pitch as an organic compound which is to constitute a carbonaceous substance so that the coverage rate became 7.5% after calcination, and the resultant mixture was kneaded and dispersed by means of a twin-screw kneader. The resultant dispersion was introduced into a calcination furnace and calcined under a nitrogen atmosphere at 1,000° C. for 3 hours. The resultant calcination product was further pulverized by means of a hammer mill, followed by sieving (45 μm), to prepare a negative electrode active material. The silicon element content (Si content), average particle diameter d50, tap density, and specific surface area measured by the above-mentioned measurement methods were, respectively, 2.0% by mass, 20 μm, 1.0 g/cm$^3$, and 7.2 m$^2$/g.

Negative electrode active materials 1 to 4 having different Si contents shown in Table 1 were individually prepared by the same method as mentioned above. The Si content is a concentration by mass (% by mass) of the Si fine particles, based on the total of the Si fine particles and the graphite particles (100% by mass), as obtained from the results of analysis. In other Examples in which the respective Si contents are indicated as 2.0 wt %, 7.3 wt %, 12.5 wt %, and 17.4 wt %, negative electrode active materials 1, 2, 3, and 4 shown in Table 1 below are respectively used.

TABLE 1

| | Si Content wt % | Average particle diameter (d50) μm | Tap density g/cm$^3$ | Specific surface area m$^2$/g |
|---|---|---|---|---|
| Negative electrode active material 1 | 2.0 | 20 | 1.0 | 7.2 |
| Negative electrode active material 2 | 7.3 | 20 | 1.1 | 11.7 |
| Negative electrode active material 3 | 12.5 | 20 | 1.1 | 13.0 |
| Negative electrode active material 4 | 17.4 | 23 | 1.0 | 11.0 |

97.5 Parts by mass of a negative electrode active material, 1 part by mass of an aqueous dispersion of sodium carboxymethyl cellulose (sodium carboxymethyl cellulose concentration: 1% by mass) as a thickener, and 1.5 part by mass of an aqueous dispersion of a styrene-butadiene rubber (styrene-butadiene rubber concentration: 50% by mass) as a binder were mixed together using a disperser to form a slurry. The slurry was uniformly applied to one surface of a copper foil having a thickness of 10 and dried and then pressed to obtain a negative electrode.

[Preparation of a Nonaqueous Electrolyte Solution]

Under a dry argon atmosphere, satisfactorily dried $LiPF_6$ was dissolved in a mixture of ethylene carbonate (EC), fluoroethylene carbonate (MFEC), ethylmethyl carbonate (EMC), and diethyl carbonate (DEC) (volume ratio: 2:1:4:3) at 1.2 mol/L (in terms of a concentration in the nonaqueous electrolyte solution) (the resultant solution is referred to as "reference electrolyte solution 1"). Compounds (additives) were individually added in their respective proportions shown in Table 2 below to the entire reference electrolyte solution 1 to prepare electrolyte solutions. Comparative Example 1-1 corresponds to reference electrolyte solution 1 per se.

[Production of a Nonaqueous Electrolyte Battery (Laminate-Type)]

The above-prepared positive electrode and negative electrode and a polyolefin separator were stacked in the order of the negative electrode, separator, and positive electrode. The thus obtained battery element was wrapped in an aluminum laminated film, and the below-mentioned electrolyte solution was injected into the wrapped element, followed by vacuum sealing, to produce a nonaqueous electrolyte secondary battery in a sheet form.

<Evaluation of the Nonaqueous Electrolyte Secondary Battery>

[High-Temperature Cycle Test]

In a thermostatic chamber at 25° C., with respect to the nonaqueous electrolyte secondary battery of a laminate-type cell, constant-current charging was conducted at a current corresponding to 0.05 C until the voltage became 4.0 V (hereinafter, frequently referred to as "CC charging"), and constant-current discharging was conducted at 0.05 C until the voltage became 2.75 V (hereinafter, frequently referred to as "CC discharging"). Then, constant-current constant-voltage charging was conducted at 0.2 C until the voltage became 4.1 V (hereinafter, frequently referred to as "CC-CV charging") (0.05 C cut), and CC discharging was conducted at 0.2 C until the voltage became 2.75 V. Subsequently, CC-CV was conducted at 0.2 C until the voltage became 4.2 V, and then discharging was conducted at 0.2 C until the voltage became 2.75 V, and this operation was repeated twice to effect conditioning. The "1 C" indicates a current value at which the reference capacity of the battery is discharged in one hour, and, for example, 0.2 C indicates ⅕ of that current.

In a thermostatic chamber at 45° C., with respect to the cell which had been subjected to conditioning, CCCV charging was conducted at 0.5 C until the voltage became 4.2 V, and then discharging was conducted at a constant current of 0.5 C until the voltage became 2.75 V, and a series of these operations was taken as 1 cycle, and 100 cycles and 200 cycles were performed.

A capacity maintaining ratio at the 100th cycle was determined by making a calculation as follows.

Capacity maintaining ratio at 100th cycle=(Capacity at 100th cycle)/(Capacity at 1st cycle)×100

Further, the capacity maintaining ratio at the 100th cycle of the nonaqueous electrolyte secondary battery in Comparative Example 1-1 using reference electrolyte solution 1 per se was taken as 100, and a value relative to this (100) of the capacity maintaining ratio at the 100th cycle of each of the batteries in Examples 1-1 to 1-7 having the respective negative electrode active materials each having a predetermined Si content was determined. The determined values are shown in Table 2.

In the table, the "%" for each compound (additive) means % by mass of the compound (additive) in the nonaqueous electrolyte solution (100% by mass).

In Examples 1-1 to 1-7 and Comparative Example 1-1, using silicon powders as a negative electrode active material, a battery was produced as shown below, and a test was conducted. In the table, the Si content is indicated by 100% by mass.

[Preparation of a Nonaqueous Electrolyte Solution]

Under a dry argon atmosphere, satisfactorily dried $LiPF_6$ was dissolved in a mixture of monofluoroethylene carbonate and ethylmethyl carbonate (EMC) (volume ratio: 2:8) at 1 mol/L (in terms of a concentration in the nonaqueous electrolyte solution) (the resultant solution is referred to as "reference electrolyte solution 1'"). Compounds were individually added in their respective proportions shown in Table 2 below to the entire reference electrolyte solution 1' to prepare electrolyte solutions. In Comparative Example 1-1, examples in which the Si content is indicated by 100% by mass are those in which reference electrolyte solution 1' per se was used.

[Preparation of a Positive Electrode]

85% by mass of lithium-nickel-cobalt-manganese compound oxide (NMC) as a positive electrode active material, 10% by mass of acetylene black as a conductive material, and 5% by mass of polyvinylidene fluoride (PVdF) as a binder were mixed in an N-methylpyrrolidone solvent using a disperser to form a slurry. The slurry was uniformly applied to both surfaces of an aluminum foil having a thickness of 21 μm, and dried and then pressed to obtain a positive electrode.

[Preparation of a Negative Electrode]

Silicon powders as a negative electrode active material, graphite powders as a conductive material, and a binder were mixed together, and an N-methylpyrrolidone solution was added to the resultant mixture and mixed using a disperser to obtain a slurry. The obtained slurry was uniformly applied onto a copper foil having a thickness of 20 μm as a negative electrode current collector to form a negative electrode, and the electrode was cut so that the active material had a width of 30 mm and a length of 40 mm to obtain a negative electrode. The negative electrode was subjected to drying under reduced pressure at 60 degrees Celsius for 12 hours before use.

[Production of a Nonaqueous Electrolyte Battery (Laminate-Type)]

The above-prepared positive electrode and negative electrode and a polyolefin separator were stacked in the order of the negative electrode, separator, and positive electrode. The thus obtained battery element was wrapped in an aluminum laminated film, and the below-mentioned electrolyte solution was injected into the wrapped element, followed by vacuum sealing, to produce a nonaqueous electrolyte secondary battery in a sheet form.

<Evaluation of the Nonaqueous Electrolyte Secondary Battery>

[High-Temperature Cycle Test]

In a thermostatic chamber at 25° C., with respect to the nonaqueous electrolyte secondary battery of a coin-type cell, constant-current charging was conducted at a current corresponding to 0.05 C for 4 hours (hereinafter, frequently referred to as "CC charging"), and then constant-current constant-voltage charging was conducted at 0.2 C until the voltage became 4.0 V (hereinafter, frequently referred to as "CC-CV charging"). Then, discharging was conducted at 0.2 C until the voltage became 2.75 V. Subsequently, CC-CV was conducted at 0.2 C until the voltage became 4.0 V, and then discharging was conducted at 0.2 C until the voltage became 2.75 V to stabilize the nonaqueous electrolyte secondary battery. Then, CC-CV charging was conducted at 0.2 C until the voltage became 4.2 V, and then discharging was conducted at 0.2 C until the voltage became 2.75 V to effect initial conditioning.

In a thermostatic chamber at 45° C., with respect to the cell which had been subjected to conditioning, CCCV charging was conducted at 0.5 C until the voltage became 4.2 V, and then discharging was conducted at a constant current of 0.5 C until the voltage became 2.75 V, and a series of these operations was taken as 1 cycle, and 200 cycles were performed.

TABLE 2

| | Additive | | Value of capacity maintaining ratio at 100th cycle of each battery, relative to capacity maintaining ratio (100) at 100th cycle in Comparative Example 1-1 | | | | |
|---|---|---|---|---|---|---|---|
| | | Amount | Si Content (wt %) | | | | |
| | Type | wt % | 2.0 | 7.3 | 12.5 | 17.4 | 100 |
| Example 1-1 | HMDI | 0.3 | — | 102.3 | — | — | — |
| Example 1-2 | | 1.0 | 103.8 | 103.9 | 104.3 | 110.7 | 102.6 |
| Example 1-3 | | 3.0 | — | 107.0 | — | — | — |
| Example 1-4 | BIMCH | 0.3 | 101.3 | 102.0 | — | — | — |
| Example 1-5 | DFPLi | 0.5 | — | 103.5 | — | — | — |
| Example 1-6 | FSLi | 0.5 | 102.2 | 102.4 | — | — | 96.1 |
| Example 1-7 | | 2.5 | 103.7 | 104.7 | 102.8 | 103.0 | 101.6 |

TABLE 2-continued

| Additive | | Value of capacity maintaining ratio at 100th cycle of each battery, relative to capacity maintaining ratio (100) at 100th cycle in Comparative Example 1-1 | | | | |
|---|---|---|---|---|---|---|
| | | Si Content (wt %) | | | | |
| Type | Amount wt % | 2.0 | 7.3 | 12.5 | 17.4 | 100 |
| Comparative example 1-1 Blank | — | 100.0 | 100.0 | 100.0 | 100.0 | 100.0 |

A capacity maintaining ratio at the 200th cycle was determined by making a calculation as follows.

Capacity maintaining ratio at 200th cycle=(Capacity at 200th cycle)/(Capacity at 1st cycle)×100

Further, the capacity maintaining ratio at the 200th cycle of the nonaqueous electrolyte secondary battery in Comparative Example 1-1 using reference electrolyte solution 1 per se or reference electrolyte solution 1' per se was taken as 100, and a value, relative to this (100), of the capacity maintaining ratio at the 200th cycle of each of the batteries in Examples 1-1 to 1-7 having the respective negative electrode active materials each having a predetermined Si content was determined. The determined values are shown in Table 3.

In the table, the "%" for each compound (additive) means % by mass of the compound (additive) in the nonaqueous electrolyte solution (100% by mass).

[Table 3]

TABLE 3

| Additive | | Si Content of negative electrode active material (wt %) | Capacity maintaining ratio after 200 cycles (%) | Value of capacity maintaining ratio at 200th cycle of each battery, relative to capacity maintaining ratio (100) at 200th cycle in Comparative Example 1-1 |
|---|---|---|---|---|
| Type | Amount wt % | | | |
| Example 1-1 HMDI | 0.3 | 7.3 | 45 | 104.7 |
| Example 1-2 | 1.0 | 7.3 | 47 | 109.3 |
| Example 1-3 | 3.0 | 7.3 | 53 | 123.3 |
| Example 1-4 BIMCH | 0.3 | 7.3 | 45 | 104.7 |
| Example 1-5 DFPLi | 0.5 | 7.3 | 45 | 104.7 |
| Example 1-6 FSLi | 0.5 | 7.3 | 45 | 104.7 |
| Example 1-7 | 2.5 | 7.3 | 47 | 109.3 |
| Comparative example 1-1 Blank | — | 7.3 | 43 | 100.0 |

As seen from Tables 2 and 3, relative to 100 of the capacity maintaining ratio of the nonaqueous electrolyte secondary battery (Comparative Example 1-1) in which a specific compound was not added to the nonaqueous electrolyte solution, all the values of the capacity maintaining ratios of the nonaqueous electrolyte secondary batteries in Examples 1-1 to 1-7 were more than 100. As can seen from Table 2, the cycle characteristics are improved irrespective of the Si content of the negative electrode active material.

Examples 2-1 to 2-14 and Comparative Example 2-1

[Preparation of a Positive Electrode and a Negative Electrode]

The positive electrode and negative electrode active materials prepared in Example 1 were used.

[Preparation of a Nonaqueous Electrolyte Solution]

Under a dry argon atmosphere, satisfactorily dried $LiPF_6$ was dissolved in a mixture of EC and DEC (volume ratio: 3:7) at 1.0 mol/L (in terms of a concentration in the nonaqueous electrolyte solution), and further vinylene carbonate (VC) and fluoroethylene carbonate each in an amount of 2.0% by mass were added thereto (the resultant solution is referred to as "reference electrolyte solution 2"). Compounds were individually added in their respective proportions shown in Table 4 below to the entire reference electrolyte solution 2 to prepare electrolyte solutions. Comparative Example 2-1 corresponds to reference electrolyte solution 2 per se.

<Evaluation of the Nonaqueous Electrolyte Secondary Battery>

[High-Temperature Cycle Test]

In a thermostatic chamber at 25° C., with respect to the nonaqueous electrolyte secondary battery of a laminate-type cell, constant-current constant-voltage charging was conducted at a current corresponding to 0.05 C until the voltage became 4.0 V. Then, discharging was conducted at 0.05 C until the voltage became 2.5 V. Subsequently, CC-CV was conducted at 0.2 C until the voltage became 4.0 V, and then discharging was conducted at 0.2 C until the voltage became 2.5 V to stabilize the nonaqueous electrolyte secondary battery. Then, CC-CV charging was conducted at 0.2 C until the voltage became 4.2 V, and then discharging was conducted at 0.2 C until the voltage became 2.5 V to effect initial conditioning.

In a thermostatic chamber at 45° C., with respect to the cell which had been subjected to initial conditioning, CC-CV charging was conducted at 0.5 C until the voltage became 4.2 V, and then discharging was conducted at a constant current of 0.5 C until the voltage became 2.5 V, and a series of these operations was taken as 1 cycle, and 100 cycles were performed.

A capacity maintaining ratio at the 100th cycle was determined by making a calculation as follows.

Capacity maintaining ratio at 100th cycle=(Capacity at 100th cycle)/(Capacity at 1st cycle)×100

Further, the capacity maintaining ratio at the 100th cycle of the nonaqueous electrolyte secondary battery in Comparative Example 2-1 using reference electrolyte solution 2 per se was taken as 100, and a value, relative to this (100), of the capacity maintaining ratio at the 100th cycle of each of the batteries in Examples 2-1 to 2-14 having the respective negative electrode active materials each having a predetermined Si content was determined. The determined values are shown in Table 4.

In the table, the "%" for each compound (additive) means % by mass of the compound (additive) in the nonaqueous electrolyte solution (100% by mass).

[Table 4]

TABLE 4

| Additive | | Value of capacity maintaining ratio at 100th cycle of each battery, relative to capacity maintaining ratio (100) at 100th cycle in Comparative Example 2-1 | | | |
|---|---|---|---|---|---|
| | Amount | Si Content (wt %) | | | |
| Type | wt % | 2.0 | 7.3 | 12.5 | 17.4 |
| Example 2-1 LiFSI | 1.0 | 116.0 | 134.6 | — | — |
| Example 2-2 | 3.0 | 125.5 | 228.0 | — | — |
| Example 2-3 TSI | 1.0 | 115.1 | 124.9 | — | — |
| Example 2-4 | 2.0 | 122.7 | 139.8 | 140.5 | 413.8 |
| Example 2-5 DIS | 1.0 | 120.0 | 104.0 | — | — |
| Example 2-6 FSLi | 2.0 | 128.9 | — | — | — |
| Example 2-7 DFPLi | 0.5 | 112.0 | — | — | — |
| Example 2-8 FSO$_2$Me | 2.0 | 109.3 | — | — | — |
| Example 2-9 FSO$_3$Me | 2.0 | 110.1 | — | — | — |
| Example 2-10 FSO$_2$Ph | 2.0 | 104.7 | — | — | — |
| Example 2-11 FSO$_2$CH$_2$Ph | 2.0 | 103.9 | — | — | — |
| Example 2-12 EtNCO | 2.0 | 115.3 | — | — | — |
| Example 2-13 iso-PrNCO | 2.0 | 121.9 | — | — | — |
| Example 2-14 tert-BuNCO | 2.0 | 128.5 | — | — | — |
| Comparative example 2-1 Blank | — | 100.0 | 100.0 | 100.0 | 100.0 |

As seen from Table 4, relative to 100 of the capacity maintaining ratio after the high-temperature cycle test of the nonaqueous electrolyte secondary battery (Comparative Example 2-1) in which a specific compound was not added to the nonaqueous electrolyte solution, all the values of the capacity maintaining ratios of the nonaqueous electrolyte secondary batteries in Examples 2-1 to 2-14 were more than 100. Further, as can be seen from Examples 2-1, 2-4, and 2-5, the cycle characteristics are improved irrespective of the Si content of the negative electrode active material.

Examples 3-1 to 3-7 and Comparative Example 3-1

[Preparation of a Positive Electrode and a Negative Electrode]

The positive electrode and negative electrode active materials prepared in Example 1 were used.

[Preparation of a Nonaqueous Electrolyte Solution]

As an electrolyte solution, reference electrolyte solution 1 was used. Compounds were individually added in their respective proportions shown in Table 5 below to the entire reference electrolyte solution 1 to prepare electrolyte solutions. Comparative Example 3-1 corresponds to reference electrolyte solution 1 per se.

[Production of a Nonaqueous Electrolyte Battery (Laminate-Type)]

A nonaqueous electrolyte secondary battery in a sheet form was produced in the same manner as in Example 1.

With respect to the battery in which the Si content is indicated by 100% by mass, a battery was produced and a high-temperature cycle test was conducted under the respective conditions for battery production and high-temperature cycle test, which are described in connection with the battery in Example 1 in which the Si content is indicated by 100% by mass. In Comparative Example 3-1, examples in which the Si content is indicated by 100% by mass are those in which reference electrolyte solution 1' per se was used. With respect to the positive electrode of the battery in Example 3-5 in which the Si content is indicated by 100%, there was used the positive electrode prepared as follows.

94% by mass of lithium cobalt oxide (LiCoO$_2$) as a positive electrode active material, 3% by mass of acetylene black as a conductive material, and 3% by mass of polyvinylidene fluoride (PVdF) as a binder were mixed in an N-methylpyrrolidone solvent using a disperser to form a slurry. The slurry was uniformly applied to both surfaces of an aluminum foil having a thickness of 21 μm, and dried and then pressed to obtain a positive electrode.

<Evaluation of the Nonaqueous Electrolyte Secondary Battery>

[Battery Expansion]

With respect to the battery which had been subjected to initial conditioning under the same conditions as those in Example 1, a thickness was measured, and then a high-temperature cycle test (200 cycles) was conducted in the same manner as in Example 2. Then, a change of the thickness of the battery was measured in the same manner as in the measurement after the initial conditioning, and a change of the electrode thickness of the battery caused during the cycles was determined as "battery expansion". The evaluated batteries can contain gas generated during the cycles in a gas reservoir inside the cell. Therefore, it is apparent that the "electrode expansion" described here is not expansion due to the generated gas but expansion due to a change of the thickness of the electrode caused during the cycles.

With respect to the values shown in Table 5, the "battery expansion" after the high-temperature cycle test (200 cycles) of the nonaqueous electrolyte secondary battery in Comparative Example 3-1 using reference electrolyte solution 1 per se or reference electrolyte solution 1' per se was taken as 100, and, relative to 100 of the "battery expansion" in Comparative Example 3-1, a value of the "battery expansion" of each of the batteries in Examples 3-1 to 3-7 having the respective negative electrode active materials each having a predetermined Si content was determined. In Table 5, the "%" for each compound (additive) means % by mass of the compound (additive) in the nonaqueous electrolyte solution (100% by mass).

TABLE 5

| Additive | | Value of battery expansion at 200th cycle of each battery, relative to battery expansion (100) at 200th cycle in Comparative Example 3-1 | | | | |
|---|---|---|---|---|---|---|
| | Amount | Si Content (wt %) | | | | |
| Type | wt % | 2.0 | 7.3 | 12.5 | 17.4 | 100 |
| Example 3-1 HMDI | 0.3 | — | 94.9 | — | — | — |
| Example 3-2 | 1.0 | 89.4 | 85.6 | 97.6 | — | 105.9 |
| Example 3-3 | 3.0 | — | 82.9 | — | — | — |
| Example 3-4 BIMCH | 0.3 | 96.5 | 95.7 | — | — | — |
| Example 3-5 DFPLi | 0.5 | 94.7 | 93.1 | 83.5 | 76.7 | 109.8 |
| Example 3-6 FSLi | 0.5 | 96.5 | 96.0 | — | — | 105.9 |
| Example 3-7 | 2.5 | — | 94.4 | 81.1 | 83.6 | 100 |
| Comparative example 3-1 Blank | — | 100.0 | 100.0 | 100.0 | 100.0 | 100 |

As can be seen from Table 5, relative to 100 of the "battery expansion" after the high-temperature cycle test (200 cycles) of the nonaqueous electrolyte secondary battery (Comparative Example 3-1) in which a specific compound was not added to the nonaqueous electrolyte solution, all the values of the "battery expansion" of the nonaqueous electrolyte secondary batteries in Examples 3-1 to 3-7 are less than or slightly more than 100, which indicates that the cycle characteristics are improved irrespective of the Si content of the negative electrode active material. Especially when the Si content is 7.3% by mass or 12.5% by mass, a remarkable improvement effect has been confirmed.

Examples 4-1 to 4-14 and Comparative Example 4-1

[Preparation of a Positive Electrode and a Negative Electrode]
The positive electrode and negative electrode active materials prepared in Example 1 were used.
[Preparation of a Nonaqueous Electrolyte Solution]
As an electrolyte solution, reference electrolyte solution 2 was used. Compounds were individually added in their respective proportions shown in Table 6 below to the entire reference electrolyte solution 2 to prepare electrolyte solutions. Comparative Example 4-1 corresponds to reference electrolyte solution 2 per se.
<Evaluation of the Nonaqueous Electrolyte Secondary Battery>
[Battery Expansion]
With respect to the battery which had been subjected to initial conditioning under the same conditions as those in Example 2, a thickness was measured, and then a high-temperature cycle test (200 cycles) was conducted in the same manner as in Example 2. Then, a change of the thickness of the battery was measured in the same manner as in the measurement after the initial conditioning, and a change of the electrode thickness of the battery caused during the cycles was determined as "battery expansion". With respect to the values shown in Table 6, the "battery expansion" after the high-temperature cycle test (200 cycles) of the nonaqueous electrolyte secondary battery in Comparative Example 4-1 using reference electrolyte solution 2 per se is taken as 100, and, relative to 100 of the "battery expansion" in Comparative Example 4-1, a value of the "battery expansion" of each of the batteries in Examples 4-1 to 4-14 having the respective negative electrode active materials each having a predetermined Si content is indicated. In Table 6, the "%" for each compound (additive) means % by mass of the compound (additive) in the nonaqueous electrolyte solution (100% by mass).

TABLE 6

| | Additive | | Value of battery expansion at 200th cycle of each battery, relative to battery expansion (100) at 200th cycle in Comparative Example 4-1 | | | |
|---|---|---|---|---|---|---|
| | | Amount | Si Content (wt %) | | | |
| | Type | wt % | 2.0 | 7.3 | 12.5 | 17.4 |
| Example 4-1 | LiFSI | 1.0 | 93.5 | 88.4 | — | — |
| Example 4-2 | | 3.0 | 80.2 | 86.2 | — | — |
| Example 4-3 | TSI | 1.0 | — | 86.2 | — | — |
| Example 4-4 | | 2.0 | 91.6 | 83.3 | 80.0 | 42.9 |
| Example 4-5 | DIS | 1.0 | 82.1 | 89.9 | — | — |
| Example 4-6 | FSLi | 2.0 | 67.1 | — | — | — |
| Example 4-7 | DFPLi | 0.5 | 97.0 | — | — | — |
| Example 4-8 | FSO$_2$Me | 2.0 | 78.8 | — | — | — |
| Example 4-9 | FSO$_3$Me | 2.0 | 82.4 | — | — | — |
| Example 4-10 | FSO$_2$Ph | 2.0 | 84.7 | — | — | — |
| Example 4-11 | FSO$_2$CH$_2$Ph | 2.0 | 81.2 | — | — | — |
| Example 4-12 | EtNCO | 2.0 | 67.1 | — | — | — |
| Example 4-13 | iso-PrNCO | 2.0 | 62.4 | — | — | — |
| Example 4-14 | tert-BuNCO | 2.0 | 52.9 | — | — | — |
| Comparative example 4-1 | Blank | — | 100.0 | 100.0 | 100.0 | 100.0 |

As can be seen from Table 6, relative to 100 of the "battery expansion" after the high-temperature cycle test (200 cycles) of the nonaqueous electrolyte secondary battery (Comparative Example 4-1) in which a specific compound was not added to the nonaqueous electrolyte solution, all the "battery expansion" of the nonaqueous electrolyte secondary batteries in Examples 4-1 to 4-14 are less than 100, which indicates that the cycle characteristics are improved.

Examples 5-1 to 5-5 and Comparative Examples 5-1 to 5-5

[Preparation of a Positive Electrode]
97% by mass of lithium cobalt oxide (LiCoO$_2$) as a positive electrode active material, 1.5% by mass of acetylene black as a conductive material, and 1.5% by mass of polyvinylidene fluoride (PVdF) as a binder were mixed in an N-methylpyrrolidone solvent using a disperser to form a slurry. The slurry was uniformly applied to both surfaces of an aluminum foil having a thickness of 21 μm, and dried and then pressed to obtain a positive electrode.
[Preparation of a Negative Electrode]
97.5 Parts by mass of a negative electrode active material (graphite:SiO=95:5; mass ratio), 1 part by mass of an aqueous dispersion of sodium carboxymethyl cellulose (sodium carboxymethyl cellulose concentration: 1% by mass) as a thickener, and 1.5 part by mass of an aqueous dispersion of a styrene-butadiene rubber (styrene-butadiene rubber concentration: 50% by mass) as a binder were mixed together using a disperser to form a slurry. The slurry was uniformly applied to one surface of a copper foil having a thickness of 10 μm, and dried and then pressed to obtain a negative electrode.
[Preparation of a Nonaqueous Electrolyte Solution]
As an electrolyte solution, reference electrolyte solution 1 was used. Compounds were individually added in their respective proportions shown in Table 7 below to the entire reference electrolyte solution 1 to prepare electrolyte solutions. Comparative Example 5-1 corresponds to reference electrolyte solution 1 per se.
[Production of a Nonaqueous Electrolyte Battery (Laminate-Type)]
The above-prepared positive electrode and negative electrode and a polyolefin separator were stacked in the order of the negative electrode, separator, positive electrode, separator, and negative electrode. The thus obtained battery element was wrapped in an aluminum laminated film, and the below-mentioned electrolyte solution was injected into the wrapped element, followed by vacuum sealing, to produce a nonaqueous electrolyte secondary battery in a sheet form.
<Evaluation of the Nonaqueous Electrolyte Secondary Battery>
[High-Temperature Cycle Test]
In a thermostatic chamber at 25° C., with respect to the nonaqueous electrolyte secondary battery of a laminate-type cell, constant-current charging was conducted at a current corresponding to 0.05 C for 10 hours, and then discharging was conducted at 0.2 C until the voltage became 2.75 V. CC-CV charging was conducted at 0.2 C until the voltage became 4.1 V, and discharging was conducted at 0.2 C until the voltage became 2.75 V to stabilize the nonaqueous electrolyte secondary battery. Further, CC-CV charging was conducted at 0.2 C until the voltage became 4.2 V, and then discharging was conducted at 0.2 C until the voltage became 2.75 V to effect initial conditioning. Then, a thickness of the battery was measured. Subsequently, CCCV charging was conducted at 0.5 C until the voltage became 4.2 V, and then discharging was conducted at a constant current of 0.5 C until the voltage became 2.5 V, and a series of these operations was taken as 1 cycle and a high-temperature cycle test (200 cycles) was performed in a thermostatic chamber at 45° C.

A capacity maintaining ratio at the 200th cycle was determined by making a calculation as follows.

Capacity maintaining ratio at 200th cycle=(Capacity at 200th cycle)/(Capacity at 1st cycle)×100

Further, the capacity maintaining ratio at the 200th cycle of the nonaqueous electrolyte secondary battery in Comparative Example 5-1 using reference electrolyte solution 1 per se was taken as 100, and a value, relative to this (100), of the capacity maintaining ratio at the 200th cycle of each of the batteries in Examples 5-1 to 5-5 having the respective negative electrode active materials each having a predetermined Si content was determined. The determined values are shown in Table 7. In the table, the "%" for each compound (additive) means % by mass of the compound (additive) in the nonaqueous electrolyte solution (100% by mass).

[Battery Expansion]

A change of the thickness of the battery after 200 cycles was measured in the same manner as in the measurement after the initial conditioning, and a change of the electrode thickness of the battery caused during the cycles was determined as "battery expansion". With respect to the values shown in Table 7, the "battery expansion" after the high-temperature cycle test (200 cycles) of the nonaqueous electrolyte secondary battery in Comparative Example 5-1 using reference electrolyte solution 1 per se is taken as 100, and a value, relative to this (100), of the "battery expansion" of each of the batteries in Examples 5-1 to 5-5 having the respective negative electrode active materials each having a predetermined Si content is indicated.

Example 5-1, all the battery expansion of the nonaqueous electrolyte secondary batteries in Examples 5-1 to 5-5 are less than 100, which indicates that the improvement effect is high.

All the nonaqueous electrolyte secondary batteries (Comparative Examples 5-2 to 5-5) in which only the additive specified in the present invention was added are poorer in respect of the capacity maintaining ratio than the batteries in Examples 5-1 to 5-5, and further the improvement effect for the battery expansion is also inferior, and, in Comparative Example 5-2, the battery expansion is found to be rather deteriorated.

INDUSTRIAL APPLICABILITY

By the nonaqueous electrolyte solution of the present invention, a nonaqueous electrolyte battery can be improved in the capacity deterioration during high-temperature storage and the cycle characteristics. Therefore, the nonaqueous electrolyte solution can be advantageously used in a variety of fields including electronic devices using a nonaqueous electrolyte secondary battery. Further, the nonaqueous electrolyte solution can be advantageously used in an electrolytic capacitor, such as a lithium-ion capacitor using a nonaqueous electrolyte solution.

With respect to the application of the nonaqueous electrolyte solution and nonaqueous electrolyte secondary battery of the present invention, there is no particular limitation, and they can be used in various known applications. Specific examples of the applications include a laptop computer, an electronic book player, a mobile phone, a mobile facsimile machine, a mobile copying machine, a mobile printer, a mobile audio player, a small-size video camera, a liquid crystal television, a hand-held cleaner, a transceiver, an electronic notebook, an electronic calculator, a memory card, a mobile tape recorder, a radio, a backup power supply, an automobile, a motorcycle, a bicycle fitted with a motor,

TABLE 7

|  | Electrolyte solution | Additive 1 | | Additive 2 | | High-temperature cycle test*[1] | Battery expansion*[2] |
|---|---|---|---|---|---|---|---|
|  |  | Type | Amount wt % | Type | Amount wt % |  |  |
| Example 5-1 | 1.2M LiPF$_6$ | BIMCH | 0.3 | — | — | 108 | 74 |
| Example 5-2 | EC/MFEC/EMC/DEC = | BIMCH | 0.3 | PS | 2.0 | 110 | 52 |
| Example 5-3 | 2/1/4/3 | BIMCH | 0.3 | MAL | 0.3 | 110 | 59 |
| Example 5-4 |  | BIMCH | 0.3 | VC | 2.0 | 113 | 59 |
| Example 5-5 |  | BIMCH | 0.3 | VEC | 0.5 | 111 | 59 |
| Comparative example 5-1 |  | — | — | — | — | 100 | 100 |
| Comparative example 5-2 |  | PS | 2.0 | — | — | 100 | 105 |
| Comparative example 5-3 |  | MAL | 0.3 | — | — | 99 | 86 |
| Comparative example 5-4 |  | VC | 2.0 | — | — | 104 | 86 |
| Comparative example 5-5 |  | VEC | 0.5 | — | — | 102 | 90 |

*[1]Value of capacity maintaining ratio at 200th cycle of each battery, relative to capacity maintaining ratio (100) at 200th cycle in Comparative Example 5-1
*[2]Value of battery expansion at 200th cycle of each battery, relative to battery expansion (100) at 200th cycle in Comparative Example 5-1

As seen from Table 7, relative to 100 of the capacity maintaining ratio after the high-temperature cycle test of the nonaqueous electrolyte secondary battery (Comparative Example 5-1) in which a specific compound was not added to the nonaqueous electrolyte solution, all the values of the capacity maintaining ratios of the nonaqueous electrolyte secondary batteries in Examples 5-1 to 5-5 were more than 100, Relative to 100 of the battery expansion after the high-temperature cycle test of the battery in Comparative a bicycle, lighting fixtures, a toy, a video game machine, a clock, an electric tool, a stroboscope, and a camera.

The invention claimed is:

1. A nonaqueous electrolyte battery, comprising a positive electrode and a negative electrode each being capable of occluding and releasing metal ions, and a nonaqueous electrolyte solution, wherein the nonaqueous electrolyte solution comprises an electrolyte, a nonaqueous solvent, at least one member selected from the group consisting of a compound having a fluorosulfonyl structure (—SO$_2$F), lithium difluorophosphate, and an isocyanate compound, wherein the negative electrode comprising a negative electrode active material comprises metal particles capable of alloying with Li and graphite particles, said metal particles being particles of Si or particles of Si metal oxide, and wherein the content of the metal particles capable of alloying with Li is 0.1 to 25% by mass, based on the total of the metal particles capable of alloying with Li and the graphite particles, wherein the compound having a fluorosulfonyl structure (—SO$_2$F) is lithium fluorosulfonate or lithium bis(fluorosulfonyl)imide, and wherein the isocyanate compound is at least one member selected from the group consisting of: isopropyl isocyanate, tert-butyl isocyanate, cyclohexyl isocyanate, vinyl isocyanate, allyl isocyanate, ethynyl isocyanate, propynyl isocyanate, monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-bis(isocyanatomethyl)cyclohexane, dicyclohexylmethane-4,4'-diisocyanate, bicyclo[2.2.1]heptan-2,5-diyl bis(methyl isocyanate), bicyclo[2.2.1]heptan-2,6-diyl bis(methyl isocyanate), isophorone diisocyanate, 2,2,4-trimethylhexamethylene diisocyanate, 2,4,4-trimethylhexamethylene diisocyanate, p-toluenesulfonyl isocyanate, and diisocyanatosulfone.

2. The nonaqueous electrolyte battery according to claim 1, wherein the negative electrode active material comprising metal particles capable of alloying with Li and graphite particles is a composite of Si, Si metal oxide, or a combination thereof, and graphite particles.

3. The nonaqueous electrolyte battery according to claim 2, wherein the content of the metal particles capable of alloying with Li is 0.1 to 10% by mass, based on the total of the metal particles capable of alloying with Li and the graphite particles.

4. The nonaqueous electrolyte battery according to claim 1, wherein the content of the metal particles capable of allowing with Li is 0.1 to 20° by mass, based on the total of the metal particles capable of alloying with Li and the graphite particles.

5. The nonaqueous electrolyte battery according to claim 1, wherein the content of the metal particles capable of alloying with Li is 0.1 to 15% by mass, based on the total of the metal particles capable of alloying with Li and the graphite particles.

6. The nonaqueous electrolyte battery according to claim 1 which comprises an isocyanate compound

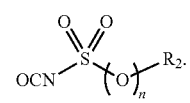

(C)

7. The nonaqueous electrolyte battery according to claim 1, wherein the content of the at least one member selected from the group consisting of compound having a fluorosulfonyl structure (—SO$_2$F), the lithium difluorophosphate, and the isocyanate compound, is 0.01% by mass to 10.0% by mass, based on the total amount of the nonaqueous electrolyte solution.

8. The nonaqueous electrolyte battery according to claim 1, wherein the nonaqueous electrolyte solution comprises at least one compound selected from the group consisting of a cyclic carbonate having a carbon-carbon unsaturated bond, a cyclic carbonate having a fluorine atom, an acid anhydride compound, a cyclic sulfonic ester compound, and a compound having a cyano group.

9. The nonaqueous electrolyte battery according to claim 8, wherein the content of the at least one compound selected from the group consisting of a cyclic carbonate having a carbon-carbon unsaturated bond, a cyclic carbonate having a fluorine atom, an acid anhydride compound, a cyclic sulfonic ester compound, and a compound having a cyano group is 0.001% by mass to 10% by mass, based on the total amount of the nonaqueous electrolyte solution.

10. The nonaqueous electrolyte battery according to claim 1, wherein the nonaqueous electrolyte solution comprises an electrolyte, a nonaqueous solvent, and either (i) at least one compound selected from the group consisting of: lithium fluorosulfonate, lithium difluorophosphate, hexamethylene diisocyanate, 1,3-bis(isocyanatomethyl)cyclohexane, lithium bis(fluorosulfonyl)imide, p-toluenesulfonyl isocyanate, diisocyanatosulfone, isopropyl isocyanate, tert-butyl isocyanate, or (ii) a combination of 1,3-bis(isocyanatomethy)cyclohexane acid one compound selected from the group consisting of: 1,3-propane sultone, maleic anhydride, vinylene carbonate and vinylethylene carbonate.

* * * * *